US007862416B2

(12) United States Patent
Walker et al.

(10) Patent No.: US 7,862,416 B2
(45) Date of Patent: Jan. 4, 2011

(54) SYSTEM AND METHOD FOR COMMUNICATING GAME SESSION INFORMATION

(75) Inventors: Jay S. Walker, Ridgefield, CT (US); James A. Jorasch, Stamford, CT (US); Geoffrey M. Gelman, Stamford, CT (US); Magdalena M. Fincham, Norwalk, CT (US); Steven M. Santisi, Ridgefield, CT (US); Norman C. Gilman, New York, NY (US); Thomas M. Sparico, Hoboken, NJ (US)

(73) Assignee: IGT, Reno, NV (US)

( * ) Notice: Subject to any disclaimer, the term of this patent is extended or adjusted under 35 U.S.C. 154(b) by 336 days.

(21) Appl. No.: 11/423,043

(22) Filed: Jun. 8, 2006

(65) Prior Publication Data

US 2006/0287040 A1 Dec. 21, 2006

Related U.S. Application Data

(63) Continuation of application No. 10/636,520, filed on Aug. 7, 2003, which is a continuation-in-part of application No. 10/001,089, filed on Nov. 2, 2001, now Pat. No. 7,140,964, which is a continuation-in-part of application No. 09/518,760, filed on Mar. 3, 2000, now Pat. No. 6,319,127, which is a continuation of application No. 08/880,838, filed on Jun. 23, 1997, now Pat. No. 6,077,163, said application No. 10/636,520 and a continuation-in-part of application No. 10/159,722, filed on May 30, 2002, now Pat. No. 6,969,317, is a continuation of application No. 09/879,299, filed on Jun. 12, 2001, now Pat. No. 6,634,942, which is a continuation-in-part of application No. 09/437,204, filed on Nov. 9, 1999, now Pat. No. 6,244,957, which is a continuation of application No. 08/774,487, filed on Dec. 30, 1996, now Pat. No. 6,012,983.

(60) Provisional application No. 60/282,792, filed on Apr. 10, 2001, provisional application No. 60/401,852, filed on Aug. 7, 2002.

(51) Int. Cl.
*A63F 13/00* (2006.01)

(52) U.S. Cl. ........................................ 463/12; 463/25

(58) Field of Classification Search .................. 463/12, 463/25

See application file for complete search history.

(56) References Cited

U.S. PATENT DOCUMENTS 4,363,485 A 12/1982 Edwall (Continued)

OTHER PUBLICATIONS

Fallstrom, Bob. "Winter wonderland Symphony of Trees is sure to be a dazzling delight" Herald & Review (Decatur, IL), originally published Nov. 17, 1992, accessed May 9, 2008.*

(Continued)

*Primary Examiner*—David L Lewis
*Assistant Examiner*—William H McCulloch
(74) *Attorney, Agent, or Firm*—K&L Gates LLP

(57) ABSTRACT

According to one or more embodiments of the present invention, a contract is established for a session comprising two or more plays of at least one gaming device. Information about the game play session, such as outcomes generated at the at least one gaming device, is communicated to a player device. The information is presented to a player via the player device.

14 Claims, 33 Drawing Sheets

227

| MACHINE TYPE 710 | AMOUNT WAGERED PER PLAY 712 | PLAYER RATING 714 | TIME OF DAY 716 | DAY OF THE WEEK 718 | MACHINE USAGE 719 | ACTIVE PAY COMBINATIONS 720 | DURATION OF FLAT RATE PLAY SESSION 722 | FLAT RATE PRICE 724 |
|---|---|---|---|---|---|---|---|---|
| QUARTER DEUCES WILD | $0.25 | 2 | 2:00 AM | MONDAY | LOW | ALL | 30 MIN. | $15.00 |
| DOLLAR DOUBLE DIAMOND | $3 | 5 | 9:00 PM | SATURDAY | HEAVY | TOP 2 | 2 HRS. | $100.00 |
| DOLLAR SUPER SEVENS | $3 | 3 | 4:00 PM | FRIDAY | MODERATE | TOP 1 | 1 HR. | $30.00 |

U.S. PATENT DOCUMENTS 4,467,424 A 8/1984 Hedges et al. .............. 364/412
4,593,904 A 6/1986 Graves
4,636,951 A 1/1987 Harlick ........................ 364/412
4,669,731 A 6/1987 Clarke .................... 273/143 R
4,764,666 A 8/1988 Bergeron .................... 235/380
4,880,237 A 11/1989 Kishishita ............... 273/138 A
4,991,848 A 2/1991 Greenwood et al. ...... 273/143 R
5,069,453 A 12/1991 Koza et al. .................... 463/17
5,085,435 A * 2/1992 Rossides .................. 705/14.14
5,112,050 A 5/1992 Koza et al. .................... 463/17
5,123,649 A 6/1992 Tiberio ................... 273/143 R
5,129,652 A * 7/1992 Wilkinson .................. 273/139
5,178,390 A 1/1993 Okada .................... 273/143 R
5,275,400 A 1/1994 Weingardt et al. ............ 273/85
5,287,269 A 2/1994 Dorrough et al. ........... 364/408
5,290,033 A 3/1994 Bittner et al. ................. 463/25
5,294,120 A * 3/1994 Schultz ........................ 463/13
5,377,975 A 1/1995 Clapper, Jr. .................. 463/16
5,401,023 A * 3/1995 Wood .......................... 463/13
5,401,024 A 3/1995 Simunek ................. 273/138 A
5,407,199 A 4/1995 Gumina
5,408,417 A * 4/1995 Wilder .......................... 705/5
5,429,361 A 7/1995 Raven et al. ............ 273/138 A
5,531,440 A * 7/1996 Dabrowski et al. ............ 463/12
5,536,008 A 7/1996 Clapper, Jr. .................. 463/16
5,537,314 A * 7/1996 Kanter .................... 705/14.13
5,551,692 A 9/1996 Pettit et al. .............. 273/143 R
5,559,312 A 9/1996 Lucero
5,569,082 A 10/1996 Kaye ........................... 463/17
5,570,885 A 11/1996 Ornstein ...................... 463/27
5,580,311 A 12/1996 Haste, III ..................... 463/17
5,595,538 A 1/1997 Haste, III ..................... 463/17
5,609,337 A 3/1997 Clapper, Jr.
5,613,912 A 3/1997 Slater .......................... 463/25
5,621,200 A 4/1997 Irwin et al. ................. 235/375
5,634,012 A 5/1997 Stefik et al. ................. 395/239
5,638,443 A 6/1997 Stefik et al.
5,647,592 A 7/1997 Gerow ........................ 273/139
5,657,899 A 8/1997 Stoken ........................ 463/17
5,709,603 A * 1/1998 Kaye ........................... 463/17
5,715,403 A 2/1998 Stefik
5,735,432 A 4/1998 Stoken et al. .................. 221/2
5,741,183 A 4/1998 Acres et al. ................... 463/42
5,749,784 A 5/1998 Clapper, Jr. .................. 463/17
5,758,875 A 6/1998 Giacalone, Jr. .......... 273/143 R
5,766,075 A 6/1998 Cook et al. ................... 463/25
5,768,382 A 6/1998 Schneier et al. ............... 380/23
5,770,533 A * 6/1998 Franchi ....................... 463/42
5,772,509 A 6/1998 Weiss .......................... 463/16
5,800,268 A 9/1998 Molnick ...................... 463/40
5,809,520 A 9/1998 Edwards et al.
5,816,917 A 10/1998 Kelmer et al. ................. 463/16
5,830,063 A * 11/1998 Byrne ......................... 463/18
5,830,067 A 11/1998 Graves et al. ................. 463/40
5,833,538 A 11/1998 Weiss .......................... 463/21
5,873,781 A 2/1999 Keane
5,910,048 A 6/1999 Feinberg ...................... 463/25
5,915,588 A 6/1999 Stoken et al. .................. 221/2
5,941,769 A * 8/1999 Order .......................... 463/12
5,970,143 A 10/1999 Schneier et al. ............... 380/23
5,993,316 A * 11/1999 Coyle et al. ................... 463/25
6,001,016 A 12/1999 Walker et al. ................. 463/42
6,012,983 A 1/2000 Walker et al. ................. 463/20
6,050,895 A 4/2000 Luciano, Jr. et al.
6,056,289 A * 5/2000 Clapper, Jr. ............. 273/138.2
6,077,163 A 6/2000 Walker et al. ................. 463/26
6,117,012 A * 9/2000 McCrea, Jr. .................. 463/27
6,168,522 B1 1/2001 Walker et al. ................. 463/25
6,203,428 B1 3/2001 Giobbi et al. ................. 463/16
6,244,957 B1 6/2001 Walker et al. ................. 463/20
6,299,531 B1 10/2001 Bommarito
6,299,533 B1 10/2001 Parra et al. .................... 463/17
6,306,038 B1 10/2001 Graves et al. ................. 463/40
6,315,662 B1 11/2001 Jorasch et al. ................ 463/20
6,319,127 B1 11/2001 Walker et al. ................. 463/26
6,343,989 B1 2/2002 Wood et al. ................... 463/23
6,389,538 B1 5/2002 Gruse et al. .................... 705/1
6,394,899 B1 5/2002 Walker
6,402,148 B1 6/2002 Saruwatari .................. 273/292
6,508,709 B1 1/2003 Karmarkar
6,508,710 B1 1/2003 Paravia et al. ................. 463/42
6,527,638 B1 3/2003 Walker et al. ................. 463/25
6,565,434 B1 * 5/2003 Acres .......................... 463/25
6,578,735 B1 6/2003 Mothwurf
6,605,001 B1 8/2003 Tarantino ..................... 463/22
6,634,942 B2 10/2003 Walker et al.
6,695,700 B2 2/2004 Walker et al.
6,709,331 B2 3/2004 Berman ....................... 463/16
6,722,983 B2 4/2004 Kaminkow et al. ........... 463/26
6,726,563 B1 4/2004 Baerlocher et al. ............ 463/25
6,733,389 B2 5/2004 Webb et al. ................... 463/20
6,769,983 B2 8/2004 Slomiany ..................... 463/16
6,832,958 B2 * 12/2004 Acres et al. ................... 463/25
6,846,238 B2 1/2005 Wells .......................... 463/39
6,896,616 B2 5/2005 Weiss
6,969,317 B2 11/2005 Walker et al.
7,076,652 B2 7/2006 Ginter et al. ................ 713/153
7,140,964 B2 11/2006 Walker et al. ................. 463/25
7,156,739 B2 1/2007 Walker et al.
7,179,168 B1 2/2007 Tulley et al.
7,182,690 B2 2/2007 Giobbi et al.
7,210,141 B1 4/2007 Nathan et al.
7,213,005 B2 5/2007 Mourad et al. ................ 705/64
7,261,635 B2 8/2007 Walker et al.
RE39,817 E 9/2007 Walker et al.
7,267,614 B1 9/2007 Jorasch et al.
7,351,142 B2 4/2008 Walker et al.
7,401,032 B1 * 7/2008 Golden et al. ............ 705/14.39
7,419,427 B2 * 9/2008 Boushy ....................... 463/25
7,427,233 B2 9/2008 Walker et al.
7,476,153 B2 1/2009 Walker et al.
7,496,943 B1 * 2/2009 Goldberg et al. .............. 725/22
7,503,851 B2 3/2009 Walker et al.
7,549,920 B2 6/2009 Jorasch et al.
7,591,726 B2 9/2009 Baerlocher et al.
7,682,244 B1 3/2010 Luciano, Jr. et al.
7,690,991 B2 * 4/2010 Black .......................... 463/26
7,704,138 B2 4/2010 Tallal, Jr.
7,722,458 B2 5/2010 Walker et al.
7,727,068 B2 6/2010 Peterson
2001/0014868 A1 * 8/2001 Herz et al. ..................... 705/14
2002/0002076 A1 * 1/2002 Schneier et al. ............... 463/29
2002/0058542 A1 5/2002 Roethel et al. ................ 463/13
2002/0125641 A1 9/2002 Moody ....................... 273/292
2002/0132660 A1 9/2002 Taylor
2002/0147040 A1 10/2002 Walker et al.
2003/0144053 A1 7/2003 Michaelson .................. 463/25
2003/0224854 A1 12/2003 Joao ............................ 463/40
2004/0147308 A1 7/2004 Walker et al.
2006/0025207 A1 2/2006 Walker et al.
2006/0111175 A1 5/2006 Walker et al.
2006/0252502 A1 11/2006 Walker et al.
2006/0287040 A1 * 12/2006 Walker et al. ................. 463/16
2006/0287071 A1 12/2006 Walker et al.
2008/0200242 A1 * 8/2008 Ginsberg et al. .............. 463/25
2008/0274792 A1 11/2008 Walker et al.
2009/0286585 A1 11/2009 Walker
2010/0151937 A1 6/2010 Tallal, Jr.

OTHER PUBLICATIONS

Brochure, "Flying Bet Roulette" DEQ Casinos Ltd., undated, 2pp.
Ritchie, Lauren "Orange Man Sought In Betting Probe", Orlando Sentinel Tribune, May 30, 1990 at p. B2, 3pp.

Mayo, Michael, "Win-Or-Lose-Cruise, You Can Bet Sports Legally Around Here—Just Wait Till The Boat Is 3 Miles Out", Sun-Sentinel, Dec. 28, 1994 at p. 1C, 3pp.
Grochowski, John, "Computers Help Players Learn Winning Strategy", Chicago Sun-Times, Jun. 30, 1995, Section: Weekend Plus, Gaming, p. 13, NC, 2pp.
Pledger, Marcia, "Going for the gold at slot tournaments", Las Vegas Review-Journal, Dec. 24, 1995, p. 5.L, 4pp.
Cave, Kathy, "The Lake Effect", Milwaukee Journal Sentinel, Mar. 27, 1996 at p. 8, 2pp.
Hawley, David, "Those one-armed bandits; Slot-machine tournaments lure throngs to Midwest casinos", The Houston Chronicle, Apr. 9, 1996, Section: Houston, p. 3, 3pp.
Busch, Melanie, "Tulsa Firm Explores Internet Gaming", Tulsa World, Aug. 1, 1996, Section: Business, p. E1, 3pp.
"Electronic Bingo System", Network Gaming International Corporation, (http://network-bingo com/bingo htm), download date: Nov. 13, 1996, 5pp.
Grochowski, John, "Slot tourney prospers under Indiana rules", Chicago Sun-Times, Apr. 6, 1997, Section: SHO, CASINOS, p. 15, NC, 1pg.
"MGAM Signs Agreement With Lac Vieux Desert Chippewa Tribe", Business Wire, May 18, 2001, 2pp.
"GameCast Live—PowerPoint Presentation", (http //www gamecastlive com/presentation/toronto2_files/frame htm), download date: Nov. 24, 2002, 12pp.
"DEQ Casino—Flying Bet Roulette", (http //www deq com/ang/flying html), download date: Nov. 24, 2002, 1pg.
"GameCast Live—Home", (http //www gamecastlive com/), download date: Nov. 24, 2002, 1pg.
"GameCast Live—About the Product", (http //www gamecastlive com/about_the product html), download date: Nov. 24, 2002, 1pg.
"GameCast Live—Press Release", (http //www gamecastlive com/press_june_6 html), download date: Nov. 24, 2002, 2pp.
"Welcome—i2corp.com", (http //www i2corp_com/), download date: Nov. 24, 2002, 1pg.
"Games—i2corp.com", (http //www i2corp com/games/index cfm), download date: Nov. 24, 2002, 2pp.
"The Home Gambling Network—Welcome", (http //www homegamblingnetwork com), download date: Nov. 24, 2002, 1 pg.
"The Home Gambling Network—Players", (http //www homegamblingnetwork com/player php3), download date: Nov. 24, 2002, 2pp.
"Multimedia Games, Inc.—Home", (http www betnet com/), download date: Nov. 24, 2002, 1pg.
Newsletter sent via email: "The CR Newsletter", do_not_email@crnewsletter.com, email sent Jan. 20, 1998, 1pg.
Website: "Insuring Your Online Wagers", (http //www winneronline com/articles/November 2001/gambling_insu...), Nov. 28, 2001, 1pg.
Website: "Online blackjack, poker, slots, and more—Casino Vegas Royale", (http www casinovegasroyale com/insurance shtml), Copyright 2002, 1pg.
Website: "Who Says You Can't Win From Losing? 49er and Three Diamonds Casino Offer 'Free Insurance' for Online Play in July", (http //www smartplayers net/insurance htm), Jun. 14, 2003, 1pg.
Brochure: "Introducing iView", Bally Gaming Systems, Copyright 2004, 2pp.
Website: "Bettors Insurance", (http //www bettorsinsurance com/index asp?asp?id=881035&), Copyright 2004, 1pg.
Website: "Welcome—CasinoActive.Net Offers New Gambling Idea", (http //www bokmaker com/default asp?ACT=5&content30 &id=1), download date: Jul. 26, 2004, 1pg.
Website: "Gamblers Insurance", (http www u1casino com/rules_gamblers php), download date: Jul. 26, 2004, 1pg.
Website: "Online Sports Betting—Sportsbet Bookmaker", (http //www sportsbetbookmaker com/aboutus shtml), download date: Jul. 27, 2004, 1pg.
Website: "SDS Product Group Snapshot", Bally Gaming Systems, (http www ballygaming com/sds/sds_products1 asp), download date: Aug. 9, 2004, 2pp.
Website: "Cash Back Bonus", (http //www optimalgambling com/casinos/cash-back-bonus-online-casinos htm), download date: Sep. 27, 2004, 1pg.
Beckett, Rick, "Gambling Insurance?", iWon—Casino, (http //iwon gamblingtimes com/writers/rbeckett/rbeckett_ winter2001 html), download date: Sep. 27, 2004, 2pp.
"GameCast Live—About the Product", (http //www gamecastlive com/about_the product html), download date: Nov. 24, 2002, 1 pg.
Website: "Insuring Your Online Wagers", (http // www winneronline com/articles/November2001/gambling_insu...), Nov. 28, 2001, 1 pg.
Website, "Extending the Casino Floor", GameCast Live, (http //www gamecastlive com/presentation/toronto_files/slide0012 htm), download date: Jun. 6, 2001, 12pgs.
Davy, K., "Big Ichigeki! Pachi-Slot Taikouryku Universal Museum—Reader Review", Copyright 1995-2001, Game FAQs, 2 pp.
"Station Announces Formation of GameCase Live, LLC and Release of Remote Play eSlots for In-Room Gaming Applications", PR Newswire, Jun. 6, 2001, Section: Financial News, 2 pgs.
U.S. Appl. No. 08/766,576, entitled "Secure Improved Remote Gaming System", filed Dec. 6, 1996.
U.S. Appl. No. 09/218,258, entitled "System and Method for Automatically Initiating Game Play on an Electronic Gaming Device", filed Dec. 6, 1996.
U.S. Examiner's Office Action dated Oct. 9, 2007, U.S. Appl. No. 10/636,520, Filing Date Aug. 7, 2003 21 pages.
U.S. Examiner's Notice of Allowability dated Aug. 10, 2001, U.S. Appl. No. 09/518,760, Filing Date Mar. 3, 2001 2 pages.
U.S. Examiner's Office Action dated May 9, 2001, U.S. Appl. No. 09/518,760, Filing Date Mar. 3, 2001 10 pages.
U.S. Examiner's Office Action dated Oct. 6, 1999, U.S. Appl. No. 08/880,838, Filing Date Jun. 23, 1997 6 pages.
U.S. Examiner's Office Action dated Sep. 22, 2006, U.S. Appl. No. 10/420,066, Filing Date Apr. 21, 2003 10 pages.
U.S. Examiner's Office Action dated Jul. 13, 2007, U.S. Appl. No. 10/420,066, Filing Date Apr. 21, 2003 15 pages.
PCT International Search Report for Application No. PCT/US03/12271, dated Oct. 30 2003, 2pp.
U.S. Examiner's Office Action dated Apr. 6, 2004, U.S. Appl. No. 10/001,089, Filing Date Nov. 2, 2001 10 pages.
U.S. Examiner's Office Action dated Jul. 11, 2005, U.S. Appl. No. 10/001,089, Filing Date Nov. 2, 2001 24 pages.
U.S. Examiner's Notice of Allowability dated Sep. 28, 2006, U.S. Appl. No. 10/001,089, Filing Date Nov. 2, 2001 6 pages.
U.S. Examiner's Office Action dated Sep. 12, 2003, U.S. Appl. No. 10/001,089, Filing Date Nov. 2, 2001 8 pages.
U.S. Examiner's Notice of Allowability dated Nov. 3, 2005, U.S. Appl. No. 10/985,131, Filing Date Nov. 10, 2004 7 pages.
U.S. Examiner's Office Action dated Jun. 20, 2007, U.S. Appl. No. 11/423,037, Filing Date Jun. 8, 2006 15 pages.

* cited by examiner

344

| PLAYER ID 410 | SOCIAL SECURITY NUMBER 412 | NAME 414 | ADDRESS 416 | PHONE NUMBER 418 | CREDIT CARD NUMBER 420 | CREDIT BALANCE 422 | (ACCUMULATED) COMP. POINTS 424 | HOTEL GUEST 426 | PLAYER RATING 428 | VALUE OF INTERVAL REMAINING 430 |
|---|---|---|---|---|---|---|---|---|---|---|
| 123456 | 123-45-7890 | BILL GREEN | 111 NORTH AVE. | (212) 555-1234 | 1111-2222-3333-4444 | $25.00 | 130 PTS. | NO | 4 | $30.00 |
| 876543 | 876-54-3210 | ROB BLUE | 423 SOUTH ST. | (812) 555-4321 | 2222-4444-6666-8888 | $17.50 | 240 PTS. | YES | 2 | $3.00 |
| 158595 | 555-12-6338 | KAREN RED | 64 WEST RD. | (315) 555-5954 | 1111-3333-5555-7777 | $0.00 | 350 PTS. | YES | 2 | $0.75 |

FIG. 4

246

| PLAYER ID NUMBER 510 | PLAYER SELECTED PRICE PARAMETERS 512 | FLAT RATE PRICE 514 | INTERVAL REMAINING 516 | TIME AUDIT DATA 518 | MACHINE ID NUMBER 520 |
|---|---|---|---|---|---|
| 123456 | TOP 3 JACKPOTS 90 MINUTES | $50.00 | 72 MINUTES | 6/21/97 10:30 AM | A846 |
| 876543 | ALL JACKPOTS 90 MINUTES | $200.00 | 3 MINUTES | 6/21/97 11:00 AM | B623 |
| 158595 | TOP JACKPOT 30 MINUTES | $30.00 | 15 MINUTES | 6/21/97 11:30 AM 6/21/97 11:45 AM | C103 |

FIG. 5

228

| PAY COMBINATION 610 | 1 COIN 620 | 2 COINS 630 | 3 COINS 640 | PAY COMBINATION STATUS 650 |
|---|---|---|---|---|
| DOUBLE JACKPOT | 400 | 800 | 1200 | ACTIVE |
| 5BAR-5BAR-5BAR | 50 | 100 | 150 | ACTIVE |
| SEVEN-SEVEN -SEVEN | 25 | 50 | 75 | INACTIVE |
| BAR-BAR-BAR | 20 | 40 | 60 | INACTIVE |
| CHERRY-CHERRY-CHERRY | 10 | 20 | 30 | INACTIVE |
| ANY PAIR-CHERRY | 5 | 10 | 15 | INACTIVE |
| ANY-ANY-CHERRY | 2 | 4 | 6 | INACTIVE |
| NON WINNING OUTCOMES | 0 | 0 | 0 | N/A |

FIG. 6

227

| MACHINE TYPE 710 | AMOUNT WAGERED PER PLAY 712 | PLAYER RATING 714 | TIME OF DAY 716 | DAY OF THE WEEK 718 | MACHINE USAGE 719 | ACTIVE PAY COMBINATIONS 720 | DURATION OF FLAT RATE PLAY SESSION 722 | FLAT RATE PRICE 724 |
|---|---|---|---|---|---|---|---|---|
| QUARTER DEUCES WILD | $0.25 | 2 | 2:00 AM | MONDAY | LOW | ALL | 30 MIN. | $15.00 |
| DOLLAR DOUBLE DIAMOND | $3 | 5 | 9:00 PM | SATURDAY | HEAVY | TOP 2 | 2 HRS. | $100.00 |
| DOLLAR SUPER SEVENS | $3 | 3 | 4:00 PM | FRIDAY | MODERATE | TOP 1 | 1 HR. | $30.00 |

FIG. 7

229

| PACKAGE NUMBER 1410 | INTERVAL 1412 | DURATION OF FLAT RATE PLAY SESSION 1414 | AMOUNT WAGERED PER PLAY 1416 | PAY COMBINATION STATUS 1418 | FLAT RATE PLAY SESSION PRICE 1420 |
|---|---|---|---|---|---|
| 1 | HANDLE PULLS | 100 PULLS | 3 COINS | ALL ACTIVE | $30.00 |
| 2 | HANDLE PULLS | 100 PULLS | 3 COINS | TOP 3 ACTIVE | $20.00 |
| 3 | HANDLE PULLS | 250 PULLS | 3 COINS | ALL ACTIVE | $75.00 |
| 4 | HANDLE PULLS | 250 PULLS | 3 COINS | TOP 3 ACTIVE | $50.00 |
| 5 | TIME | 30 MINUTES | 3 COINS | ALL ACTIVE | $40.00 |
| 6 | TIME | 30 MINUTES | 3 COINS | DYNAMIC | $30.00 |
| 7 | TIME | 60 MINUTES | 3 COINS | ALL ACTIVE | $80.00 |
| 8 | TIME | 60 MINUTES | 3 COINS | DYNAMIC | $60.00 |
| 9 | TIME | 90 MINUTES | 3 COINS | ALL ACTIVE | $120.00 |

FIG. 14

1720

| PLAYER IDENTIFIER 2105 | NAME 2110 | ADDRESS 2115 | FINANCIAL ACCOUNT IDENTIFIER 2120 | DEMOGRAPHIC 2125 | CREDITS 2130 | LIFETIME COIN IN 2135 |
|---|---|---|---|---|---|---|
| P11123 | SAM BROWN | ANYPLACE, USA | 1111-1111-1111-1111 | MALE, AGE 23 | 68 CREDITS, 25 CENTS PER CREDIT | $600 |
| P222234 | LINDA JONES | SOMEPLACE, USA | 2222-2222-2222-2222 | FEMALE, AGE 47 | 0 | $14400 |

FIG. 21

1725

| GAMING DEVICE IDENTIFIER 2205 | NAME 2210 | MANUFACTURER 2215 |
|---|---|---|
| G333333 | DIAMOND MINE | ABC CORP |
| G444444 | CRAZY DEUCES | XYZ CORP |

FIG. 22

1730

| CONTRACT IDENTIFIER 2305 | PLAYER IDENTIFIER 2310 | INITIAL PLAYER BANKROLL 2315 | DESCRIPTION 2320 | COST 2325 | RESULT 2330 | AMOUNT OWED THE PLAYER 2335 | AMOUNT OWED THE INSURER 2340 |
|---|---|---|---|---|---|---|---|
| C111 | P222333 | N/A | 2000 PULLS, 25 CENTS PER PULL, PLAYER KEEPS NET WINNINGS | $20 | CONTRACT ENDS WITH PLAYER AT MINUS $45 | 0 | $20 - $45= - $25 |
| C222 | P444555 | N/A | 1 HOUR OF PLAY, 1 DOLLAR PER PULL, PLAYER KEEPS GROSS WINNINGS | $100 | CONTRACT ENDS WITH PLAYER AT $97 | $97 | $100 |
| C333 | P666777 | $2000 | 100 PULLS PER WEEK, 2 DOLLARS PER PULL, OCCURRING BETWEEN 8-9PM TUESDAYS FOR 12 WEEKS, OR UNTIL PLAYER LOSES BANKROLL | N/A | PLAYER LOST BANKROLL | 0 | N/A |
| C444 | P888999 | $100 | 90 MINUTES OF PLAY, 50 CENTS PER PULL | N/A | PLAYER ENDS UP WITH $120 | $120 | N/A |
| C555 | P111000 | $200 | 63 CENTS PER PULL, DOUBLE BETS FOR TWO PULLS AFTER ANY WIN, STOP AFTER JACKPOT, LOSS INSURED BEYOND $200 | $20 | 2 MINUTES LEFT AND PLAYER IS AT $213 | UNDETER-MINED | UNDETER-MINED |
| TOTAL OWED THE INSURER: $75 | | | | | | | |

FIG. 23

SYSTEM AND METHOD FOR COMMUNICATING GAME SESSION INFORMATION

PRIORITY CLAIM TO CO-PENDING APPLICATIONS

The present application is a continuation application of U.S. patent application Ser. No. 10/636,520, filed Aug. 7, 2003 in the name of Walker et al., entitled "SYSTEM AND METHOD FOR COMMUNICATING GAME SESSION INFORMATION"; which application:

(A) is a continuation-in-part of the following applications (i) and (ii):

(i) U.S. patent application Ser. No. 10/001,089, entitled "GAMING DEVICE FOR A FLAT RATE PLAY SESSION AND A METHOD OF OPERATING SAME," filed on Nov. 2, 2001 now U.S. Pat. No. 4,140,964;

which application:

(a) is a continuation-in-part of U.S. patent application Ser. No. 09/518,760, entitled "GAMING DEVICE FOR A FLAT RATE PLAY SESSION AND A METHOD OF OPERATING SAME," filed on Mar. 3, 2000, and issued on Nov. 20, 2001, as U.S. Pat. No. 6,319,127 B1; which is a continuation of U.S. patent application Ser. No. 08/880,838, entitled "GAMING DEVICE FOR A FLAT RATE PLAY SESSION AND A METHOD OF OPERATING SAME," filed on Jun. 23, 1997, and issued on Jun. 20, 2000, as U.S. Pat. No. 6,077,163;

and also (b) claims priority to U.S. Provisional Patent Application No. 60/282,792, entitled "GAMING CONTRACTS," filed on Apr. 10, 2001;

and also (ii) U.S. patent application Ser. No. 10/159,722, entitled "SYSTEM AND METHOD FOR AUTOMATED PLAY OF MULTIPLE GAMING DEVICES," filed on May 30, 2002 now U.S. Pat. No. 6,969,314; which is a continuation of U.S. patent application Ser. No. 09/879,299, entitled "SYSTEM AND METHOD FOR AUTOMATED PLAY OF MULTIPLE GAMING DEVICES," filed on Jun. 12, 2001 now U.S. Pat. No. 6,634,942; which is a continuation-in-part of U.S. patent application Ser. No. 09/437,204, entitled "AUTOMATED PLAY GAMING DEVICE," filed on Nov. 9, 1999, and issued on Jun. 12, 2001, as U.S. Pat. No. 6,244,957; which is a continuation of U.S. patent application Ser. No. 08/774,487, "AUTOMATED PLAY GAMING DEVICE," filed on Dec. 30, 1996, and issued on Jan. 11, 2000, as U.S. Pat. No. 6,012, 983;

and also (B) the present application claims the benefit of priority of U.S. Provisional Patent Application No. 60/401,852, entitled "VIEWING OF GAMING CONTRACTS," filed Aug. 7, 2002.

Each of the applications specified above is incorporated by reference herein in its entirety.

FIELD OF THE INVENTION

The present invention relates generally to the structure and operation of at least one gaming device, such as a slot machine.

BACKGROUND OF THE INVENTION

There are numerous types of gaming devices in use today. Most of these gaming devices, such as slot machines, video blackjack machines, video poker machines, and the like, require the player of the device to purchase individual plays at a set cost or wager per play. Because players can only purchase individual plays, they may stop playing after any individual play. Furthermore, having to purchase each individual play is inconvenient. Thus, a need exists for a gaming device allowing more convenient and efficient methods of play.

One scenario in which players seemingly purchase multiple plays on a gaming device during a flat rate play session is entry fee slot machine tournaments. Such tournaments typically involve players paying a fee for a set period of play determined by the casino. During such tournaments, each player plays a specific type and denomination of machine, also determined by the casino, and accumulates points rather than money. Those players accumulating the most points are awarded prizes.

Although slot machine tournaments are popular with some players, the tournaments are inflexible and not accommodating to individual player's preferences. The organizers set the time and duration of the tournament, the cost to play, the amount wagered per play, and the type of machines which are played. Furthermore, the organizers must designate machines for the tournament. Because these machines are available only to tournament players and not the general public, the machine owners lose revenue for all machines designated but not played during a tournament. Thus, a need still exists for a gaming device which allows tournament style play without comprising the revenue stream of a casino, particularly where the player selects the time and duration of the period, the amount wagered per play, and the particular gaming device played.

SUMMARY

In one example embodiment, a method of the present disclosure includes offering a flat rate play session to a player of a table game and causing at least one processor to calculate a flat rate price for the flat rate play session based, at least in part, on an expected payout associated with the flat rate play session. In this embodiment, the flat rate play session enables the player to participate in at least three plays of the table game in exchange for an upfront payment of the flat rate price, each of the at least three plays of the table game of the flat rate play session is associated with a wager amount, and the flat rate price has a corresponding value which is less than a cumulative total of the wager amounts associated with each of the at least three plays of the table game of the flat rate play session. The method of this example embodiment includes enabling the player to initiate the flat rate play session upon receiving the value corresponding to the flat rate price from the player, providing chips corresponding to the wager amount for each play of the table game of the flat rate play session for use by the player in the flat rate play session such that the player is not obligated to provide any funds other than the value corresponding to the flat rate price for any play of the table game following the first play of the table game during the flat rate play session, and for each play of the table game of the flat rate play session, providing an award to the player if the play of the table game results in a winning game outcome.

In another example embodiment, a flat rate play session gaming apparatus of the present disclosure includes at least one support member, and at least one display device configured to display an offer of a flat rate play session to a player of a table game, the flat rate play session associated with a flat rate price based, at least in part, on an expected payout associated with the flat rate play session. In this example embodiment, the flat rate play session enables the player to participate in at least three plays of the table game in exchange for an upfront payment of the flat rate price, each of the at least three plays of the table game of the flat rate play session is associated with a wager amount, and the flat rate price has a corresponding value which is less than a cumulative total of the wager amounts associated with each of the at least three plays of the table game of the flat rate play session. The flat rate play session gaming apparatus of this embodiment also includes at least one playing surface supported by the at least one support member, the at least one playing surface configured to enable the player to provide the value corresponding to the flat rate price to initiate the flat rate play session. The at least one playing surface including a betting area configured to enable a dealer to provide at least one chip corresponding to the wager amount for each play of the table game of the flat rate play session for use by the player in the flat rate play session in exchange for the player providing the value corresponding to the flat rate price, such that the player is not obligated to provide any funds other than the value corresponding to the flat rate price for any play of the table game during the flat rate play session, and a game play area configured to enable the dealer to cause a display of each of the at least three plays of the table game of the flat rate play session.

BRIEF DESCRIPTION OF THE DRAWINGS

FIG. 4 is a schematic view of a casino player database of the server of FIG. 3;

FIG. 5 is a schematic view of the flat rate database of the slot machine of FIG. 2;

FIG. 6 is a schematic view of the payout table of the slot machine of FIG. 2;

FIG. 7 is a schematic view of the calculation table of the slot machine of FIG. 2;

FIG. 14 is a schematic view of the flat rate price package database of the slot machine of FIG. 2;

FIG. 21 is a table illustrating an embodiment of the player database stored in the casino server of FIG. 17;

FIG. 22 is a table illustrating an embodiment of the gaming device database stored in the casino server of FIG. 17;

FIG. 23 is a table illustrating an embodiment of the contract database stored in the casino server of FIG. 17;

DETAILED DESCRIPTION OF PREFERRED EMBODIMENTS

Figure 1:
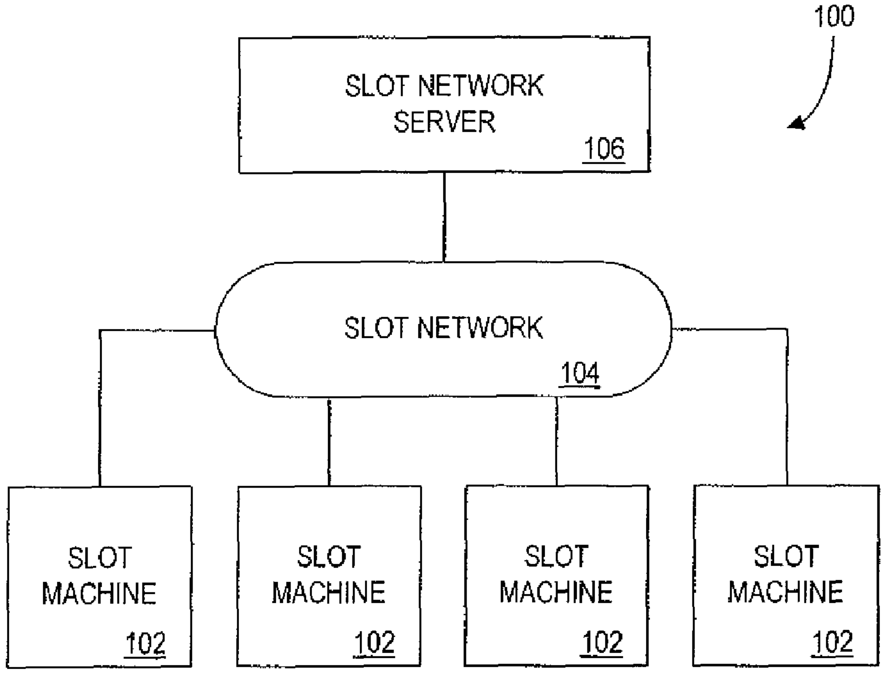
FIG. 1 is an overall schematic view of a system according to one embodiment of the present invention, including a slot machine and a slot network server.

Certain preferred embodiments of the present invention will now be described in greater detail with reference to the drawings. Although the embodiments discussed herein are directed to reel slot machines, it should be understood that the present invention is equally applicable to other gaming devices, such as video poker machines, video blackjack machines, video roulette, video bingo, video pachinko, video lottery, video keno, and the like.

In accordance with various embodiments of the present invention, there are provided a method, apparatus, and article of manufacture for providing a gaming session using a gaming device.

In one embodiment, the method includes initiating a game play session of a gaming device after receiving an indication of payment for the game play session. The session preferably spans a pre-established duration. A duration may comprise, without limitation, a specified amount of time, a specified number of winning outcomes, and/or a specified number of game plays (e.g., handle pulls of a slot machine).

In accordance with one embodiment, a game play session is associated with a contract, wherein the contract specifies terms such as, for example, a price to be paid by a player to establish the contract, a duration of play of a gaming device, an initial amount of funds to be provided by the player for use in executing the contract (e.g., a bankroll), and/or a threshold of credits above which the player may collect winnings from the game play session. The terms of the contract may be determined based on player selected price parameters and/or operator controlled price parameters. Such a contract may involve a third party that acts as an insurer.

In accordance with one embodiment, a game play session may be purchased by means of purchasing a contract from a casino or a third party such as an insurance provider, wherein the contract specifies terms such as, for example, a price to be paid by the purchaser for the contract.

In one embodiment, a contract may be associated with a bankroll or other type of account that includes an amount of finds available for placing wagers on behalf of a player during execution of a contract. A bankroll may also include winnings from a contracted game play session. In some embodiments, some or all of a player's bankroll may be returned to a player in accordance with one or more terms of a contract. For example, funds in a player's account may be paid back to a player in accordance with a payment schedule (e.g., periodically, or upon termination of the contract).

In one embodiment, the method includes communicating information about a game play session and/or a contract (e.g., an amount won during the session, an outcome) to a player device and/or to a gaming device. Such session information may include, without limitation, a symbol that identifies the session and/or a contract (e.g., a ticker symbol), an amount of a bankroll, and/or a credit balance.

In one embodiment, the method includes identifying at least one price parameter, determining a contract price based upon the at least one identified price parameter, and initiating a game play session of at least one gaming device. The game play session may be initiated upon receiving an indication of payment of the entire contract price, upon receiving an indication of payment of a portion of the contract price, or before any payment is provided.

According to some embodiments, a contract may include terms related to one or more instructions describing how one or more gaming devices of the casino will generate outcomes in a game play session on behalf of the player. The instruction allow the casino to generate outcomes in accordance with the instructions (e.g., automatically), even if the player is remote from the casino.

In one embodiment, a player may modify one or more parameters or terms of a contract. In some embodiments, the player may modify one or more terms of a contract even if the player is remote from a casino and/or a gaming device.

In one embodiment, the method includes identifying at least one price parameter, determining a flat rate price based upon the at least one identified price parameter, and initiating a flat rate play session of the gaming device upon receiving an indication of payment of the flat rate price.

In one embodiment, the price parameter is a player selected price parameter, such as the amount wagered per play, jackpot structure, length of the flat rate play session, the type of gaming device, time of day, day of the week, and day of the year. In another embodiment, the price parameter is an operator selected price parameter, such as player status rating, availability of gaming devices, and anticipated availability of gaming devices.

In accordance with some embodiments of the present invention, a game play session may be associated with a contract. According to one embodiment, a player may establish a contract (e.g., with an insurer, such as a casino or another entity) or similar agreement to use a gaming device, such as a slot machine.

In accordance with some embodiments of the present invention a flat rate play session may be purchased by means of a contract. According to such embodiments a player at a casino may purchase a contract (e.g., from an insurer, such as the casino or another entity) or similar agreement to use a gaming device, such as a slot machine. Costing a fixed amount, the contract insures the player against the possibility of potentially large losses at the slot machine. In accordance with one such embodiment, upon purchasing the contract, a player credit account is set up at the slot machine. The account may begin with zero credits but may begin with another balance in other embodiments. The player is then allowed a fixed number of handle pulls at the slot machine without requiring the player to insert any money. Each handle pull decreases the player account, typically by decreasing the player account by a predetermined amount (e.g., one credit) for each handle pull. This may cause the number of credits to be negative, but play may still continue. If the player achieves a winning outcome, credits can be added to the player account in accordance with the payout for the winning outcome. If, after the fixed number of handle pulls, there are a positive number of credits in the player account, then these may be paid out to the player in the form of cash. If, however, there are less than a predetermined amount of credits (e.g., zero credits) in the player account, then the player receives nothing. The insurer, however, could compensate the casino for, e.g., an amount in the player's account that is less than a predetermined number. In such an embodiment, the player enjoys the fixed number of pulls without the risk of any loss beyond the cost of the contract.

In accordance with one embodiment, a contract may be purchased at a gaming device. The gaming device at which a contract is purchased may be different than the one or more gaming devices at which the session corresponding to the contract is executed.

Some embodiments of the present invention provide for determining a price for a contract for a block of handle pulls to be sold to a player. Pricing a contract may involve calculating the expected amount that would have to be paid a player upon the completion of the pulls. The price of the contract would then typically be greater than this expected amount so as to result in an expected profit possibly to be divided amongst the casino and, if it is a separate entity, an insurer. For example, if a player could be expected to receive $30 upon the completion of one thousand pulls, then the contract for the block of one thousand pulls could by sold for $35. Various ways for determining a price for a set of handle pulls are discussed herein.

The following definitions define the terms used to describe various contract embodiments of the present invention.

Bankroll—an amount of money a player leaves with a casino for the purposes of executing a contract. A bankroll may include the amount of money a player has left after the casino has made wagers on behalf of a player, including any winnings. For example, the player may leave $100 with the casino, and enter into a contract such that the casino is to place wagers on behalf of the player until the player's initial bankroll of $100 has been lost or has doubled to $200.

Contract indicator—an object or information by which a gaming device may recognize a contract in order to execute the contract. For example, a player purchases a contract at casino desk and receives a token that serves as a contract indicator. When the player deposits the token in a gaming device, the gaming device recognizes the contract the player has signed up for and executes the contract accordingly.

Execute a contract—to carry out the terms of a contract. A gaming device executes a contract for 200 pulls by generating the 200 outcomes, incrementing and decrementing player credits in accordance with the outcomes, and paying the player, if necessary, at the end of the contract.

Gambling contract—An agreement between a player, an insurer, and sometimes a casino (e.g., if different than the insurer) with the following exemplary provisions:

- The player pays the insurer a fixed amount up front
- The player must make a predetermined number of handle pulls, no more and no less
- The player need not pay any additional money after purchasing the contract
- The player keeps any net winnings after all handle pulls have been completed
- If the player has a net loss after the handle pulls have been completed, then the loss is paid to the casino by the insurer There are many variants of these provisions, and additional terms or provisions are possible. As can be seen, a contract may insure a player against excessive losses, and may give a player more handle pulls than would otherwise be possible for the price of the contract. Also, since there may be no additional player decisions required after the player has purchased the contract, the player need not be present for the execution of the contract and may therefore experience the feeling of remote gambling.

Gaming Device—Any electrical, mechanical, or electro-mechanical device that accepts wagers, steps through a process to determine an outcome, and pays winnings based on the outcome. The outcome may be randomly generated, as with a slot machine; may be generated through a combination of randomness and player skill, as with video poker; or may be generated entirely through player skill. Gaming devices may include slot machines, video poker machines, video blackjack machines, video roulette machines, video pachinko machines, video lottery terminals, video keno machines, video bingo machines, and the like.

Gross winnings—the total of a player's winnings during the execution of a contract without regard to wagers made by the player. For example, if, after five pulls of a contract, a player has attained one winning outcome with a payout of four coins, and one winning outcome with a payout of twenty coins, then the player's gross winnings thus far are twenty-four coins. Since gross winnings does not account for wagers a player makes, gross winnings will always be larger than or equal to net winnings.

Handle pull—a single play at a gaming device, including video poker, video blackjack, video roulette, video keno, video bingo, video lottery, video pachinko, and other devices. The definition is intended to be flexible in that a single play might constitute a single complete game, or a single wager. For example, in video blackjack, a player might play a single game in which he splits a pair of sevens, requiring an additional wager. This one game might thereby constitute either one or two handle pulls.

Net winnings—the total of a player's winnings during the execution of a contract minus the amount spent by the player on wagers. In the example cited under the definition of "gross winnings," the net winnings are nineteen coins since the player has won twenty-four coins but used one coin as a wager on each of the five pulls.

Turning now to a detailed description of the contract embodiments of the present invention, various aspects of such embodiments are set forth below.

A typical contract is an agreement between an insurer and a player. The player agrees to pay a fixed amount of money up front. In return, the player may (or must) gamble at a gaming device for a designated amount of time or for a designated number of outcomes. After the player has gambled the requisite amount, the player has the right to keep any winnings that exceed a certain threshold. The player does not, however, pay any losses. Thus, one function of the contract is to insure the player against losses at a gaming device (e.g., beyond the initial amount of money provided to establish the contract). There are many variations of the contract and a portion of these are described below.

Another benefit of the contract, according to some embodiments, is to allow a player to play a large number of handle pulls without the need of a large bankroll. For example, a player wishing to make six hundred pulls at a quarter slot machine would ordinarily require $150 (25 cents×600) in order to assure himself the ability of completing the six hundred pulls. However, a contract might allow a player to make six hundred pulls by paying only $20.

In some embodiments, a contract may be between a player and a casino. The casino itself may be an insurer. In some embodiments, the contract does not involve an insurer.

A contract may allow outcomes to be generated for the player while the player is not physically present at the gaming device. For example, a player may be remote from the gaming device and/or remote from the casino itself For instance, a player may be in a different casino, or in a different town, state, country, or other jurisdiction. In these embodiments, the contract may consist mainly of instructions from the player as to how the slot machine should gamble on the player's behalf. For example, the instructions will tell the machine how fast to gamble, when to quit, and then where to send winnings.

Amount of Play

A contract may place one or more of the following exemplary restrictions on play covered by the contract:

- The player must make a minimum number of handle pulls.
- The player may not make more than a maximum number of handle pulls.
- The player must play for a certain minimum time period.
- The player must play for less than a certain maximum time period.
- The player must maintain a minimum rate of play.
- The player may not exceed a maximum rate of play.
- The total coin in over the course of the contract must exceed a certain minimum amount.
- The total coin in over the course of the contract must not exceed a certain amount.
- The player must play until obtaining a specified outcome.

Wager Denomination

A contract may specify the size of the wager for each pull. The wager size may be the same as that typically used by the gaming device. For example, if a player signs up for a contract at a quarter slot machine, the wager for each pull of the contract might be a quarter. If the slot machine offers multiple coin bets, the wager for each pull might be a quarter, fifty cents, seventy-five cents, etc. The contract may allow or may force the player to vary the wager from pull to pull.

One aspect of a contract may allow all play to occur in "credit mode." That is, the player need not physically insert money into the gaming device prior to each pull, and money need not come out of the gaming device after a player win. Rather, a player's credit balance may be stored in a player database (e.g., player database 1725 discussed below) either in the gaming device or at the casino server. Every time the player then makes a handle pull, credits are deducted from the player's balance. Every time the player wins, credits are added to the player's balance. The player's credit balance can be displayed on the device so that the player may track his progress.

Since play may occur in credit mode, each wager might consist of coin denominations that are not standard for the gaming device. For example, a device that typically handles quarters may accept wagers of a nickel, of forty cents, or even of 12.5 cents.

Winnings Threshold

A contract may describe some threshold of gross winnings, net winnings, or accumulated player credits above which the player keeps any excess. Gross winnings describes the accumulated player wins from each pull of the contract. Thus, a player who makes 600 pulls on a $1 slot machine as part of a contract and wins $3 on each of one hundred pulls has gross winnings of $300 ($3/pull×100 pulls). Net winnings are the gross winnings less the accumulated costs of wagering. In the above example, the accumulated costs of wagering are $600 ($1/pull×600 pulls). Thus, in the above example, the player's net winnings would be negative $300 ($300–$600). Accumulated player credits may mirror a running tally of a player's net winnings. For example, a player may begin with zero credits, with credits deducted in the amount of any wager, and added in the amount of any winnings. Accumulated player credits may also mirror a running tally of gross winnings, or any other statistic about a player's performance.

At the end of a contract, a player's accumulated credits may be compared to a threshold. The player may then receive a payout of any excess accumulated credits above the threshold. For example, if the threshold is zero, and the player has 44 credits, each credit representing 25 cents, then the player receives a payout of $11 (44 credits×25 cents/credit). If the player had −12 credits, indicating a net loss of 12 credits, then the player receives nothing. The player does not owe $3 because the contract does not make the player responsible for any losses.

The threshold might be at 10 credits, in which case a player with accumulated credits of 30 would receive a payout equivalent to 20 credits at the end of a contract, and a player with 6 credits would receive nothing. A threshold might be at −10 credits, in which case a player with accumulated credits of −6 would receive the equivalent of four credits, while a player with −100 credits would receive nothing.

Rather than insuring against all of a player's losses, a contract might insure all losses up to a point and not beyond. Therefore, a contract may have multiple thresholds, each with different functions. A player may, for example, be responsible for any losses beyond a threshold loss of one hundred credits. The same player might receive any winnings beyond a threshold of 10 accumulated credits. Thus, if, at the end of the contract, the player has accumulated −125 credits, then the player must pay 25 credits. If the player has accumulated 33 credits, then the player receives a 23 credit payout. If the player has accumulated −49 credits, then the player neither owes nor receives anything.

In some embodiments, a threshold delineates a change in the percentage of a player's winnings or losses between credit tallies above and below the threshold. For example, a player might keep any credits won beyond a threshold of fifty. Below fifty credits, the player only keeps 80% of his winnings. Therefore, if a player has seventy credits remaining at the end of a contract, he keeps all 20 credits above fifty, and he keeps an additional forty credits, representing 80% of the first fifty credits. Therefore, the player keeps sixty credits in total.

A player may also be responsible for a percentage of losses above or below a certain threshold. For example, a player may be responsible for 50% of losses over 10 credits. Thus, a player who finishes a contract with minus 20 credits owes nothing for the first 10 credits of loss, but owes 5 credits for the next 10 credits of loss. The player therefore owes 5 credits.

In the most general sense, a contract specifies a functional relationship between what a player's accumulated credits are at the end of the contracted session (e.g., as defined by a number of handle pulls), and what the player either owes or is due. The function may be piece-wise linear, or may be rather non-linear and convoluted.

Where there is potential for a player to owe money at the end of a contract, the player may be required to deposit money into the gaming device in advance so as to prevent the player from walking away when he owes money. The advance payment may later be returned if the player turns out to owe nothing at the end of the contract.

In many embodiments, a contract is transparent to the casino. In other words, if the player makes a certain number of pulls, the casino makes the same amount of money whether or not the player happened to be involved in a contract. In these embodiments, however, a casino may collect money that it makes (and the player has lost) from the insurer, rather than from the player. The casino may also act as an intermediary in transactions between the player and the insurer. For example, the casino may collect from the player money that is meant to pay for a contract. The casino may then transfer an equivalent amount of money to the insurer.

In other embodiments, a contract is not completely transparent to the casino. That is, the amount of money a casino receives after a certain number of the player's handle pulls may depend on whether or not the player was in a contract. In one example, a casino agrees that if a player's accumulated credits at the end of a contract are less than −200, then the casino will only collect 200 credits for the contract's handle pulls. This example may benefit the insurer, since the insurer doesn't have to worry about covering player losses in excess of 200 credits. In another example, the casino configures a gaming device to give different odds to a player in contract play versus a player not in contract play.

Player Decisions

As mentioned previously, players may have some restrictions on the play covered by the contract. For example, a contract may cover an hour's play at a gaming device, but require the player to make between 600 and 800 pulls in that hour. In some embodiments, however, contracts may allow players to quit early or to play more than is otherwise covered by the contract. For example, a contract might cover an hour's worth of play. After the first half-hour, the player may be ahead by $100 and wish to quit without risking the loss of the $100 in the subsequent half-hour. He may therefore opt to pay $20 in order to be released from the obligation of continuing the contract. He may then collect his $100 in winnings.

A player at a gaming device may reach the end of a contract with accumulated credits just short of an amount necessary to collect winnings. However, the last 17 out of 20 pulls may have been wins for the player. The player may feel as if he has some momentum going for him and therefore may not wish that the contract be finished. In some embodiments, the player may extend the contract. For example, the gaming device might prompt the player, saying, "For only $5 more, we'll give you another 200 spins added to your contract." If the player accepts, then the casino or insurer has made a new sale with potential profitability. In some embodiments, the player may be allowed to extend a contract for free, or may even be paid to extend the contract. For example, the player may have winnings of $100 at the end of a contract. The casino, or insurer, may figure that if the player were to keep pulling, he would be likely to lose some of that $100. So the casino may pay the player $5 to take another 200 pulls.

In a related embodiment, a player may carry over the accumulated credits from a first contract to a second contract. Thus, a player with forty accumulated credits at the end of a first contract may begin a second contract with forty accumulated credits. The player may pay or be paid for carrying over credits.

Contract Price

In many embodiments, the player pays a fixed sum to buy the contract. In exchange for that fixed sum, the player can then gamble a significant amount with little or no risk of losses. In many embodiments, the insurer takes the risk of the player's loss. The insurer must therefore price the contract so as to be compensated for the risk it takes. In other embodiments, the casino and the insurer share the profits and losses associated with a contract. To ensure a profit to be divided amongst the two, a contract may be priced in excess of a player's average win. Note that a player's loss would count as zero in figuring out the player's average win, since the player does not have to pay for losses.

One method of pricing the contract involves first figuring out what the insurer might expect to pay, on average, to cover a player's losses. Another method of pricing a contract involves first figuring out what the casino/insurer combination might expect to pay, on average, to compensate a player for his winnings. Both methods involve similar computations. Therefore, exemplary computations will be described below with respect to only one or the other method of pricing a contract.

In one example computation, an insurer obtains the gaming device or a component of the gaming device containing significant information about the operation of the gaming device (e.g., the CPU). The insurer then operates the gaming device as a player would when under contract. For example, if the insurer is to sell contracts for 600 pulls, the insurer would make 600 handle pulls at the gaming device and record the number of accumulated credits at the end of the 600 pulls. The insurer may repeat this process of testing contracts at the device for a large number of trials. The insurer may then average what its payments would be over all the trials. Note that while it might take a player days or years to complete, say, 100,000 contracts at a gaming device; the process may be sped up for the insurer by giving the gaming device special instructions to generate outcomes more rapidly. The performance of large number of trials in the manner described above is often called a Monte-Carlo simulation.

To price a contract using the method of pricing described above, for example, an insurer simulates the execution of a 600-pull contract. The insurer repeats the simulation four more times. After the first simulation, the player has won $10. After the second, the player has lost $5. After the third, the player has lost $17. After the fourth, the player has lost $8. After the fifth, the player has won $3. To figure out what the insurer must pay, on average, the insurer adds the three losses to get: $5+$17+$8=$30. The insurer then divides by five, the number of simulations, to get: $30/5=$6. The insurer doesn't care, for the purposes of this calculation, how much the player won when he did win, since the casino is the one paying the player his winnings. Now, in order to obtain an average $4 profit, the insurer might charge $10 for each contract.

In another example computation, the insurer obtains or creates software that mirrors or models the operation of the gaming device. For example, the software is configured to generate the same outcomes as does the gaming device with the same frequency as the gaming device. For each outcome generated, the software tracks what a player's accumulated credits would be. As before, the insurer may simulate many contracts and average what its payments would be over all the trials.

In yet another example computation, the insurer mathematically models potential outcomes of one handle pull of the gaming device using a random variable with a probability mass function (PMF) or probability density function (PDF). With these functions, the x-axis may represent potential winnings, such as −$1 or $3, which can occur from a single handle pull. The example of −$1 indicates the player has paid $1 for the pull but has won nothing. The example of $3 indicates that the player has paid $1 for the pull and won $4. The y-axis of these functions represents the probability or probability density of each outcome occurring. The probability of the player getting −$1 on a pull might be 0.8, while the probability of the player getting $3 might be 0.2. A PMF for the number of accumulated credits at the end of a contract can then be created by summing the random variables representing individual handle pulls. If each pull is independent with an identical PMF, as is common with slot machines, then the PMF for the results of the entire contract can be created using repeated convolutions of the PMF's for individual handle pulls. If, for example, 600 pulls are involved, then the PMF for single a handle pull may be convolved with itself 599 times to generate a PMF for the entire contract. Using this resultant PMF, the insurer can easily calculate how much it would expect to pay to cover a player's losses on each contract. If the resultant random variable is denoted by w, and the insurer would by required to pay for any player losses, then the insurer's expected payment is given by $\Sigma_{-\infty}^{0}$ w*probability (w).

In another example computation, using the method described above, Fourier Transforms, Z transforms, Laplace Transforms, or other transforms can be used to aid in the calculation of the repeated convolutions. Such a use of transforms is well known in the art.

In still another example computation method, as is well known in the art, with many classes of random variables, repeated summation results in a Gaussian probability distribution. This distribution has the shape of the familiar bell curve. The Gaussian distribution has the advantage of being fully described by only two parameters, a mean and a standard deviation. If a Gaussian probability distribution is used to approximate the sum of a large number of independent, identically distributed random variables, such as those that often describe handle pulls, then the mean and standard deviation of the Gaussian distribution is very easily calculated based on the mean and standard deviation of a random variable describing an individual pull. Such calculations are well known in the art. Thus, a Gaussian distribution can easily be generated to approximate the PMF of a player's accumulated credits at the end of a contract. Using this distribution, the insurer can calculate the amount it would be required to pay, on average, to cover a player's losses. The method of calculation is similar to that described in 3). If a Gaussian PDF is used as an approximation, then an integral sign replaces the summation sign, and "probability" is replaced by "probability density."

The following is an example of using a Gaussian probability density function to approximate the amount a casino would be required to pay, on average to, to compensate a player for his winnings at the end of a contract. The contract may then be priced in excess of this amount to ensure an average profit for the casino/insurer combination. A Gaussian function is given by the formula, $f(x)=1/\sqrt{(2\pi\sigma)}\exp(-(x-\mu)^2/(2\sigma^2))$. In this formula, $\sigma$ is the standard deviation, and $\mu$ is the mean. Now, let us suppose that a single handle pull of a slot machine results in a required payout to the player described by a probability mass function with mean no and standard deviation $\sigma_0$. Then, assuming each handle pull is independent, n handle pulls of the slot machine may be described by a function with mean $\mu=\mu_0 n$ and standard deviation $\sigma=\sigma_0\sqrt{n}$. Furthermore, if n is large, then the function describing a casino's aggregate payout after n handle pulls may be approximated by the Gaussian function f(x), whose formula is given above.

To calculate what a casino would have to pay to compensate a player for his winnings, on average, it will be noted that the casino pays when the player wins, but receives nothing when a player loses. Therefore, the expected payment of the casino is given by:

$$\int_{-\infty}^{0} 0 * f(x)\,dx + \int_{0}^{\infty} x * f(x)\,dx = \int_{0}^{\infty} x * f(x)\,dx.$$

We proceed to solve the integral:

$$\begin{aligned}
\int_{0}^{\infty} x * f(x)dx &= \int_{0}^{\infty} x * 1/\surd(2\pi\sigma)\exp(-(x-\mu)^2/(2\sigma^2))dx \\
&= 1/\surd(2\pi\sigma)\int_{0}^{\infty} x * \exp(-(x-\mu)^2/(2\sigma^2))dx \\
&= 1/\surd(2\pi\sigma)\int_{0}^{\infty} [(x-\mu) * \exp(-(x-\mu)^2/(2\sigma^2)) + \\
&\quad \mu * \exp(-(x-\mu)^2/(2\sigma^2))]dx \\
&= 2\sigma^2/\surd(2\pi\sigma) * (-1/2) * [\exp(-(x-\mu)^2/(2\sigma^2))]_0^\infty + \\
&\quad \mu\int_{0}^{\infty} 1/\surd(2\pi\sigma)\exp(-(x-\mu)^2/(2\sigma^2))dx
\end{aligned}$$

We deal with the two terms separately:

$$\begin{aligned}
2\sigma^2/\surd(2\pi\sigma) * (-1/2) * [\exp(-(x-\mu)^2/(2\sigma^2))]_0^\infty &= -\sigma^2/\surd(2\pi\sigma) * [0 - \exp(-\mu^2/(2\sigma^2))] \\
&= \sigma^2\exp(-\mu^2/(2\sigma^2))/\surd(2\pi\sigma) \\
&= n\sigma_0^2\exp(-n^2\mu_0^2/(2n\sigma_0^2))/\surd(2\pi\surd n\sigma_0) \\
&= n^{3/4}\sigma_0^{3/2}\exp(-n\mu_0^2/(2\sigma_0^2))/\surd(2\pi)
\end{aligned}$$

and $$\begin{aligned}
\mu\int_{0}^{\infty} 1/\surd(2\pi\sigma)\exp(-(x-\mu)^2/(2\sigma^2))dx &= \mu\int_{-\mu/\sigma}^{\infty} 1/\surd(2\pi\sigma)\exp(-y^2/2)\sigma dy \\
&\quad (\text{where } y = (x-\mu)/\sigma) \\
&= \mu\surd\sigma\int_{-\mu/\sigma}^{\infty} 1/\surd(2\pi)\exp(-y^2/2)dy \\
&= \mu\sqrt{\sigma}\left[1 - \int_{-\infty}^{-\mu/\sigma} 1/\surd(2\pi)\exp(-y^2/2)dy\right]
\end{aligned}$$

The integral is the cumulative distribution function for a zero mean, unit standard deviation Gaussian, for which tables exist. We denote it by $N(-\mu/\sigma)$. Continuing to solve the integral:

$$\begin{aligned}
\mu\int_{0}^{\infty} 1/\surd(2\pi\sigma)\exp(-(x-\mu)^2/(2\sigma^2))dx &= \mu\surd\sigma[1 - N(-\mu/\sigma)] \\
&= n\mu_0 n^{1/4}\surd\sigma_0[1 - N(-n\mu_0/(\surd n\sigma_0))] \\
&= n^{5/4}\mu_0\surd\sigma_0[1 - N(-\surd n\mu_0/\sigma_0)]
\end{aligned}$$

Recombining the two terms we get:

$$\int_{0}^{\infty} x * f(x)\,dx = n^{3/4}\sigma_0^{3/2}\exp(-n\mu_0^2/(2\sigma_0^2))/\surd(2\pi) + n^{5/4}\mu_0\surd\sigma_0[1 - N(-\surd n\mu_0/\sigma_0)]$$

If we were to graph the above as a function of it the number of pulls, we would see that initially, as the number of pulls in a contract gets larger, a casino could expect to pay more money to compensate a player for his winnings. However, there would reach a point, beyond which more pulls in a contract would actually decrease the amount a casino could expect to pay to compensate a player for his winnings. This illustrates one feature of some types of contracts: Having more pulls in a contract is not necessarily an advantage for a player.

In another example computation, a casino or insurer may start with a first price for a contract, and then evolve the price as more and more of the contracts are purchased and executed. For example, if an insurer loses money on the first few contracts it sells, then it may increase the price of the contract. If the insurer makes large profits on its first few contracts, then it may reduce the price.

Other types of computations may be readily apparent to those skilled in the art in light of the present disclosure. Once the insurer has determined what it can expect to pay, on average, to cover a player's losses, the insurer may price the contract so as to give itself a desired profit margin. For example, if the insurer can expect to pay, on average, $15 to cover a player's losses, then the insurer might price the contract at $20 to insure itself a $5 average profit.

Bankroll

As discussed variously herein, according to one or more embodiments of the present invention, a player may establish a contract in which an amount of funds or a credit balance for use in executing the contract is established (e.g., a bankroll). For example, a player signing up for a contract may provide $250 at his slot machine (e.g., using a credit card) as a $250 bankroll for use in generating outcomes during a contracted session to generate fifty outcomes per week at a one-dollar denomination slot machine. In this example, the casino will charge $1 to the bankroll for each outcome generated, and will add any winnings from the outcome to the bankroll. In another example, a player purchases a contract for $50 and a balance of one thousand credits is established for use in executing game plays in accordance with the contract.

The value of a bankroll (which may include accumulated credits from winnings) will typically vary during execution of a contract. As discussed herein, if the value of a bankroll is greater than a predetermined threshold, all or a portion of a bankroll may be returned to a player at the termination of a contract, or at any time. In some embodiments, all or a portion of a bankroll may be distributed to the player in accordance with a payment schedule.

Automatic Play

A contract may require certain behaviors of the player. As mentioned, these behaviors may include maintaining a certain rate of play, or performing a minimum number of handle pulls. The gaming device on which a contract is executed may take various steps to ensure that the behaviors are performed. To this end, the gaming device may initiate handle pulls automatically or may fail to register handle pulls that the player attempts to initiate. For example, if the player must make at least one handle pull every 10 seconds, and the player has failed to make any handle pulls in 9 seconds, then the gaming device may automatically initiate a handle pull for the player on the tenth second. As another example, a player may be restricted from making more than one pull every 10 seconds. If in the same 10-second interval, the player attempts to make more than one handle pull, the second handle pull may not be initiated, at least until the next 10-second interval.

As can be seen from the above two examples, the player may maintain some control over his gambling behavior even while the gaming device forces him to comply with the contract. So a player who must make a pull every 10 seconds still has control over whether the pull occurs on the first second of an interval or the eighth second of an interval. Such control can be psychologically important, because many players feel that the exact moment at which the handle pull is initiated has an important effect on the ultimate outcome.

In some cases, a player may not desire to make any active decisions once a contract has been initiated and may simply put a gaming device into "automatic play." The player may later have the option of taking the gaming device out of automatic play and of manually initiating handle pulls.

Offering the Contract

A contract may be offered to a player in a number of ways. A gaming device may use text or synthesized voice to ask a person whether or not he would like to sign up for a contract. A casino attendant may offer a contract to a player, or signs at a casino may point a player towards a casino desk where he may then purchase a contract.

A number of circumstances may trigger the casino or an insurer to offer a contract to the player. For example, the player may have lost most of an initial stake deposited into a gaming device. A player may be slowing his play, or may no longer be inserting coins into the machine. The time of day may be a player's typical lunch time or departure time, and the player may be offered a contract at that time. It will be understood that information about a player's gaming history and habits may be stored, for example, in a player database.

In some embodiments, a player may have the opportunity to enter into a contract only if he also agrees to do business with a particular merchant or group of merchants. In one embodiment, a player may have the opportunity to enter into a contract if the casino or insurer deems him a good, valuable, or loyal customer.

In one embodiment, a player may be offered a contract when he checks into a casino hotel. The contract may be tailored to the player's planned itinerary. For example, if the player intends to stay for four days, then the casino may offer the player a contract which will take four days to complete. One such contract would require the player to play for three hours during each of the four days of the player's planned stay. This contract benefits the casino by committing the player not only to staying at the casino for the planned length of his stay, but also by committing the player to at least some gambling at the casino during each of those four days.

The player may also be offered the contract at other areas of the casino. When a player first enters the area of the casino floor containing slot machines, a casino attendant may ask the player whether or not he would like to sign up for a contract. A designated area near the slot machines on a casino floor may be called a "slot welcome center". Players may sign up for a contract at a slot welcome center. When a player goes to a casino desk to buy chips or to trade-in chips, he may be offered a contract. A player may also be offered a contract when eating at a casino restaurant, when sitting at a table game, when checking in luggage, when lounging by the pool, and so on.

A player may be offered a contract while at a kiosk, especially while at a kiosk on the casino floor. For example, the player may be at a kiosk in order to look up show times, or in order to find directions to the nearest golf course. While the player is at the kiosk, the kiosk may display an offer describing a contract and asking whether or not the player would like to enter into the contract.

A player may also be offered a contract while accessing the Internet using a personal computer (or other communication device). For example, the player may be at a Web site hosted by a casino server in order to reserve a room at the casino's hotel. The casino server may then transmit a signal to the player's personal computer, causing an offer to be displayed to the player. Again, the offer may describe a contract and ask whether or not the player would like to enter into the contract.

Agreeing to the Contract

A player may specify a desired contract in a number of ways. At a gaming device, a player may use a touch screen to indicate his desire to enter into a specific contract. Using the touch screen, the player may select from a menu of possible contracts. For example, the menu might list several contracts with different time durations or different prices. The player could then select a contract by touching an area of the screen next to his desired contract. Of course, rather than a touch screen, a player may use special buttons, keys, or voice input devices to specify a desired contract and/or contract term(s). Other types of input devices will be readily apparent to those skilled in the art.

The player might use menus to customize a contract for himself For example, the player might use a first menu to select a duration of the contract (e.g., 600 pulls, or ½ hour). A second menu might be used to select a rate of play. A third menu might be used for coin denomination. Many other menus are possible for other contract features. Once the player has selected several contract features, the gaming device may select the remaining feature so as to make the contract profitable for the insurer. For example, once the player has chosen a number of pulls and a coin denomination, the gaming device might choose the price of the contract.

In some embodiments, a player chooses a contract prior to approaching the gaming device or even the casino. A player might select a contract on the Internet. For example, the player might select a contract while visiting the Web site provided by the casino server. On the Internet, the player might specify terms of the contract, such as the number of pulls, the rate of play, the cost, the payout tables, the winning symbol combinations, etc. Of course, as discussed above, some terms may be presented to the player via the Internet.

According to one embodiment, after accepting a contract, the player may then print out a code or a document describing the terms of the contract. The player then brings the code or document to a gaming device that then recognizes what contract the player has chosen. When the player signs up for a contract, a description of the contract might be sent electronically directly to the gaming device. The player might then only identify himself at the gaming device in order to initiate contract play.

Other terms of a contract a player may agree to or specify include: the font size of the machine, the noise level of the machine's sound effects, the particular game (e.g., number of reels, number of pay lines), the brightness of the display, etc.

According to one embodiment, when accepting a contract, especially a contract in which the player will be remote from the casino as outcomes are generated for him, the player may be asked to provide an email address, address, phone number, etc., to which generated outcomes and other session information may be sent.

According to one embodiment, to confirm entry into a contract, a player might sign a document that may contain the terms of the contract. The document may be printed from a gaming device or from the Internet, or may be obtained from a counter at a casino. The signed document may then be deposited into an opening in the gaming device, may be returned to a casino counter, or may be kept by the player. The player might also sign an area on a touch screen or other sensing device.

According to various embodiments of the present invention, a player may confirm acceptance of or entry into a contract by paying for it. The player might pay by depositing tokens, coins or other currency into the gaming device. The player might pay using a credit or debit card. The player might also pay from a player credit account established with the casino. The player might pay at a counter of the casino. In some embodiments, a player may receive a contract or a contract indicator (e.g., a token or symbol) to bring to a gaming device. The gaming device might then recognize the contract indicator, for example, a bar code, and then execute the corresponding contract.

In some embodiments, payment for a contract need not necessarily be paid upfront (e.g., before execution of a contract is initiated). A player may commit to paying in the future, for example, or may agree to a payment schedule of one or more installments. According to one embodiment, a player might provide payment for a contract only under certain specified conditions, such as if the player has lost money during execution of the contract. Some exemplary payment schedules, without limitation, are as follows:

- The player agrees to pay the full price of the contract at some designated future date
- The player pays a fixed percentage of the full price of the contract on a periodic basis until the full price of the contract has been paid off
- Interest accrues on any unpaid portion of the contract price.
  - The player pays a fixed amount on a periodic basis until the price of the contract and any accrued interest on the unpaid portion of the contract's price has been paid
- The player pays a portion of the contract price on a periodic basis, and the required payments are modulated based on the player's current winnings from the contract. In one example, during any given scheduled pay period, the player might pay 10% of the contract price if his net winnings from the contract are negative, but only 5% of the contract price if his net winnings from the contract are positive. Then, at the termination of the contract, if the player has not paid the fall amount for the contract, the rest of the price of the contract is deducted from the player's winnings. If the player's winnings still do not cover the remaining price of the contract, then the player is billed for the rest of the price of the contract.

In some embodiments, if the player is to make future payments in order to pay for a contract, the future payments are charged automatically by the casino server to a financial account of the player. A player's financial account might include a credit card, debit card, or checking account, for example. The player may further agree not to close his financial account before payment for the contract has been completed. Also, as discussed herein, any player winnings may be added automatically to the player's financial account according to the terms of the contract.

Instruction Sets

A typical contract may cover and/or require a large number of handle pulls by the player. Ordinarily, when a player is gambling at a gaming device for a long period of time, the player makes a number of decisions related to his gambling. For example: Should the player play more quickly or more slowly? Should the player double his bet after a loss? Should the player quit after a sizable win? Should the player take a short break to use the restroom?

Since the contract may cover a large number of handle pulls, it is possible for the some player decisions to be made beforehand and included in the contract. A gaming device may then act on the decisions specified in the contract without further input from the player. For example, while negotiating a contract for an hour of play at ten pulls per minute, a player might decide he would like a fifteen minute break between the first half-hour and the second half-hour of pulls. The gaming device might then execute the contract for the first half-hour by automatically spinning and generating outcomes for the first half-hour. The gaming device might then freeze or lock up for fifteen minutes, preventing other players from stepping in and allowing the contract holding player to take his fifteen minute break. The device can then unlock after fifteen minutes, perhaps with the entry of a password, and resume the generation of outcomes.

One advantage of having a player's decisions spelled out before hand in a contract is that the player need not even be present at the gaming device. For example, a player can sign up for a contract at a casino in Las Vegas, and then have the contract executed automatically by a gaming device. In some embodiments, as discussed herein, a player can then view a running tally of his accumulated credits over the Internet while in Virginia, for example.

In general, player instructions associated with a contract will include some action to be performed as well as some triggering condition for the performance of the action. As an example, a player instruction may be to increase the rate of handle pulls provided accumulated player credits exceed one hundred. In this example, the action is to increase the rate of handle pulls, and the triggering condition is whether accumulated player credits exceed one hundred. The following exemplary player actions may be part of a player's instructions:

- Increase or decrease a wager amount on one or more handle pulls
- Increase or decrease a rate of wagering
- Cease gambling (e.g., terminate the game play session)
- Change the way outcomes are displayed
- Send a portion of the player's bankroll to the player
- Increase or decrease the rate at which outcomes are generated
- Increase or decrease the rate at which outcomes are transmitted to the player device
- Increase or decrease the rate at which outcomes are displayed to the player
- Change the times at which outcomes are displayed to the player. For example, change the times of display from business hours to evening hours
- Cease generating outcomes on one gaming device, and commence generating outcomes on another gaming device
- Transmit only winning outcomes for display to the player The following exemplary conditions may trigger the above actions:

- The player has just won or lost on one or more handle pulls
- The player has just won a certain amount on one or more handle pulls
- Any player defined sequence of wins and losses has occurred on prior handle pulls
- The player has approached or left the vicinity of the gaming device.
- The current time has reached a particular time of day
- The player's net or gross winnings have exceeded a certain level, or have fallen below a certain level
- Some external event has occurred. For example, the Yankees have hit a home run, the Dow Jones Industrial Average has exceeded 20000, and so on According to some embodiments, an advantage of contracts executed by a gaming device is that a gaming device can gamble at speeds a human is incapable of achieving. For example, a player is on a winning streak, but must soon join his family for lunch. Rather than cash out and leave, he decides to accelerate his play to 2 pulls per second. He therefore enters into a contract which is to be executed by the machine at two pulls per second for the next eight minutes. In this example contract, an insurer is not involved. The contract simply serves as a means of increasing the rate of play. As it happens, the player loses all his money in six minutes, and so the contract ends.

Player instructions may tell the slot machine to play faster when the player is present or is observing in some way, and to play more slowly while the player is asleep. For example, the rate of pulls may be twice as fast during the day as at night. The rate of play may likewise be faster when an infrared detector in the slot machine senses the heat of the player's presence.

Player instructions may also tell a gaming device how to play certain games involving player decisions. For example, a player may leave instructions to use basic strategy in a game of video blackjack, or to play according to published theory in a game of video poker. For instance, the player may add instructions to always draw to a four card open-ended straight flush.

Times of Execution

A contract may be executed over a range of different time periods. The outcomes, the accumulated player credits, and the player winnings may or may not be displayed to the player at the same time at which the outcomes are being generated.

In one embodiment, all the outcomes needed for a contract are generated very rapidly by a gaming device, perhaps all in less than a second. The outcomes may then be displayed to the player over a much longer time frame so as to give the player a more exciting gaming experience.

In another embodiment, outcomes may be continuously generated at a rate comparable to that with which a player might make handle pulls on his own. This embodiment might be entertaining for a player if the player is sitting at the gaming device or watching the outcomes being generated from a home computer.

In another embodiment, outcomes are generated on a periodic basis at fixed times every day, week, hour, etc. For example, outcomes for a 600-pull contract may be generated one hundred outcomes at a time, each block being generated from 8 pm-9 pm on Sunday. Thus, it would take just under six weeks for the entire contract to be executed. This method of execution may be ideal if a player has a schedule as to when he enjoys watching outcomes being generated. For example, the player might enjoy seeing outcomes generated while he watches his favorite show on Sundays from 8 pm to 9 pm. This method of execution might also be ideal for the casino if slow business periods occur on a periodic basis where the entire contract cannot be executed in a single period.

In still another embodiment, outcomes are generated on a flexible basis, either when it is convenient for the casino or for the player. In this embodiment, the casino may wait for a gaming device to be free of use before using it to generate the next couple of outcomes of a contract. Alternatively, the player may signal the gaming device any time he is ready to have the next few outcomes generated

Viewing the Contract's Execution

As discussed herein, a player may enjoy viewing information about the player's game play session from a remote location. For example, a player may be able to watch as the outcomes of his contract(s) are generated. Since the player is not physically at the slot machine, the outcomes may be presented to the player via some graphical representation.

According to one embodiment, a camera simply films the gaming device generating the player's outcomes. The image from the camera is transmitted to the player device via the Internet, the cable system, satellite, etc. The player device might be, for example, a television, a personal computer, a car radio, a cell phone, a watch, or a personal digital assistant (PDA).

In another embodiment, the generated outcomes are recorded either by the gaming device, by a camera watching the device, or by a casino employee. The generation of the outcomes is then graphically recreated for the player in a manner not necessarily consistent with the physical appearance of the gaming device that generated the outcomes. For example, a gaming device generates the outcome: "CHERRY-ORANGE-LEMON." The gaming device then transmits, via the casino server and the Internet, a bit sequence indicating the outcomes cherry-orange-lemon. Perhaps the bits "0000" represent "CHERRY," "0011" represent "ORANGE," and "1111" represent "LEMON." The bit sequence is transmitted to a player's home computer, where a software program displays a cartoon representation of a slot machine. The cartoon shows the reels spinning and stopping with the outcome: cherry-orange-lemon. The cartoon representation of the slot machine may not look anything like the slot machine that originally generated the outcomes.

In some embodiments, a player views a combination of the actual image of his gaming device, and a computer-rendered version of a gaming device. For example, a cartoon of the reels spinning might be displayed within the frame of an actual image of the slot machine, without the reels.

In some embodiments, the player does not view a graphical representation of the outcomes, but sees the outcomes as text, such as "seven-bar-bar," "s-b-b," "7-b-b," etc. The player may not even see the outcomes, but may be able to view how much he has won or lost on each pull. Thus, the player may view a periodically updated tally of his accumulated credits. In some embodiments, he may only view his total accumulated credits, or his take home winnings, after all outcomes have been generated.

Any graphical or textual representation of the player's outcomes, accumulated credits, or other contract information may be displayed either on an entire portion of a computer or television screen, or on a smaller portion of the screen. For example, a small cartoon slot machine may reside in a box in the upper right hand corner of a television screen that simultaneously displays a regular television show. A player watching television need then only glance up at the corner of his screen to follow the progress of his contract.

Representation of outcomes may also be placed in an email message to the player.

Of course, the various representations of outcomes may be used just as well with a player physically present at the gaming device or at the casino. In some embodiments, a player may be able to view session information at a gaming device that is different than the gaming device(s) at which the contract is being executed.

In some embodiments, the player calls up a number to monitor the progress of his contract. He may enter a code or password when prompted by a voice response unit (VRU) and thereby access the outcomes from his particular contract.

According to some embodiments, a player may be sent session information or other updates on his contract only when certain triggering conditions are met. For example, a player may only wish for updates when he wins more than one hundred credits on a spin, or when the contract terminates.

According one or more embodiments of the present invention, outcomes generated during a game play session, or other types of session information, may be represented using the metaphor of the stock ticker symbol. For example, a player's net or gross winnings could be displayed within a narrow band of a display device of a computer or slot machine. The display of the winnings might move across the band, e.g., moving from the left part of a display screen to the night, before disappearing.

A player's net winning could also be shown together with a positive or negative number indicating the change in the player's winnings since the last outcome was generated. An exemplary display might read, "39+¼", indicating that the player has net winnings of 39 dollars, having won a net of 25 cents on the last handle pull (after factoring in the cost of initiating the handle pull).

In some cases, the winnings for the last pull represent the gross winnings for the pull (where the cost of initiating the handle pull is not factored in), and are therefore always shown to be either zero or positive, assuming there are no negative paying outcomes. However, the display of the net winnings for a contract may go down to reflect the cost of initiating a handle pull. For example, two consecutive displays for the same contract might show, "26+2", and "25 0". The first display shows the player to have net winnings of 26 credits for a contract, having just made a handle pull that had a payout of two credits. The second display shows the player to have net winnings of 25 credits for a contract, having just made a handle pull that had a zero payout. The player's net winnings for the contract have been reduced by one from the time of the first display to the time of the second display because of the cost of initiating the handle pull that resulted in the outcome paying zero credits. Note that a display for information about a contract might read, "−59 0". This display indicates that the player's net winnings for the contract are negative.

A ticker might display many types of information for a player. Such information might include the number of winning outcomes achieved, the number of losing outcomes achieved, the difference between the number of winning and losing outcomes, the number of outcomes paying more than fifty credits, and so on. The ticker might also display a representation of an outcome achieved, for example, on the most recent spin of the contract. For example, the ticker displays three cherry symbols, or the text "c-c-c" to represent an outcome of three cherries.

Additionally, the player might have a contract executing on multiple different gaming devices. For instance, a contract might execute on a Monopoly™ slot machine and on a fruit slot machine. Then, the ticker might display separate statistics for each slot machine. Each slot machine might have its own ticker symbol too, where "MPLY" might stand for Monopoly, and "F" for fruit. The player might make up his own ticker symbols, such as "LCKY", or "JKPT", to describe different slot machines or to designate other statistics.

The display of the progress of a contract may be updated periodically. Updates to session information may occur after every spin in a contract, after every 5 spins, or after any other designated number of spins. Updates may also occur at periodic time intervals, such as every five seconds, every ten seconds, every minute, etc.

According to some embodiments, updates to session information may occur whenever certain statistics about the contract meet predetermined criteria. For example, updates may occur whenever a player's net winnings reach a multiple of ten credits, whenever the player has won on three consecutive spins, or whenever the player achieves a particular outcome. Updates may also occur upon player request. In one embodiment, a display of the progress of the contract moves across a player's display screen (e.g., at a gaming device) from left to right. When the display goes off the right edge of the screen, the display may be updated, and the updated display may then appear on the player's screen from the left side. In some embodiments, outcomes may be presented to a player in an order other than the order in which they were generated. For example, the slot machine might generate all of a player's outcomes in advance. Then, the slot machine shows the outcomes to the player beginning with the losing outcomes and progressing up through the largest winning outcomes. The reordering of the presentation of outcomes can add psychological impact to the player's viewing experience. For example, by seeing all the losing outcomes first, and the winning outcomes last, the player ends his viewing experience on a high note.

In another embodiment, outcomes are presented to the player beginning with the highest paying outcome and continuing through to the losing outcomes. In still other embodiments, winning and losing outcomes are displayed in an alternating fashion so that there is no string of losing outcomes greater than a predefined length. For example, no more than five losing outcomes are displayed in a row so as to lessen the likelihood of player frustration.

In an alternate embodiment, all of a player's outcomes need not be generated in advance. Rather, only blocks of outcomes of a predetermined length are generated in advance.

Then, the blocks of outcomes are reordered and presented to the player. For instance, one hundred outcomes are generated sequentially on a first day, reordered, and then presented to the player. Then, on a second day, one hundred more outcomes are generated sequentially, reordered, and then presented to the player.

As discussed herein, a player may specify when signing up for the contract how outcomes are to be presented to him. Alternatively, the casino server, gaming device, or player device may decide on the order. Either the casino server, the gaming device, or the player device may reorder the outcomes before they are presented to the player.

In some embodiments, a player may request the presentation of specific types of outcomes after having signed up for a gaming contract. For example, the gaming device may generate 200 outcomes for the player and then transmit indications of the outcomes to a player device, which stores indications of the outcomes. The player device does not yet, however, reveal the outcomes to the player. Then when it suits the player, the player may request that his player device show him an outcome that resulted in a win of fifty or more credits, for example. The player device may ten choose such an outcome if it exists. If multiple such outcomes exist, then the player device may choose one, e.g., the earliest such outcome generated, the highest paying such outcome, the lowest paying such outcome, etc. Alternatively, the player device may display several or all of such outcomes. If no outcomes match the player's request, then the player device may inform the player that there are no outcomes that resulted in a win of fifty or more credits. In such a case, the player device might ask whether or not the player wishes to see outcomes of a different category, e.g. an outcome resulting in a win of forty or more credits.

In another embodiment, if no individual outcomes match a player request, then the player device might combine outcomes so as to match the player request. For instance, the player device combines an outcome paying twenty credits and an outcome paying thirty credits, and creates a fifty-credit outcome, which it then displays to the player. The player device might also create a sister outcome, paying zero credits, in order to keep the total number of outcomes constant In some embodiments, rather than informing the player that there are no such outcomes, the player device might transmit a request to the casino server and/or the gaming device to generate more outcomes of the contract until an outcome matching the player's request is generated. This may cause the gaming device to generate outcomes faster than was originally intended by or executed under the contract. After generating an outcome meeting the player's request, the gaming device may then resume generating outcomes at a rate intended by the contract. In some cases, the gaming device may even slow the generation of outcomes until a point in time is reached when the number of outcomes having been generated matches the number of outcomes that the contract intended to have been generated at that point in time. Then, outcome generation may resume on schedule. If the gaming device generates all of the outcomes called for in the contract and still no outcome matches the player's request, then the player device might now inform the player that no outcomes matching the player's request actually exist.

The ability of a player to request the display of particular types of outcomes allows the player to provide himself with psychological boosts at opportune times. For instance, if the player has had a bad day with his car breaking down, then the player may request to see a high-paying outcome. Seeing the winning outcome may help to alleviate the pain associated with being stuck roadside in the rain waiting for assistance. A player may request to see one or more losing outcomes when she is in good spirits and better able to absorb some bad news.

In some embodiments, the player does not request a winning outcome explicitly, but asks to see a random outcome from a pool of outcomes, where the pool of outcomes is categorized in some fashion. For instance, the player device may receive a sequence of two hundred outcomes. The player device might then divide these two hundred outcomes into two pools of one hundred outcomes each, in such a way that the average payout among the first pool of outcomes is 0.75 credits higher than the average payout among the second pool of outcomes. Therefore, if a player wished to see a winning outcome, he would ask for an outcome from the first pool of outcomes. Then, although he would not be assured a winning outcome, he would, under normal circumstances, be more likely to see a winning outcome coming from the first pool than coming from the second pool.

In some embodiments, the player device is programmed to display outcomes conditioned upon the occurrence of certain events, such as external events whose occurrence is independent of the game play session. A player may be able to specify types of events in which the player is interested. For example, the player might be a fan of the New York Yankees baseball team. During a Yankees game, the player device, e.g., his television, may display a winning outcome to the player every time the Yankees score a run. The player device may also show losing outcomes to the player every time the opposing team scores a run. In this way, the player experiences similar emotions in reaction to both events of the baseball game, and in reaction to his outcomes.

It should be noted that the casino server or the gaming device could just as well be programmed to time the generation or the display of outcomes to external events. For example, the gaming device might maintain a pool of generated outcomes. The gaming device might then send particular outcomes from among the pool only in response to external events, such as the occurrence of a home run in a Yankees baseball game. Then, the player device would need not track external events, but could simply display outcomes to the player as they are sent.

In some embodiments in which the communication of session information (e.g., outcomes) is linked to the occurrence of an event, the player device, the gaming device, or the casino server might have a limited number of stored player outcomes to work with. The player device (or the other devices) must then determine how best to display (or transmit) these outcomes to the player so as to synchronize with uncertain external events. Therefore, in one embodiment, the player device determines the statistical likelihood of uncertain future events, and uses the measure of likelihood to determine which outcomes it should display to a player during any given event. For instance, in the above example, the player device may perform an analysis of prior Yankee games during the season and conclude that the Yankees average only two home runs per game against their current opponents. Therefore, the player device might decide that it is safe to display a winning outcome to the user upon the Yankees' first home run, even though only two winning outcomes remain to be displayed in the rest of the game.

In some embodiments, if the player device is faced with a shortage of outcomes to display for a given event, then it waits for events of higher importance before displaying outcomes. For instance, the player device might anticipate seven Yankee home runs against the current opponents, but only three two-run home runs. Therefore, the player device might save the winning outcomes and display them only during the more important events. In some embodiments, the player device might save winning outcomes for certain important events that, as it happens, do not occur with the expected frequency. For example, even though the player device has anticipated three two-run home runs from the Yankees, the seventh inning has passed without any two-run home runs having been hit by the Yankees. In this case, the player device might then lower the threshold of an event's importance before displaying outcomes. For example, the player device might now display a winning outcome upon any Yankee hit, or upon any strikeout of an opposing batter.

There are many other possible algorithms a player device might use to determine what outcomes to display in conjunction with any given external event. Of course, once again, the key decision may lie with the gaming device or casino server rather than with the player device. For instance, the casino server decides when to transmit a winning outcome to the player device, and then the player device blindly displays the outcome.

In some embodiments, a pool of outcomes available for display is also expanding during the course of an external event. For instance, a player device might have available for display twenty user outcomes. Additionally, the player device is receiving one new outcome every five minutes from the casino server. Thus, not only may the player device predict the occurrence of future external events, but may also predict the occurrence of particular outcomes or categories of outcomes. For example, when the Yankees hit a home run, the player device might see that it has only three winning outcomes available for display. But it might anticipate receiving ten more winning outcomes from the casino server over the course of the baseball game after considering the average length of baseball games, the rate at which it is receiving outcomes, and the expectation of any outcome being a winning outcome. Therefore, the player device might be more liberal with its display of winning outcomes than it would be were it not receiving new outcomes from the casino server.

There are many ways in which a player device, gaming device, or casino server might become aware of external events so as to synchronize the generation or display of outcomes with such events. In one embodiment, a player simply informs the player device when an external event occurs. For example, a player watching a baseball game might key in a sequence of numbers to the remote control of his digital video disk (DVD) player. In this example, the DVD player has an Internet connection to the casino server and functions as the player device. When the DVD player receives the code from the remote control (e.g. via infrared link), then the DVD player may interpret the code as a home run for the player's favored team, and may then cause a winning outcome to be displayed in the upper right-hand corner of the player's television screen. In another embodiment, a casino employee tracks various external events, such as sporting events, and transmits a message to one or more player devices via the casino server upon the occurrence of a significant external event.

In some embodiments parties other than a player (or players) who are party to a contract may also view outcomes. For example, in establishing the contract, the player may provide the names, addresses, email address, or other information about other parties to whom the outcomes are to be shown. Then, as outcomes are generated, the casino server may transmit the outcomes for viewing to all parties authorized in the contract. In this way, a player may allow friends or relatives to view his outcomes. This may create additional excitement for the player and her relatives. One convenient means to transmit outcomes to a group friends is for the casino server to post the outcomes to a chat room. The chat room may be a private chat room designated only for the player's group of friends.

As discussed herein, the outcome data transmitted to the player device may include not only the indicia generated by the gaming device, but also the payout corresponding to the outcome. In addition, the gaming device or the casino server may transmit to the player device information about prizes the player might purchase or elect to receive in lieu of winnings. For example, suppose the player receives an outcome paying $100 dollars and is therefore due to receive a check from the casino for $50, as the player has elected to immediately receive half the payout for any outcome exceeding $80. Before sending the check, the casino may transmit an offer to the player device asking whether the player would rather receive a digital camera that retails for $100 instead of the $50 check. If the player indicates that he would rather receive the prize than the cash payment, then the casino may arrange for the prize to be sent to the player. The casino may, for example, contract with a third party merchant, paying $40 to the merchant if the merchant will ship the camera to the player. The casino then makes a $10 profit.

In some embodiment, the player is playing for prizes to begin with, rather that for cash payouts. In these embodiments, outcome data may include information about prizes the player has won. Such information might include pictures of the prizes, information about when the prize will be shipped to the player, information about the construction of the prizes (e.g., 14-carat gold), and so on.

In some embodiments, the gaming device, the casino server, and/or the player device may present outcomes to the player as if they had originated from a gaming device or from a game other than that from which they actually did originate. For example, the player device may receive the outcome "7-7-7" from a fruit slot machine, but present the outcome as "sushi-sushi-sushi". An outcome of "sushi-sushi-sushi" might occur on a slot machine with a cooking theme. Furthermore the outcome "sushi-sushi-sushi" may provide a similar or equivalent payout on the cooking slot machine as does the outcome "7-7-7" on a fruit slot machine.

There are several possible reasons that the gaming device, casino server, or player device might wish to present outcomes to players as if they originated from other gaming devices. A player may simply prefer one type of gaming device to another, and therefore may prefer viewing outcomes looking as if they came from the preferred gaming device, even though the outcomes did not. The casino may also wish to advertise a new type of gaming device. Therefore, the casino may present outcomes as if they came from the new gaming device in order to acquaint the player with the new device. If the player happens to have a string of good outcomes, then the player may be even more likely to try the new gaming device. Therefore, in some embodiments, the casino presents one category of outcomes (e.g., winning outcomes) as if they came from a first gaming device, and a second category of outcomes (e.g., losing outcomes) as if they came from a second gaming device. In this way, the casino may be able to influence the player's perception of the two gaming devices.

In some embodiments, a player initially receives the outcomes of a contract by downloading them into a player device directly from a casino device. For example, the user inserts a floppy disk or a compact disk into a disk drive on a slot machine. The slot machine then downloads one thousand outcomes onto the disk provided by the player. The player may then take the disk to his home personal computer, for example, and view the downloaded outcomes at his leisure. In some embodiments, the device on which the outcomes are downloaded has its own display capabilities. For example, a player might download outcomes directly from a slot machine onto a personal digital assistant (PDA), and may then view the outcomes on the display screen of the PDA.

At the moment a player downloads outcomes from a slot machine, the outcomes may already be resolved. That is, the player's payout for each outcome may already determined. The player may therefore receive his net payout immediately, or may receive it at some later time, e.g., after having viewed all of the outcomes.

In some embodiments, the player receives the net payout prior to viewing all the outcomes, but the payout is kept hidden from the player. For instance, the player's net payout from the outcomes is transferred directly into a financial account of the player's, without the player seeing the amount of the transfer.

In some embodiments, the player must request to receive the payout. Along with his request, the player might need to submit a code or other identifier proving that he is the owner of a particular outcome or a set of outcomes that entitles the player to the requested payout. For example, a player might download one hundred outcomes from a slot machine, and might then view them on his personal computer a week later. The personal computer may then display a code that had been provided along with the outcomes. The player might then send the code to the casino server. The casino server might then match the code to a corresponding set of outcomes stored in a database, and determine the net payout associated with the group of outcomes. The casino server may then send a check to the player for the amount of the net payout.

In another embodiment, a player might download to a player device a program for generating outcomes, where the outcomes have not yet been resolved. In other words, at the point in time at which the player downloads his outcomes, the player's net payout has not yet been determined. Then, outcomes may be generated on the player device according to a predetermined schedule, or as the player desires. Outcomes may be generated, for instance, with the help of a random number generator stored on the player device.

In some embodiments, a player does not download outcomes straight from a slot machine, but instead downloads outcomes from a kiosk, vending machine, or other machine on or off the casino floor which is configured to generate and/or store outcomes for downloading.

Revenue Management

As discussed herein, the pricing of a contract will often take into account the expected amount an insurer must pay to a casino to cover a player's losses, or the expected amount that a casino and insurer in combination can expect to pay to compensate the player for his winnings. Pricing of contracts may account for additional factors such as, for example:

Times or dates on which the contract is to be executed.

The gaming device on which the contract is to be executed

Flexibility in the contract's execution.

A player's playing history.

The importance of the player as a customer of the casino.

For example, a contract which is to be executed during a period of low customer activity at a casino may be priced at a discount. This is because a casino would like to encourage the use of gaming devices that are otherwise empty. Alternatively, a casino may want to discourage the purchase of contracts during times of high customer traffic, and so contracts may be higher priced at such times.

If a contract has flexibility as to when it may be executed, then this allows the casino to execute contracts only during times when gaming devices would not otherwise be in use. Therefore, such a contract might be priced more favorably.

A contract that is executed at an unpopular gaming device, for example, might be priced more favorably for the player so as to encourage the use of that device.

If a player shows signs of nearing the end of his gambling session, a contract might be priced at a discount for that player. For example, a player might be slowing his rate of play, indicating boredom. A player might be lowering his wager size, indicating a decreasing bankroll. A player might simply have been at a gaming device for such a long time that he would almost necessarily be hungry enough to leave at any moment. Providing a discount on a contract to such players would encourage them to remain gambling for at least the time it takes to execute the contract.

Modifying the Contract

Once a player has entered into a contract, he may have the opportunity to modify one or more terms of the contract. He may modify the terms in some cases before the casino has begun to execute the contract (i.e. before the casino has generated any outcomes associated with the contract), and in other cases even after the casino has begun to execute the contract. Such terms may include, without limitation, a specification of:

- the manner in which outcomes are to be displayed to the player. For example, are outcomes to be displayed as indicia, as numerical winnings, in large font size, etc.?
- the times at which outcomes are to be transmitted to the player
- the times at which outcomes are to be displayed to the player
- the other people to whom the player's outcomes are displayed
- the ritual a casino attendant is to perform before generating an outcome for the player
- the individual machine on which outcomes are generated
- the person, or entity to whom the player's winnings or leftovers are to be paid
- the times at which a player is to pay for the contract
- the amount a player is to pay for a contract during any given pay period
- the times at which a player is to receive payment of his winnings or leftover bankroll
- the amount of payment a player is to receive from his winnings or from his bankroll during any given time period
- the number of other people that may receive outcomes from the same gaming device generating the player's outcomes
- the seed to be used by a random number generator in a slot machine for generating outcomes Other exemplary terms of the contract potentially modifiable by the player include:

- the number of pulls to be made in the contract
- the amount of money to be wagered on each pull
- rules for adjusting the bet size based on prior outcomes and any other terms a contract may contain.

In some embodiments, a player is allowed to modify some terms of the contract, but not other terms. In one embodiment, a player remote from the casino, such as a player out of the casino's gambling jurisdiction, is restricted to modifying terms of the contract that may be construed as non-gambling information.

In some embodiments, a player authorizes one or more agents to act on his behalf with respect to a contract (e.g., provides another party with power of attorney privileges). Among the rights that may be authorized is the ability to modify one or more terms of the player's contract on behalf of the player. For example, even when a player is remote from a casino (e.g., is in another state), the player's agent may remain near to the casino and may modify the terms of the player's contract on behalf of the player. A player may provide multiple parties with the power to modify the same contract. Parties may include people, corporations, estates, trusts, and other entities.

In one embodiment, the casino may contact the player in order to confirm certain types of modifications made by the party with a specified power of attorney. For example, the casino may call the player to confirm any financial transactions. For instance, if the party with power of attorney modifies the contract to send payments to someone other than the player, the casino may call up the player to confirm that the player approves of the transaction.

In some embodiments, a group of two or more players enter into a contract. Each group member, for example, may have some of his own money at risk. For instance, players may pool their money in a fixed proportion, have their joint bankroll put at risk on a series of outcomes, and then may divide any remaining bankroll in the same proportion in which they made their initial contributions. The contract may specify exactly how much each player contributed to the contract. The contract may further specify the amounts, or the proportional amounts to be paid to each player at the termination of the contract. Of course, players may also receive payments according to various individual payment schedules. In this way, when a group of players enter into a contract with a casino, the contract not only defines the relationship between the players and the casino, but also amongst the players themselves.

In one embodiment, each player in a group who has entered into a contract has the ability to modify one or more terms of the contract. The player's modification may effect the whole group. When one of a group of players modifies a contract, the casino may or may not contact one or more of the other players in order to obtain their approval for the contract modifications. In some embodiments, any contract modification may require a pre-designated number of group members to be present or to provide their approval. The number of required group members may, for example, be a simple majority of the group members. In other embodiments, the number of group members required must be enough so that they possess the majority financial interest in the contract. In still other embodiments, the pre-designated number of group members need not be present, but must provide their approvals.

In some embodiments, a group of players may register with the casino. The group may agree to have one or more group members be authorized to act on behalf of the group. The group members in possession of the power of attorney may then create new contracts on behalf of the other group members. Such contracts may be paid for, for example, via automatic charges to each group member's credit card. Each group member may or may not be notified that he has been entered into a new contract. The casino may or may not seek the approval of group members when they have been entered into a new contract by other group members.

Special methods of displaying outcomes and other information may be useful for contracts involving groups, and for group play in general even in the absence of formal contracts. In one embodiment, one of the group members plays on behalf of the group at the casino. Other group members may be at remote locations. A camera at the casino may then transmit, via the casino server, the image of the player at the casino to the player devices of the other players. A microphone may further transmit any of the verbal comments made by the group member at the casino, as well as any background noise. In this way, remote members of the group may not only view outcomes, but may view images and listen to comments made by their fellow group member at the casino. In some embodiments, the casino server does not transmit an image of the group member, but instead transmits a stylized or idealized image, such as an avatar.

Alternatively, each player device may render and display to each remote player its own avatar representing the player at the casino. Additionally, the player devices of the remote players may capture images of the remote players, and transmit such images to the casino server. The casino server may then display images of the remote players on the screen of the gaming device of the group member present in the casino. Similarly, the casino server may receive audio data from remote players and provide such data to the group member in the casino. Furthermore, the casino server may transmit image and audio data from remote players to other remote players. Text data may also be exchanged among all group members via the casino server.

The screen of the gaming device of the player at the casino may display financial information relevant to each individual group member. For example, Sam, Henry, and George are part of a group. Sam has contributed $100, Henry $50, and George $50 to the group's starting bankroll. Now, as Sam sits at a slot machine and makes handle pulls on behalf of the group, each group member's stake in the remaining bankroll is displayed in the screen of the gaming device. If $160 remains of the initial bankroll, then the display might read: Sam –$80, George –$40, Henry –$40. If the contract specifies that each group member is to play a different payline of the gaming device, then each person's name might be listed by his corresponding pay line. Similarly, each person's winnings and losses may be displayed separately, based on the outcomes of their individual paylines.

In some embodiments, a contract is a means to set up competition among members of a group (e.g., a tournament). For example, four people each pay $50 and contract to make one thousand handle pulls each at quarter slot machines over the next three days. The person among the four who has won the most (or lost the least) at the end of the one thousand handle pulls keeps the $50 put up by each group member. The contract formalizes the competitive arrangement in that, once each has agreed to the contract, no group member can back out on the second day, nor can a group member refuse to pay, as people might be motivated to do in an informal competition.

A contract may also let the casino play for each group member in a competition. This might occur, for example, if players were to leave the area of the casino. A contract might also allow a single player to generate outcomes for other group members. For the purposes of competition, each group member might use a different pay line on a single slot machine operated by one of the group members.

In embodiments where a contract has set up competition among group members, the relative current standings of all group members may be displayed to each group member at his respective gaming device or player device.

Settlement

In some embodiments, the casino acts as the intermediary in transactions between a player and an insurer. The casino is an intermediary, for example, when its gaming devices collect a player's payment for a contract, even though that payment is meant to go to the insurer. The casino is also an intermediary when it does not collect losses from a player, but from an insurer.

Since the casino may engage in many transactions with the insurer, it would potentially be inefficient for the casino to transfer money to the insurer, or vice versa, after every transaction. Therefore, the casino or the insurer may maintain records of how much one owes the other. The casino and the insurer may then settle their accounts periodically. If the casino owes the insurer money, then the casino may wire money to the insurer. If the insurer owes the casino, then the insurer may wire money. Of course, many other methods of settlement are possible.

In cases where a contract has resulted in a net win for the player, the player must be paid. If the player is at the casino, he may enter into a gaming device a password or other identifier of himself or of his contract. The gaming device may then access a database in the casino server containing the details of the contract, including the amount owed to the player. The gaming device may then payout the amount owed in the form of cash, tokens, paper receipts or vouchers, digital cash, digital receipts, etc. The player may also collect his winnings at a casino desk, perhaps after presenting identification.

If a player is remote from a casino when his contract has finished executing, then the player may be sent his winnings either by the insurer or the casino. If the insurer provides the winnings, then the casino may later reimburse the insurer in the amount of the winnings. The winnings may be sent in the form of cash, check, money order, etc. The winnings may be sent by postal mail, by wire transfer, by direct deposit, by email as digital cash, etc.

In some embodiments, the casino may simply keep the player's winnings in a player account at a casino, to be accessed by the player next time he visits the casino. The winnings may, in the mean time, accumulate interest. The casino (or insurer) may also alert the player that his contract has finished executing and that he has winnings. The player may be instructed to come to the casino and pick them up.

In some embodiments, the player may have left instructions to take any winnings from a first contract and purchase a second contract. This allows for the notion of a meta-contract. Just as a contract may specify how to allocate money for pulls, a meta-contract would describe how to allocate money for contracts. There could then be meta-meta-contracts, and so on.

In some embodiments, a player receives payments before his contract has finished executing. The player may receive payments according to a time-table or other payment schedule, which may be defined in the contract. For example, the player receives a payment every week, every month, or every six months. Alternatively, the player may receive payments upon the occurrence of certain events, which may also be specified in the contract. For example, the player receives payments every time he hits a payout exceeding fifty credits, or every time his gross winnings exceed an even multiple of one hundred credits. Events that trigger payments may also be external to the contract (e.g., specified weather events). By receiving payments before his contract has finished executing, the player may receive some income from the contract even while enjoying the new outcomes as they are generated by the ongoing contract.

The amounts of any payments the player receives may also be specified in the contract. In one embodiment, the player receives the same amount of money with each payment. For example, the player receives $10 per month. In another embodiment, the player receives a fixed percentage of his remaining bankroll each time he receives a payment. So, for example, if the player's bankroll is $100 at the end of June, then he receives a check for $10, leaving his bankroll with the casino at $90. If the player then has a $70 bankroll at the end of July (having lost a net of $20 during the month), then he receives a check for $7, leaving his bankroll with the casino at $63.

In other embodiments, a player receives a fixed percentage of only his net or gross winning since the inception of the contract. Thus, a player who began with a bankroll of $100 and now has $150, might receive 10% of the net winnings, which would amount to $5. In still other embodiments, a player receives a fixed percentage of his net or gross winnings over the most recent time period, e.g. the time period since receiving his last payment. Many other payment schemes are possible. If a payment does not work out to be an even multiple of some designated currency (e.g. an even number of dollars), then the payment may be rounded to the nearest convenient increment, rounded up, rounded down, or otherwise determined. In some embodiments, especially when a scheduled payment exceeds the player's bankroll, the remaining portion of a player's bankroll may be given to the player, at which point the contract is terminated.

It is possible that a contract specify both a payment schedule, and a fixed termination point. For example, a player is to receive $10 per month from this bankroll. If however, any portion of his bankroll remains after 12 months, then the remainder of the players bank roll is to be p aid to the player, and the contract is to be terminated.

In some embodiments, outcomes are revealed to a player at the same time that he receives his payment. For example, the player receives a check for $50. The check itself then displays the player's most recent ten outcomes. In particular, the amount of the check may depend on the most recent outcomes. Then, the player benefits from receiving the benefit of winning outcomes immediately upon discovering that he has received the winning outcomes.

As discussed herein, various embodiments of the present invention are directed generally to a method and apparatus for operating a gaming device for a flat rate play session. For example, a contract for a session of game play may specify a fixed number of handle pulls for a determined contract price. As used herein, a flat rate play session is defined as a period of play wherein the player need not make funds available for any play during the play session. The flat rate play session spans multiple plays of the gaming device. These multiple plays may be aggregated into intervals or segments of play. It is to be understood that the term interval as used herein could be time, handle pulls, and any other segment in which slot machine play could be divided. For example, an interval may be described as two hours, one hundred spins, fifty winning spins, etc.

In one embodiment, a player enters player identifying information and player selected price parameters at a gaming device. The price parameters define the flat rate play session, describing the duration of play, machine denomination, jackpots active, etc. The gaming device stores the player selected price parameters and proceeds to retrieve the flat rate price of playing the gaming device for the flat rate play session. The player selected price parameters, in combination with operator price parameters, determine the flat rate price. Should the player decide to pay the flat rate price, the player simply deposits that amount into the gaming device or makes a credit account available for the gaming device to debit. For example, it might cost twenty-five dollars to play for half an hour.

Once the player initiates play, the gaming device tracks the flat rate play session and stops the play when the session is completed, usually when a time limit has expired. During the play session, the player is not required to deposit any coins. Payouts are made either directly to the player in the form of coins or indirectly in the form of credits to the credit balance stored in the machine. It should be understood that the player balance could be stored in a number of mediums, such as smart cards, credit card accounts, debit cards, and hotel credit accounts.

With reference to FIG. 1, a system 100 according to one embodiment of the present invention is shown. In general, the system 100 comprises multiple slot machines 102 and a slot network server 106. In the present embodiment, each slot machine 102, which is uniquely identified by a machine identification (ID) number, communicates with the slot network server 106 via a slot network 104. The slot network 104 is preferably a conventional local area network controlled by the server 106. It is to be understood, however, that other arrangements in which the slot machines 102 communicate with the server 106 are within the scope of the present invention.

As will be described in greater detail below, in one embodiment, the slot machine 102 communicates player identifying information to the slot network server 106. The slot network server 106, in turn, verifies the player identifying information. The slot machine 102 also calculates a flat rate price based on both player selected and casino determined price parameters and displays the flat rate price to the player. The player may then accept the flat rate price and initiate play. In another embodiment, the present invention may be practiced without server 106, in an arrangement in which the slot machine 102 calculates the flat rate price.

Figure 2A:
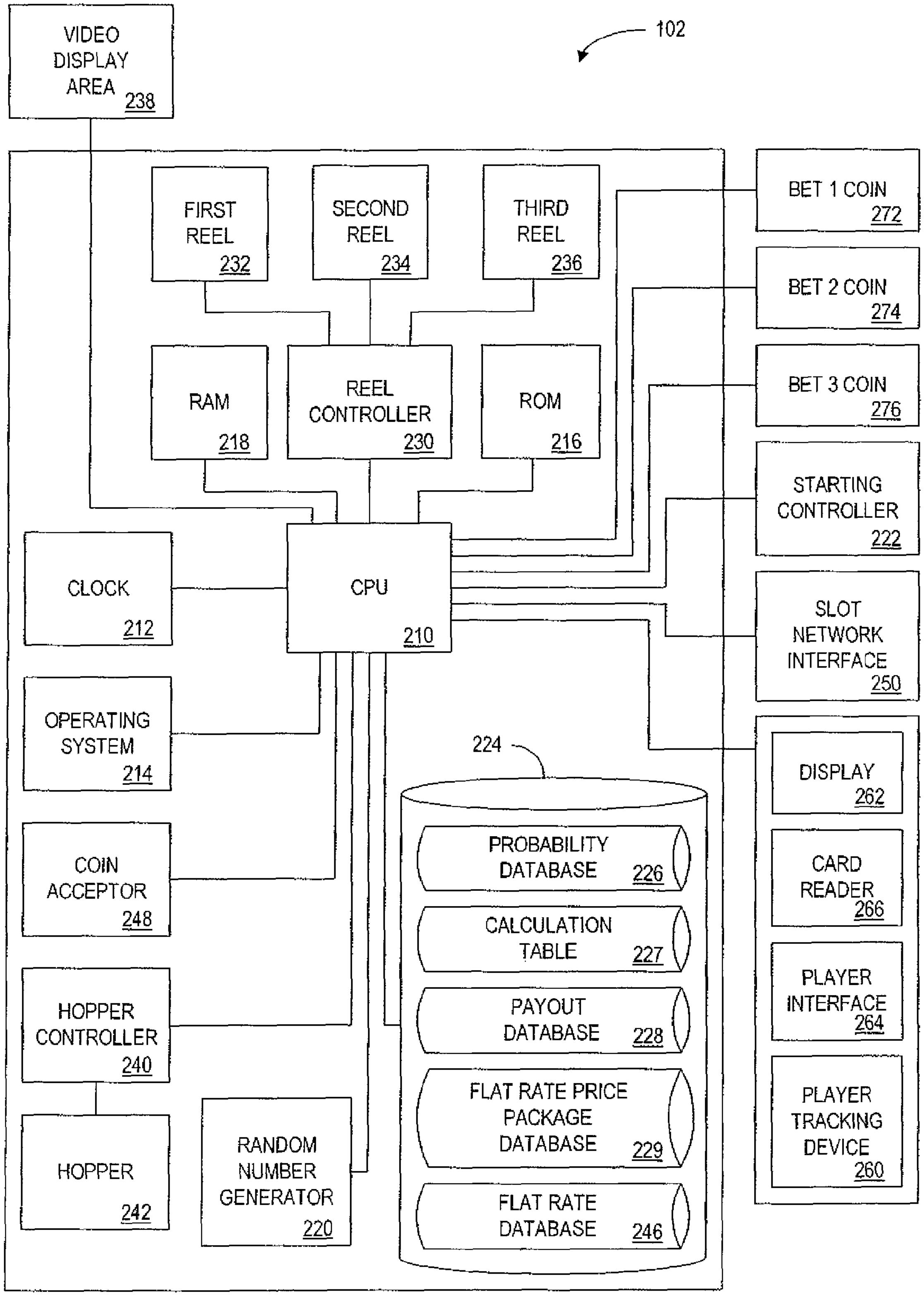
FIG. 2*a* is a schematic view of the slot machine of FIG. 1.

With reference to FIG. 2*a*, the slot machine 102 will now be described in greater detail. The slot machine 102 contains a Central Processing Unit (CPU) 210, a clock 212, and an operating system 214 (typically stored in memory as software). The CPU 210 executes instructions of a program stored in Read Only Memory (ROM) 216 for playing the slot machine 102. The Random Access Memory (RAM) 218 temporarily stores information passed to it by the CPU 210 during play. Also in communication with the CPU 210 is a Random Number Generator (RNG) 220.

With respect to gaming operations, the slot machine 102 operates in a conventional manner. The player starts the machine 102 by inserting a coin into coin acceptor 248, or using electronic credit, and pressing the starting controller 222. Under control of a program stored, for example in a data storage device 224 or ROM 216, the CPU 210 initiates the RNG 220 to generate a number. The CPU 210 looks up the generated random number in a stored probability table 226, which contains a list which matches random numbers to corresponding outcomes, and finds the appropriate outcome. Based on the identified outcome, the CPU 210 locates the appropriate payout in a stored payout table 228. The CPU 210 also directs a reel controller 230 to spin reels 232, 234, 236 and to stop them at a point when they display a combination of symbols corresponding to the appropriate payout. When the player wins, the machine stores the credits in RAM 218 and displays the current balance in video display area 238. In an alternate embodiment, the slot machine 102 dispenses the coins to a payout tray (not shown), and in another embodiment, the slot network server 106 stores the player credits.

A hopper controller 240 is connected to a hopper 242 for dispensing coins. When the player requests to cash out by pushing a cashout button (not shown) on the slot machine 102, the CPU 210 checks the RAM 218 to see if the player has any credit and, if so, signals the hopper controller 240 to release an appropriate number of coins into a payout tray (not shown). A coin acceptor 248 is also coupled to the CPU 210. Each coin received by the coin acceptor 248 is registered by the CPU 210.

In alternate embodiments, the slot machine 102 does not include the reel controller 230 and reels 232, 234 and 236. Instead, a video display area 238 graphically displays representations of objects contained in the selected game, such as graphical reels or playing cards. These representations are preferably animated to display playing of the selected game.

Also in communication with the CPU 210 is a player tracking device 260. The tracking device 260 comprises a card reader 266 for reading player identifying information stored on a player tracking card. As used herein, the term player identifying information denotes any information or compilation of information that uniquely identifies a player. In the present embodiment, the identifying information is a player identification (ID) number. Although not so limited, the player tracking card of the present embodiment stores the player ID on a magnetic strip located thereon. Such a magnetic strip and device to read the information stored on the magnetic strip are well known.

The player tracking device 260 also includes a display 262 and a player interface 264. The player interface 264 may include a keypad and/or a touchscreen display. In operation, as discussed below, the slot machine 102 displays a message prompting the player to enter player selected price parameters. In the present embodiment, a player may enter the player selected price parameters via the player interface 264. Because the player interface 264 is part of the tracking device 260, it is, therefore, in communication with the CPU 210. Alternatively, input of selected price parameters may be accomplished through video display area 238 if it is configured with touch screen capabilities.

The slot machine 102 also includes a series of bet buttons 272, 274, 276. The bet buttons include "Bet 1 coin" 272, "Bet 2 coins" 274, and "Bet 3 coins" 276. The bet buttons 272, 274, 276 are coupled to the CPU 210. Therefore, pressing one transmits a signal to the CPU 210 indicating how much a player is wagering on a given play.

The databases stored in the data storage device 224 include a probability table 226, a calculation table 227, a payout table 228, a flat rate price package database 229, and a flat rate database 246. As discussed in greater detail below, the flat rate database 246 and the calculation table 227 store information related to the flat rate play session and calculation of the flat rate price, respectively. The flat rate price package database 229 stores information describing different preestablished flat rate packages as custom designed by the casino.

Also connected to the CPU 210 is a slot network interface 250. The slot network interface 250 provides a communication path from the slot machine 102 to slot network server 106 through the slot network 104. Thus, as discussed in greater detail below, information is communicated among the player tracking card, player tracking device 260, slot machine 102, and slot network server 106.

Figure 2B:
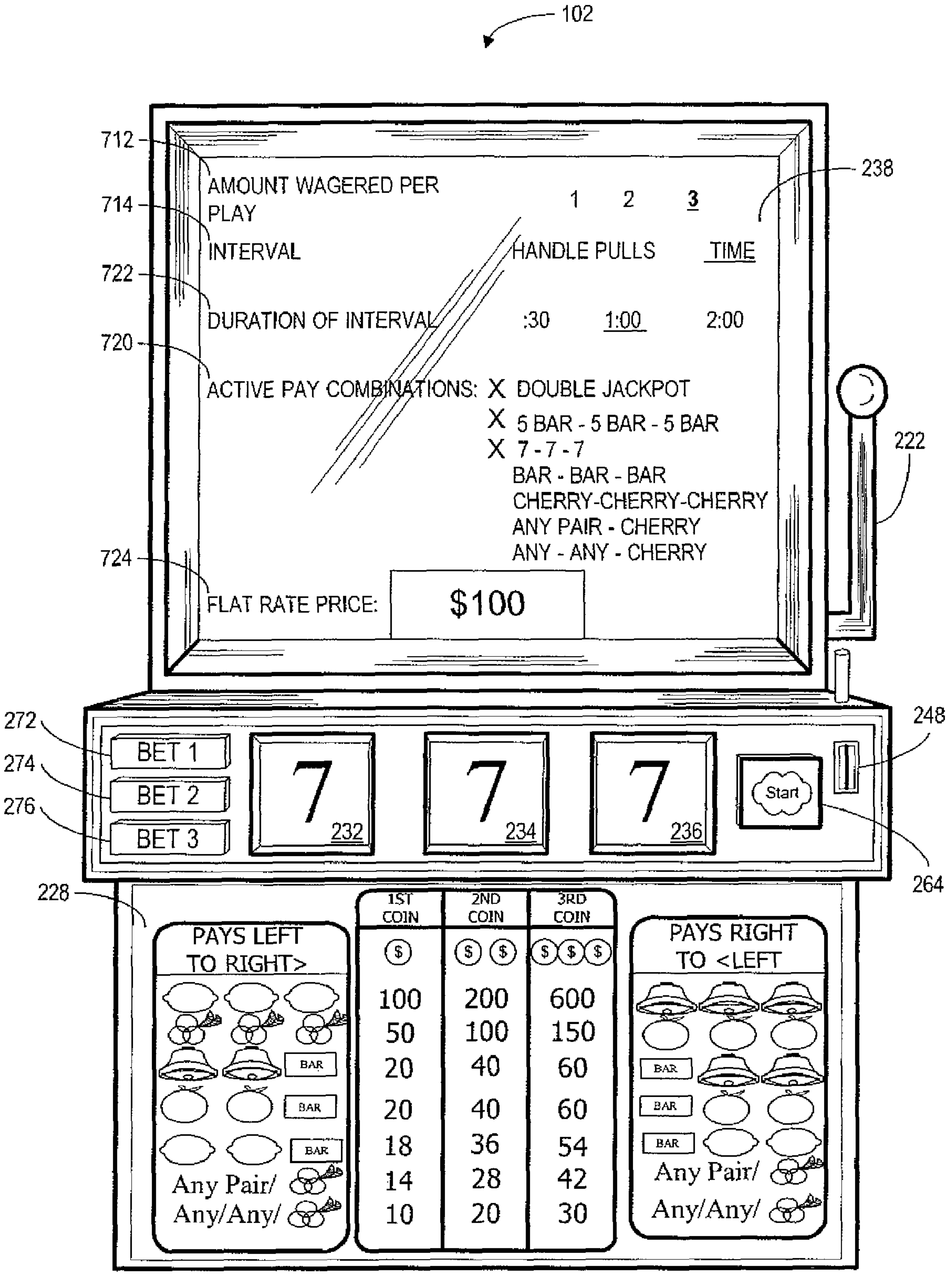
FIG. 2*b* is a plan view of the slot machine of FIG. 1.

With reference to FIG. 2*b*, the plan view of slot machine 102, will now be described below. FIG. 2*b* depicts slot machine 102 displaying player selected price parameter options on video display area 238. Included in the displayed parameters is amount wagered per play 712, interval 714, duration of interval 722, and active pay combinations 720. As will be described further below, after the player has selected the desired price parameters, the slot machine 102 displays a flat rate price 724. Once the player has accepted the flat rate price and made the appropriate funds available, play may commence.

Figure 3:
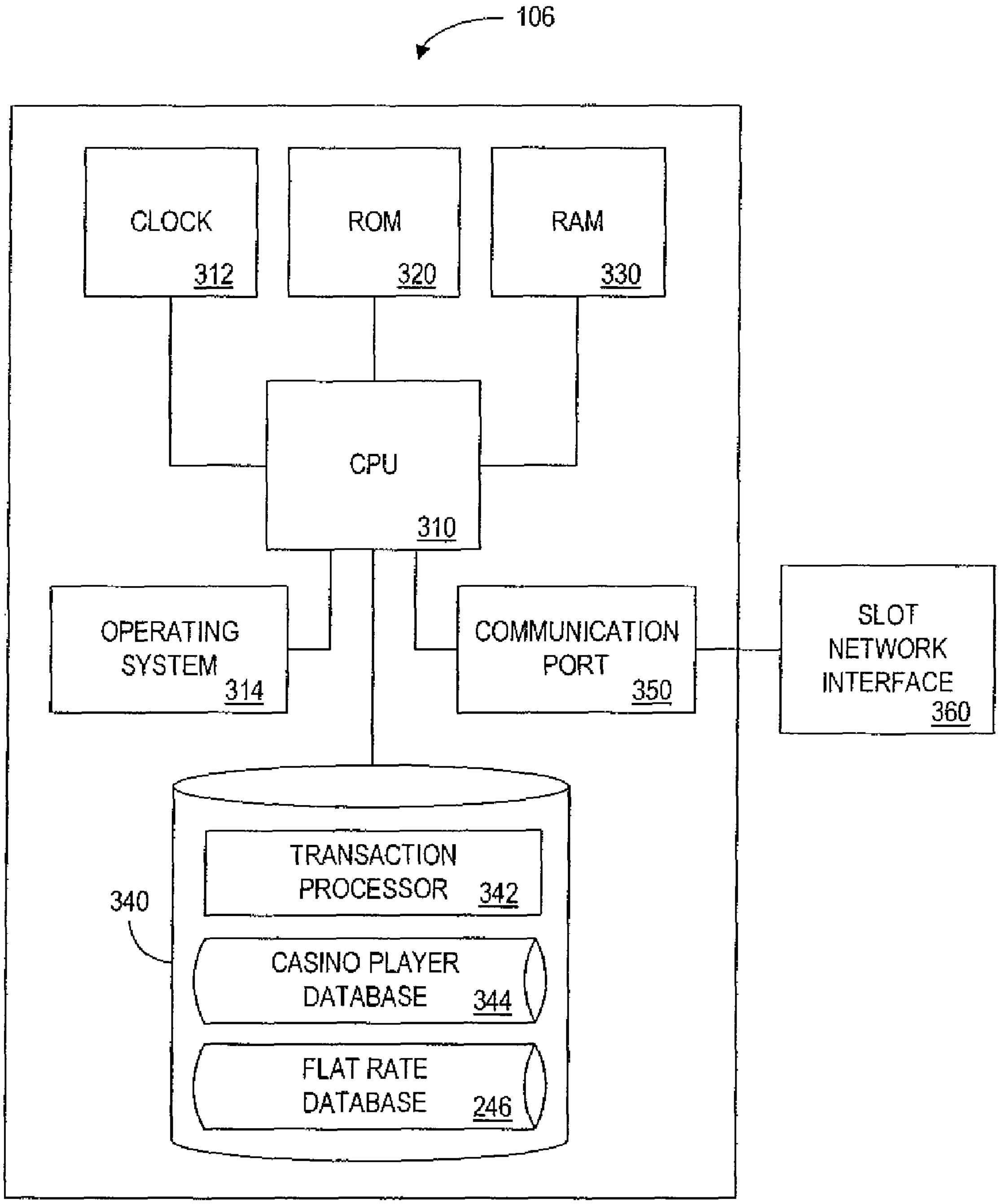
FIG. 3 is a schematic view of the slot network server of FIG. 1.

The slot network server 106 will now be described in greater detail with reference to FIG. 3. Like the slot machine 102 of FIG. 2, the slot network server 106 has a Central Processing Unit (CPU) 310. The CPU 310, which has a clock 312 associated therewith, executes instructions of a program stored in Read Only Memory (ROM) 320. During execution of the program instructions, the CPU 310 temporarily stores information in the Random Access Memory (RAM) 330.

Additionally, the CPU 310 is coupled to a data storage device 340, having a flat rate database 246, transaction processor 342 and a casino player database 344. In general, the transaction processor 342 manages the contents of the data storage devices 340. As discussed in detail below, the casino player database 344 stores information specific to each player, including player identifying information.

In order to communicate with the slot machines 102, the slot network server 106 also includes a communication port 350. The communication port 350 is coupled to the CPU 310 and a slot machine interface 360. Thus, the CPU 310 can control the communication port 350 to receive information from the data storage device 340 and RAM 330 and transmit the information to the slot machines 102 and vice versa.

It is to be understood that because the slot machines 102 are in communication with the slot network server 106, information stored in a slot machine 102 may be stored in the server 106 and vice versa. Thus, for example, in an alternate embodiment, the server 106 rather than the slot machine 102 includes the payout table 228, flat rate database 246, and/or calculation table 227.

The casino player database 344 of the present embodiment, as shown in FIG. 4, includes multiple records having multiple fields of information. Specifically, the casino player database 344 comprises multiple records, each record being associated with a particular player, as identified by a player identification (ID) number. The fields within each record include: player identification (ID) number 410, social security number 412, name 414, address 416, telephone number 418, credit card number 420, credit balance 422, complimentary information, such as total accumulated complimentary points 424, whether the player is a hotel guest 426, player status rating 428, and value of interval remaining 430. Having information related to one field, such as player ID 410, allows the slot network server 106 to retrieve all information stored in corresponding fields of that player record.

It is to be understood that not all of these identifying fields are necessary for operation of the present embodiment. For example, the name 414, social security number 412, address 416, telephone number 418, credit card number 420, and hotel guest 426 fields are merely representative of additional information that may be stored and used for other purposes. In one embodiment, credit card number 420 and hotel guest 426 are used for billing purposes and social security number 412 is used to generate tax forms when a player wins a jackpot over a given amount.

Complimentary points awarded 424 is further illustrative of additional information a casino may store in a player's record. As described below, a player's complimentary points are displayed to the player when a player tracking card is inserted into the slot machine 102. In an alternate embodiment, such points may be used in addition, or as an alternative to the credit balance 422 stored in RAM 218 of slot machine 102.

The player status rating 428 contains information representative of the particular player's relative importance to the casino, as based upon the frequency and duration of the player's visits, the amount of money wagered, and the like.

The value of interval remaining field 430 stores the value of interval remaining in a flat rate play session when a player terminates the play session prior to its expiration. This field will be described in greater detail below.

The flat rate database 246 will now be described in greater detail with reference to FIG. 5. The flat rate database 246 comprises multiple records, each record pertaining to the flat rate play session of a particular player, as identified by that player's ID number. Consequently, one field in flat rate database 246 is the player ID number field 510. Other fields include: player selected price parameters 512, flat rate price 514, interval remaining 516, time audit data 518, and machine identification (ID) number field 520. The machine ID number field 520 contains the machine ID number that uniquely identifies the slot machine 102. It is to be understood that since both the casino player database 244 and the flat rate database 246 include a player ID field, 410 and 510, respectively, the system 100 can correlate any player information stored in the casino player database 344, with any player information stored in the flat rate database 246.

The payout table 228 will now be described in greater detail with reference to FIG. 6. As shown in FIG. 6, the payout table 228 of the present embodiment can be logically represented by five fields of related information. The first field, a pay combination field 610, identifies the set of possible pay combinations for a given slot machine 102. Such possible pay combinations include winning pay combinations, or those in which a payout results, and non-winning pay combinations, in which the player receives no payout and consequently loses the amount wagered. Winning pay combinations include, for example, "DOUBLE JACKPOT-DOUBLE JACKPOT-DOUBLE JACKPOT" and "BAR-BAR-BAR." The pay combinations field 610 also includes a "NON-WINNING OUTCOMES" record, an entry representing the outcomes which result in no payout to the player, such as "PLUM-BELL-ORANGE."

The payout table 228 also includes three payout fields 620, 630, 640. Such payout fields 620, 630, 640 contain the payout information for each of the possible pay combinations identified in the pay combinations field 610. Each of the payout fields 620, 630, 640 is identified by the number of coins wagered on a particular play, as selected via the bet buttons 272, 274, 276. In the present embodiment, payout table 228 contains a "1 coin" payout field 620, which is accessed when one coin is wagered, a "2 coins" payout field 630, which is accessed when two coins are wagered, and a "3 coins" payout field 640, which is accessed when three coins are wagered. In other words, each field 620, 630, 640 corresponds to a bet button 272, 274, 276, respectively. The payout information provides the number of coins won upon the occurrence of a particular pay combination. Thus, "CHERRY-CHERRY-CHERRY" pays out ten coins when one coin is wagered.

Finally, the payout table 228 of the present embodiment includes a pay combination status field 650. The pay combination status field 650 includes an indication for each winning pay combination, identified in the pay combination field 610, of whether the player is eligible to win the payout for each outcome. As will be described below, the determination of whether a player is eligible to win a payout for a given outcome is made by the player as part of the player selected price parameters.

The calculation table 227 will now be described in greater detail with reference to FIG. 7. The calculation table 227 is used by the system 100 in determining the flat rate price 724 (field 514 in the flat rate database 246) charged to the player.

Specifically, the calculation table 227 contains multiple price parameters which are correlated to a flat rate price 724. More specifically, these price parameters include player selected price parameters and operator selected price parameters. In general, player selected price parameters include any game related variable that defines the flat rate play session. Furthermore, operator selected price parameters are parameters which the operator of the slot machines 102 selects as affecting the flat rate price 724. Thus, in the present embodiment, the player selected price parameters in the calculation table 227 include machine type 710, amount wagered per play 712, active pay combinations 720, and length of the flat rate play session 722. The operator selected price parameters in the calculation table 227 include player status rating 714, time of day 716, day of the week 718, and machine usage 719. In the present embodiment the flat rate price 724 is predetermined based upon the aforementioned price parameters and stored in the calculation table 227, as will be described later in FIGS. 14 and 15. In an alternate embodiment the flat rate price 724 is calculated based upon these parameters as needed according to a price algorithm stored in memory.

The are any number of algorithms that could be used to calculate a flat rate price, and they can be generally described as calculating an expected value to the customer and then adding in a margin for the casino or adjusting the price to reflect the time of day, value of the customer, etc.

According to an exemplary algorithm for determining a flat rate price, the first step is to determine a "base" flat rate price. This may be calculated as follows:

Base Price=[(amount wagered)×(interval)]×[(expected coins awarded for all active pay combinations over a cycle/expected coin-in over a cycle)].

For example, the following Base Price calculation represents a player selecting three dollar coins per handle pull, an interval of five hundred handle pulls, and the top three pay combinations active. For this example we will assume that a complete cycle of the slot machine is 10,648 unique outcomes and that the top three pay combinations would pay 2,160 coins over that cycle. Note also that the expected coins awarded for all active pay combinations over a cycle and the expected coin-in over the cycle should both reflect the same number of coins wagered. Essentially, this ratio reflects the expected monetary return to the payer on a per coin wagered basis. When multiplied by the amount wagered and the number of handle pulls the number reflects the amount of money that the player would be expected to receive from the machine over the interval specified. It should be notes that this amount of money is not necessarily the number of coins entered by the player but rather is the theoretical number of coins of play allowed by the flat rate session. Continuing with the calculation:

$$\begin{aligned}\text{Base Price} &= [(\$3)\times(500)]\times[(2{,}160/10{,}648)]\\ &= \$1{,}500\times.202855\\ &= \$304.28\end{aligned}$$

Note that if the player were to pay this Base Price he would be essentially getting a fair bet for his money. He would pay $304.28 for the session and expect (over the long run) to get $304.28 back in prize money from the top three active pay combinations. Of course in the short run his results could range from receiving no payouts over the interval to receiving thousands of dollars. Because this base price is a fair bet for the player the casino may want to add in a margin for the house, perhaps by multiplying the base price by a predetermined margin factor such as 50%. In this example the Profit Adjusted Price would thus be:

$$\begin{aligned}\text{Profit Adjusted Price} &= \$304.28\times 150\%\\ &= \$456.42\end{aligned}$$

Of course the casino might want to offer flat rate sessions to players without a casino markup under some circumstances, such as part of a promotional package or to reward a particularly loyal customer. In fact the casino might even decrease the base price in some circumstances.

The Base Price (or Profit Adjusted Price) could be further modified by various other operator price parameters such as the following:

(i) Time of Day (TD). Times of the day in which the casino traffic tends to be heavy should result in the player paying a premium for the flat rate session, while quiet times in the casino should offer the player a discount over normal rates. For example:

| | |
|---|---|
| Midnight to 4 am | 70% |
| 4 am to 8 am | 80% |
| 8 am to 12 pm | 90% |
| 12 pm to 4 pm | 100% |
| 4 pm to 8 pm | 120% |
| 8 pm to Midnight | 140% |

(ii) Day of Week (DW). With the heaviest volume of visitors falling on Fridays and Saturdays, these days will necessitate higher flat rate session costs. For example:

| | |
|---|---|
| Monday to Thursday | 80% |
| Friday | 120% |
| Saturday | 140% |
| Sunday | 100% |

(iii) Player Status Rating (PSR). For top customers such as high rollers, the cost of a flat rate session may be reduced as a customer retention tool. For example:

| | | |
|---|---|---|
| 1 | (High Roller) | 80% |
| 2 | (Good customer) | 90% |
| 3 | (Average) | 100% |
| 4 | (Low) | 120% |

(iv) Slot Machine Usage (SMU). When the majority of slot machines in the casino are being used, a premium is applied to the cost of the flat rate play session in order to more evenly distribute play. For example:

| | |
|---|---|
| Heavy | 120% |
| Moderate | 100% |
| Light | 80% |

In an example of calculation of a flat rate price, in addition to the above player selected price parameters, the following operator selected parameters are incorporated into the price: the player is in the casino at 2 am on a Wednesday, there is low slot machine usage, and the player has an average rating. The calculations below reflect these exemplary conditions:

$$\text{Base Price} = \$304.28$$

$$\begin{aligned}\text{Final flat rate price} &= (\text{Base Price}) \times TD \times DW \times PSR \times SMU \\ &= \$304.28 \times 70\% \times 80\% \times 100\% \times 80\% \\ &= \$304.28 \times 44.8\% \\ &= \$136.32\end{aligned}$$

The casino may round up this price to $137 to avoid the need for small change. In the above calculations, the casino might also incorporate floors or minimum prices which prevent the Base Price from going below a level that would be profitable for the house, regardless of the number of positive criterion that were applied to the base price.

Those of ordinary skill in the art will appreciate that modifications could be made to the exemplary formula to reflect different kinds of flat rate sessions. For a session with an interval of one hour (instead of a fixed number of handle pulls) the formula might reflect an expected number of handle pulls per hour for that particular game, perhaps even adjusted to reflect the type of player purchasing the flat rate session. For example, an experienced video poker player might be expected to reach seven hundred hands per hour while a beginner might only be expected to reach three hundred hands per hour.

As will also be understood by those skilled in the art, the ultimate goal of many slot machine players is to hit a jackpot payout. The enjoyment of the play, as well as the ability to maximize the chance of hitting a large jackpot, is increased by more play. Play can be increased both by playing longer, and by playing faster. As will be appreciated from a consideration of the process described below, the present invention permits both increased duration, by providing for play at discounted prices, and speed of play, by providing for minimal time delays between plays.

The flat rate price package database 229 will now be described in greater detail with reference to FIG. 14. The flat rate price package database 229 is used by the system 100 in providing the player with different price package options for flat rate play of a slot machine. Specifically, the flat rate price package database 229 contains multiple combinations, or packages 1410, of price parameters which correspond to pre-established flat rate prices. More specifically, these price parameters include but are not limited to, interval 1412, duration of flat rate play 1414, amount wagered per play 1416, and pay combination status 1418. Each combination of price parameters has corresponding flat rate play session prices 1420. As will be described later in FIG. 15, the flat rate price package database 229 is accessed when the player determines he wishes to initiate a flat rate play session. Rather than let the player choose the price parameters, the slot machine lists the different packages stored in the flat rate price package database 229. The player then chooses the package he likes the most and play commences.

Having thus described the components of the present embodiment, the operation of the system 100 will now be described in greater detail with reference to FIGS. 8-11, and continuing reference to FIGS. 1-7. It is to be understood that the programs stored in ROM 320 of the slot network server 106 and ROM 216 of the slot machine 102 provide the function described below.

Figure 8A:
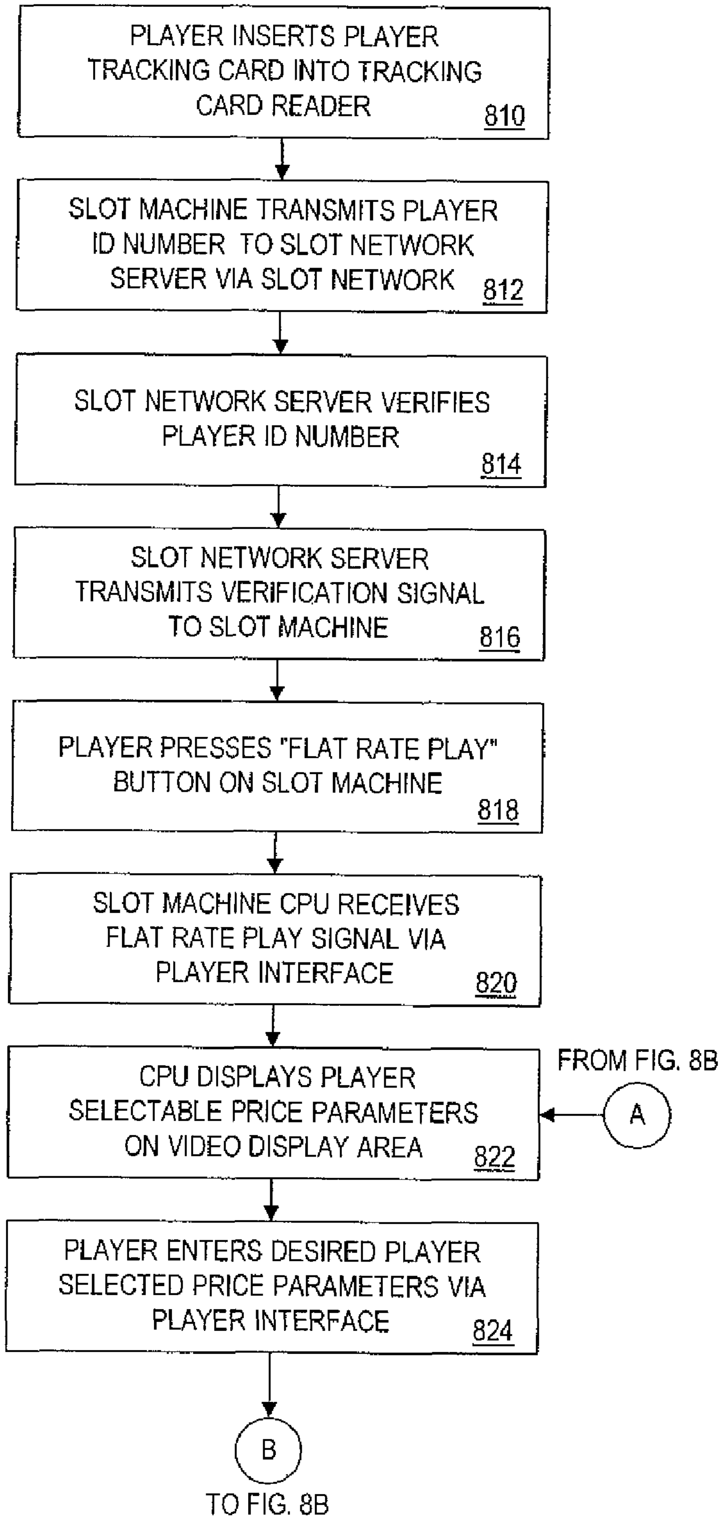
FIGS. 8*a* and 8*b* are overall flow diagrams of the operation of the system of FIG. 1.
Figure 8B:
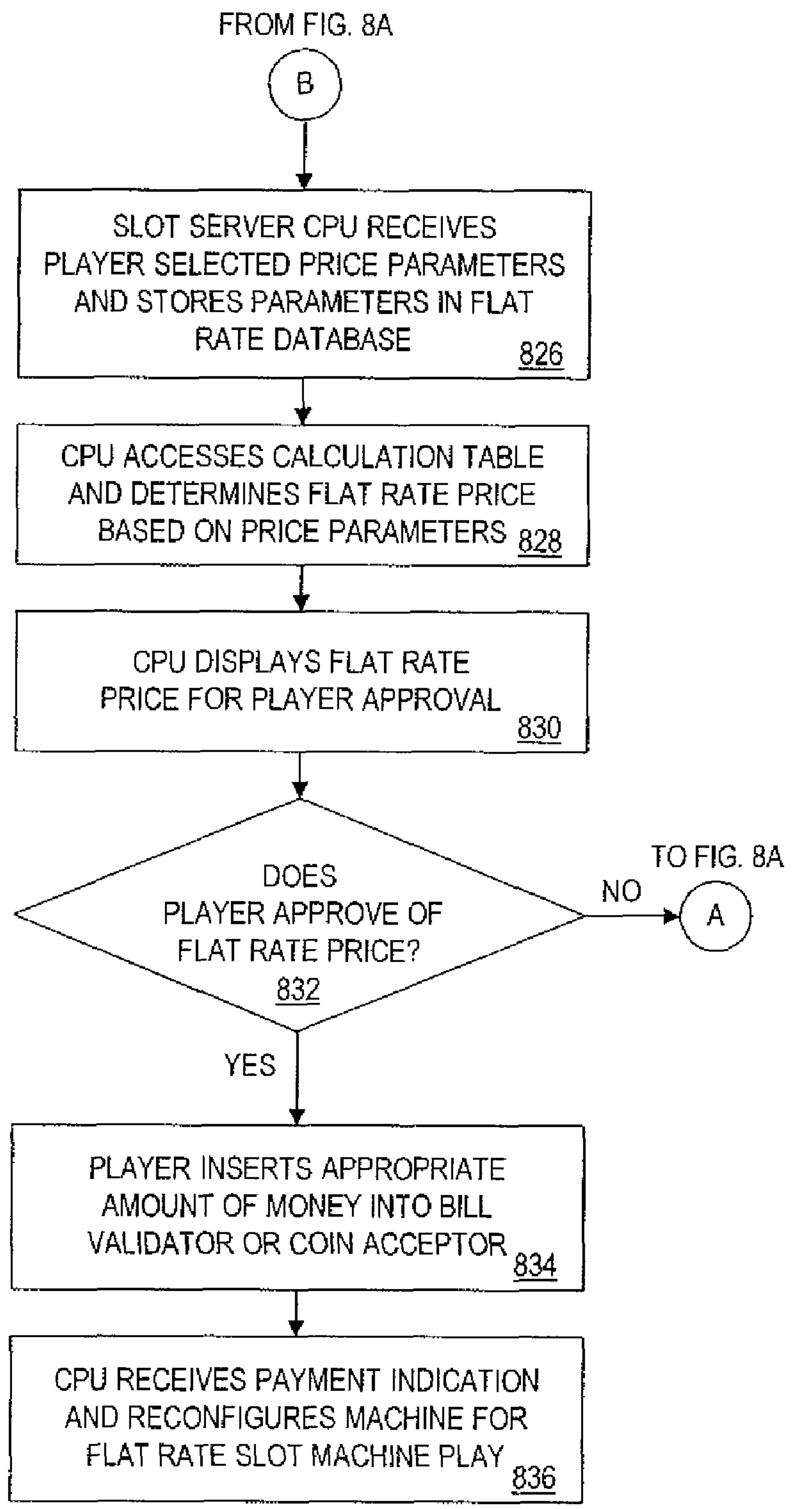

Turning first to FIGS. 8*a* and 8*b*, the general operation of the system 100 will be described. As shown in step 810, the slot machine player first inserts the player tracking card into the card reader 266. The card reader 266 then proceeds to read player identifying information from the tracking card. The player identifying information, namely the player ID number, is communicated from the slot machine 102 to the slot server 106 in step 812.

Upon receiving the player identifying information, the slot network server 106 verifies the information in step 814. Such verification includes the slot network server 106 searching the casino player database 344 for a record containing the received player ID number in the appropriate field 410. Once the slot network server 106 verifies the player identifying information, the server 106 transmits a signal to the slot machine 102 acknowledging such verification in step 816. In alternate embodiments, other information, such as the player's name 414, complimentary point total 424, and player status rating 428 are transmitted to the slot machine 102 for display.

In step 818, the player selects flat rate play via the player interface 264. The CPU 210 of slot machine 102, in step 820, then receives a signal from the player interface 264, indicating that the player has selected flat rate play. For example, there could be a button specifically for triggering a flat rate play session. The CPU 210, in response, accesses memory to retrieve player selectable price parameters. Player selectable price parameters are the choices available to a player for entering the player selected price parameters. These player selectable price parameters are controlled by a program stored in ROM 216. Such player selectable price parameters, in the present embodiment, include the amount wagered per play, (e.g., one, two, or three coins), the length of the flat rate play session, and possible jackpot structures, such as having only the "DOUBLE JACKPOT" and "5 BAR" jackpots active (as illustrated in the payout table 228 of FIG. 6). In an alternate embodiment, the player selectable price parameters are stored as part of the calculation table 227.

Then, as shown in step 822, the slot machine 102 displays the player selectable price parameters to the player. For example, the parameters could be listed on the video display area 238 for the player, as described previously in FIG. 2*b*. Once the parameters appear, the player simply selects his desired settings. Alternatively, the player may accept one or more default settings. Once the player selectable price parameters are displayed on the display 238, the player proceeds, in step 824, to enter player selected price parameters via the player interface 264. The player selected price parameters also include data which, although not directly inputted by the player, is selected by the player and identified by the slot machine 102. In the present embodiment, such additional player selected price parameters include type of machine, time of day, and day of the week.

It is to be understood that the casino operator of the slot machines 102 may define the scope of the player selectable price parameters, and therefore limit the player selected price parameters in any manner. For example, the length of flat rate play may be limited to periods above a minimum time or to periods that are multiples of thirty minute intervals. The jackpot structure may require that some jackpots remain active.

Referring now to FIG. 8*b*, the slot machine 102 CPU 210 receives the player selected price parameters in step 826. Having received the player selected parameters, the CPU 210 then stores the player selected price parameters, the player identifying information, and the slot machine's machine ID number in a record in the flat rate database 246. Specifically, the player ID number is stored in field 510, the machine ID number is stored in field 520, and the player selected price parameters are stored in field 512. Although the player selected price parameters are illustrated as being stored in a single field (512), it is to be understood that each player selected price parameter may be stored in a separate field. It is also to be understood that in alternate embodiments the player selected price parameters need not be stored in a database, but could be stored in RAM 218.

The slot machine 102 CPU 210 uses the player selected price parameters to determine the flat rate prices. Specifically, in step 828, the CPU 210 accesses the calculation table 227 and searches for the flat rate price 724 corresponding to the received player selected price parameters 512, which, in the present embodiment, include machine type 710, amount wagered per play 712, time of day 716, day of the week 718, active jackpots 720, and the length of the flat rate play session 722. The CPU 210 also incorporates operator selected price parameters for the flat rate price 724 such as player status rating 714 and machine availability 719. As will be appreciated by one skilled in the art, the player status rating 714 is received from the casino player database 344 at any time prior to determination of the flat rate price 724. Thus, in a preferred embodiment, the slot network server 106 transmits the player status rating 428 to the slot machine 102 along with the verification signal in step 816.

By including the player status rating 714 in the calculation table 277, a casino may reward frequent players who wager relatively large amounts of money with a lower flat rate price 724. Thus, the system 100 rewards and encourages frequent play. By including active jackpots 720 in the calculation table 348, the system 100 allows a casino to discount the flat rate price 724 for those players who choose to enable relatively few winning outcomes in the payout table 228. Furthermore, by including the price parameters relating to time of day and day of the week in the calculation table 227, a casino may charge a lower flat rate price 724 for sessions during weekday afternoons or between 2:00 a.m. and 8:00 a.m. in the mornings, thereby encouraging play of the slot machines 102 when they are typically idle.

It is to be understood that the aforementioned price parameters in the calculation table 227 are merely representative of the type of variables that may be considered in determining a flat rate price. Thus, it is within the scope of the present invention to include only some of the price parameters, all of the parameters, or additional parameters in the calculation table 227.

As mentioned above, the flat rate price may be based partly upon the availability of slot machines 102. In such an embodiment, the server 106 tracks whether each slot machine 102 is being used by noting whether outcomes are currently being received from a given slot machine 102. In another embodiment, the server 106 tracks slot machine availability by tabulating the number of slot machines 102 for which flat rate play is currently enabled. In yet another embodiment, the server 106 tracks slot machine availability by identifying how many slot machines 102 have a player tracking card inserted therein.

Another price parameter which may be used is predicted or forecasted slot machine availability. Specifically, such a parameter accounts for anticipated availability of slot machines 102 based upon events at the casino. For example, the calculation table 227 correlates a lower flat rate price 724 to the time of day 716 corresponding to an event, such as a show which many casino players attend. On the other hand, the calculation table 227 correlates a higher flat rate price to the time of day 716 corresponding to the end of the event or heavier casino traffic. This enables a casino to effectively revenue manage their slot machines without resorting to a change in hold percentage which requires regulatory approval.

It is to be understood that accounting for slot machine availability need not be accomplished in the calculation table 227. Rather, in an alternate embodiment, a schedule of events is stored in RAM 218 which is accessed prior to transmitting the flat rate price 724 to the player. If the event schedule indicates that an event is ending during the requested flat rate play session, then the flat rate price 724 will be incremented accordingly.

In another embodiment, the flat rate price is based only on operator selected price parameters. A slot machine 102 according to such an embodiment could, for example, provide discounted flat rate play sessions based on player status rating, thereby offering one hundred plays for the price of 90 or discounted timed sessions. To encourage repeat, high stakes play, higher player status ratings result in greater discounts.

Having determined the flat rate price 724, the slot machine 102, in step 830, displays the duration of the flat rate play session 722 and the flat rate price 724 and requests approval from the player. Once the player accepts the terms of the flat rate play session, flat rate play commences.

If the player does not approve the flat rate price 724, then the player indicates so via the player interface 264. As indicated by path A in FIGS. 8*a* and 8*b*, the slot machine 102 repeats its operation from step 822. On the other hand, if the player approves the flat rate price 724, the player indicates such approval via the player interface 264 in step 832. Following such approval, the slot machine 102 prompts the player to enter an appropriate amount of money in step 834. In the present embodiment, the player deposits coins into the coin acceptor 248. In one embodiment, the player deposits a casino token as payment for the flat rate session. Such tokens may be denominated in dollars, or represent a number of handle pulls. A casino could thus sell a fifty handle pull token, usable on a particular denomination and/or type of machine. Such a token may additionally serve to activate the flat rate session, eliminating the need for the player to select flat rate play via player interface 264. Alternatively, the player's credit balance 422 may be debited to pay for the flat rate play session.

In some embodiments a casino token may be associated with a particular set of pay combinations which are to be active during a flat rate play session activated via the token. In yet other embodiments a casino token may be associated with (i) a specified duration of time, (ii) a specified number of handle pulls or outcomes, (iii) a specified number of winning handle pulls or outcomes, and/or (iv) a flat rate price package as, for example, described with reference to the flat rate price package database 299 of FIG. 14. A gaming device may identify such a token and enter the appropriate flat rate play session by, for example, the size and/or weight of the token or by reading or receiving information from the token (e.g., via a computer chip embedded in the token or special markings on the token). Such a casino token may be, for example, purchased by a person and given to another person as a gift. The recipient may subsequently use the token by inserting it into an appropriate gaming device and essentially playing for "free" (since the person that gave the gift had prepaid for the token) for a specified duration.

Once the CPU 210 registers the receipt of money, the CPU 210 reconfigures the slot machine 201 for the flat rate play session in step 836. Specifically, the CPU 210 generates a signal, or a flag in memory, indicating that there is no need to accept the coins between plays. CPU 210 further sets the active field 650 in the payout table 228 according to the jackpot structure entered by the player.

Figure 9:
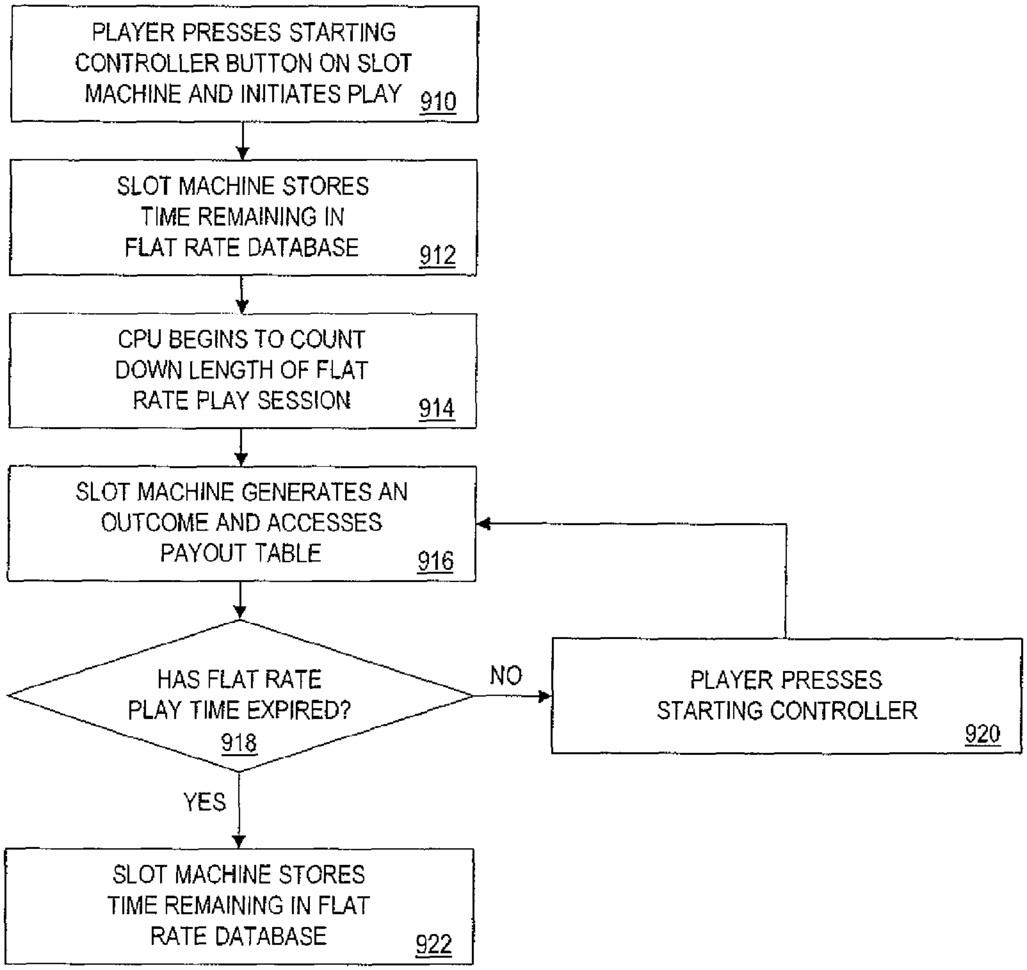
FIG. 9 is a detailed flow diagram of the operation of the system of FIG. 1.

The operation of the slot machine 102 during the flat rate play session will now be described with reference to FIG. 9 and continuing reference to FIGS. 1-7. During the flat rate play session, a slot machine 102 operates generally as described above with reference to FIG. 2. However, the slot machine 102 is reconfigured to operate according to the player selected price parameters, if such parameters affect play, and to operate continuously, without requiring payment between each play. Specifically, the flat rate play session begins when the player presses the starting controller 222 in step 910. The CPU 210 also initiates a countdown of the length of the flat rate play session as stored in the player selected parameters field 512 of the flat rate database 246. With the start of the session, the CPU 210 stores the start time of the flat rate play session in the flat rate database 246. Specifically, the start time is stored in the time audit data field 520 in step 912. In step 914, the CPU 210 begins to count down the duration of the flat rate play session. Next, in step 916, the slot machine 102 generates an outcome and accesses payout table 228 to determine the appropriate corresponding number of coins to be paid out.

Furthermore, in step 918, after each outcome is generated, the slot machine 102 determines whether the countdown of the interval remaining 516 has reached zero. It is to be understood that the countdown may be implemented in either software or hardware. Additionally, it is understood that the countdown process discussed herein may be replaced with any suitable means for tracking the duration of the flat rate play session. Interval remaining 516 may also represent the number of handle pulls remaining.

In the event that the countdown has not reached zero, the player presses the starting controller 222 in step 920, thereby initiating another play of the slot machine 102. In the event that the countdown has reached zero, the CPU 210 generates a signal indicating that the flat rate play session has concluded. The slot machine 102 displays a message indicating this to the player and, in step 922, stores the end time of the session in the time audit data field 518 of the flat rate database.

In an alternate embodiment, the player selected price parameters include the "time between plays." In this embodiment, the CPU 210 of slot machine 102 controls the time between generating outcomes of successive plays in the slot machine 102 to equal the received "time between plays" player selected price parameter. In another alternate embodiment, the slot machine 102 tracks the number of plays during the flat rate play session. If the number of plays exceeds a predetermined limit, the slot machine 102 automatically terminates the flat rate play session, regardless of the duration of the flat rate play session.

Figure 10:
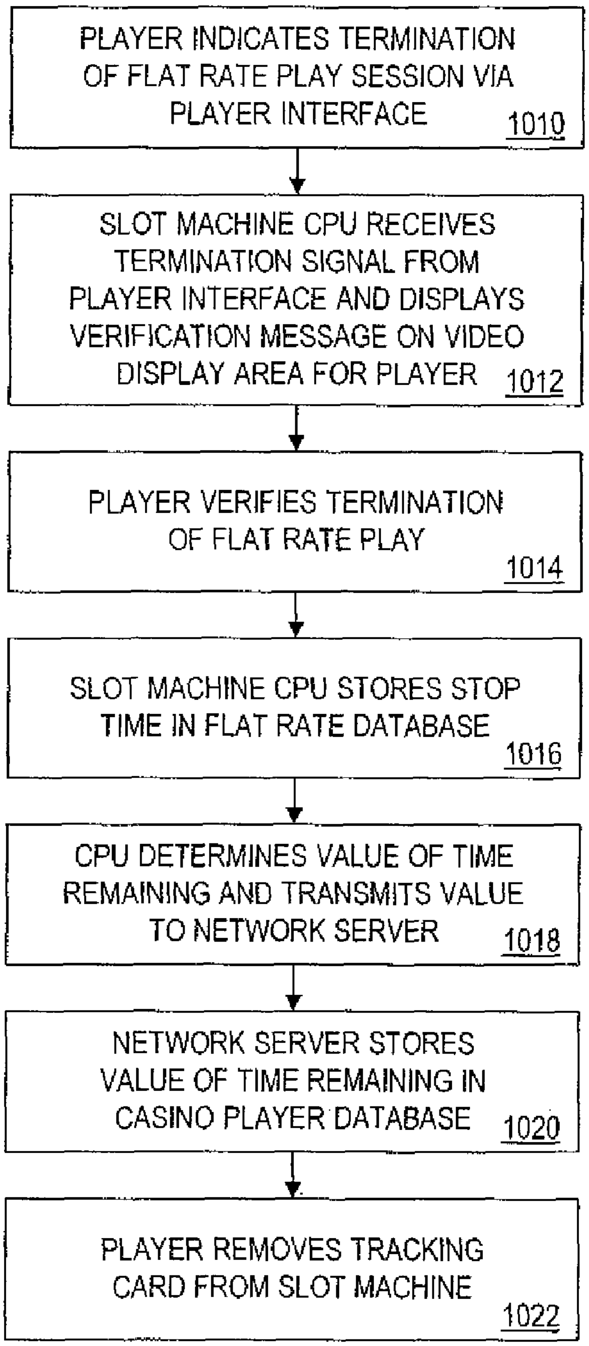
FIG. 10 is a flow diagram of the process of terminating play of the system of FIG. 1.

Turning now to FIG. 10, the operation of the system 100 when the player terminates the flat rate play session prior to the expiration of the session will be described. In step 1010, the player indicates a desire to terminate the flat rate play session via the player interface 264. Consequently, the slot machine 102 CPU 210 receives a termination signal and, in step 1012, displays a message to the player, asking the player to verify termination of the flat rate play session. If the player does not verify termination, then the session continues as described above with reference to FIG. 9. On the other hand, if the player verifies termination, shown as step 1014, the CPU 210 proceeds to store the stop time in the time audit data field 518 of the flat rate database 246 in step 1016.

It is to be understood that having both the start time and the stop time of the flat rate play sessions stored in the flat rate database 246 allows the casino to perform an audit of the session. Specifically, should a player allege that the flat rate play session was shorter than that which was paid for, the casino may access the flat rate database 246 and retrieve the actual start and stop time from the time audit data field 520. In the present embodiment, this time includes an indication of the day, hour, and minute of the play session.

Next, in step 1018, CPU 210 determines the value of the interval remaining in the flat rate play session and transmits the value to the server 106. In order to determine the value of the interval remaining, the CPU 210 accesses the calculation table 227. The value of interval remaining will equal the flat rate price 724 corresponding to the price parameters (i.e., the machine type 710, amount wagered per play 712, player status rating 714, time of day 716, etc.) used to determine the original flat rate price charged to the player. When determining the value of the interval remaining, however, the value in the length of flat rate play session field 722 is not the original length of the session, but rather is equal to the actual interval remaining in the flat rate play session. Stated succinctly, the slot machine 102 identifies the flat rate price 724 corresponding to the actual interval remaining in the flat rate play session.

Once the value of interval remaining is determined, the slot machine 102 transmits the value to the slot network server 106. Upon receiving the value of interval remaining, the server 106 stores the value in field 430 of the casino player database 344 in the player's record, as identified by the player ID number 410. Storing the value is shown as step 1020. Finally, in step 1022, the player removes the player tracking card.

Figure 11A:
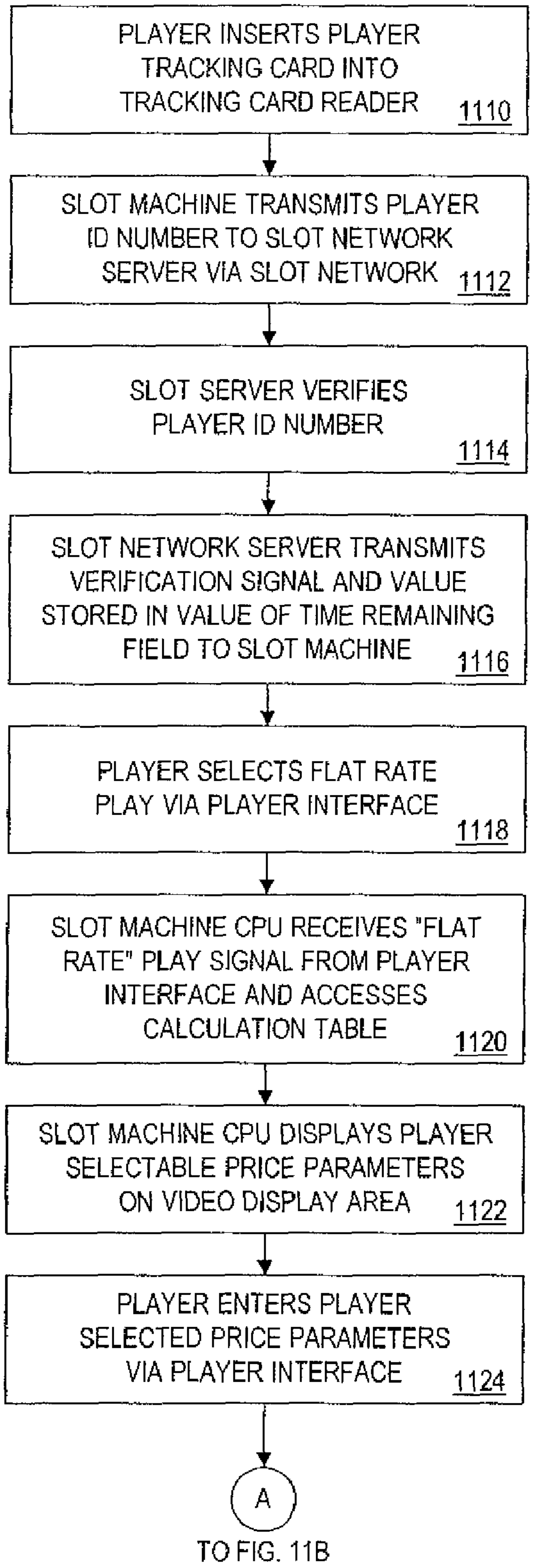
FIGS. 11*a* and 11*b* are flow diagrams of the process of resuming play of the system of FIG. 1.
Figure 11B:
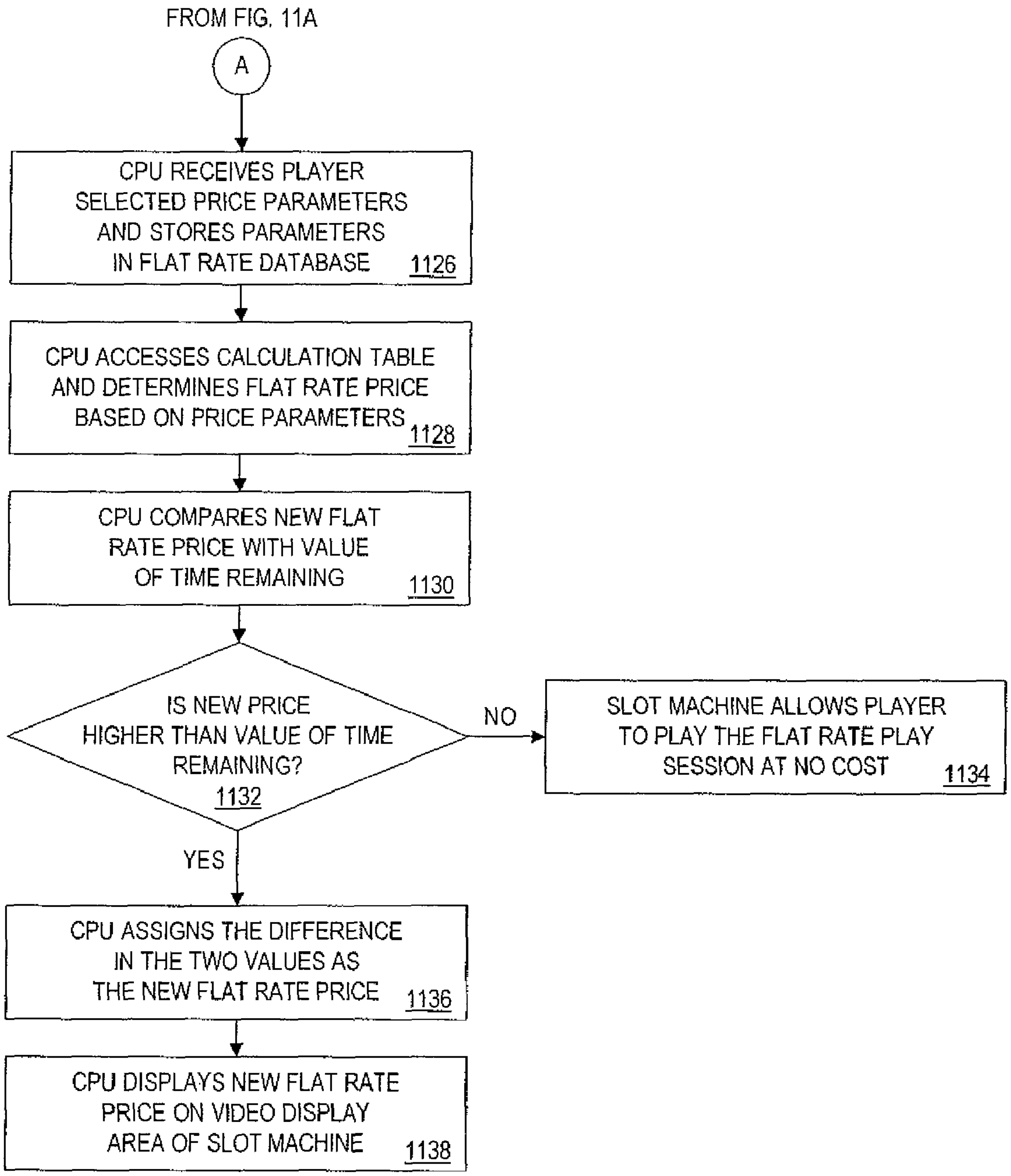

The process of resuming play at another slot machine 102 will now be described with reference to FIGS. 11*a* and 11*b*. The initial operation of the system 100, as indicated by steps 1110-1128, proceeds generally as described above with reference to steps 810-828 of FIGS. 5*a* and 8*b*.

However, once the CPU 210 of slot machine 102 determines a new flat rate price based on the relevant price parameters, the CPU 210 determines whether the player must deposit additional funds.

Specifically, in step 1130, the CPU 210 compares the new flat rate price 724 with the value of interval remaining 430. The server 106 transmits the value of interval remaining 430, as stored in the casino player database 344, to the slot machine 102 in step 1116 so that the comparison may be performed. As indicated by step 1132, the comparison involves determining whether the new flat rate price 724 is higher than the value of interval remaining 430.

If the new price 724 is not higher than the value of interval remaining 430, then, in step 1134, the slot machine allows the player to play the flat rate session at no cost. However, if the new flat rate price 724 is higher than the value of interval remaining 430, then, in step 1136, the CPU 210 assigns the difference in the two values as the new flat rate price. Thus, in step 1138, the CPU 210 displays the new flat rate price on the video display area 238 of the slot machine 102. Thereafter, operation of the system continues as described above with reference to steps 832-836 of FIG. 8*b*.

In an alternate embodiment, when a player terminates the flat rate session early, the value of the interval remaining is added to the player's credit balance, as stored in field 422 of the casino player database 344.

Figure 12A:
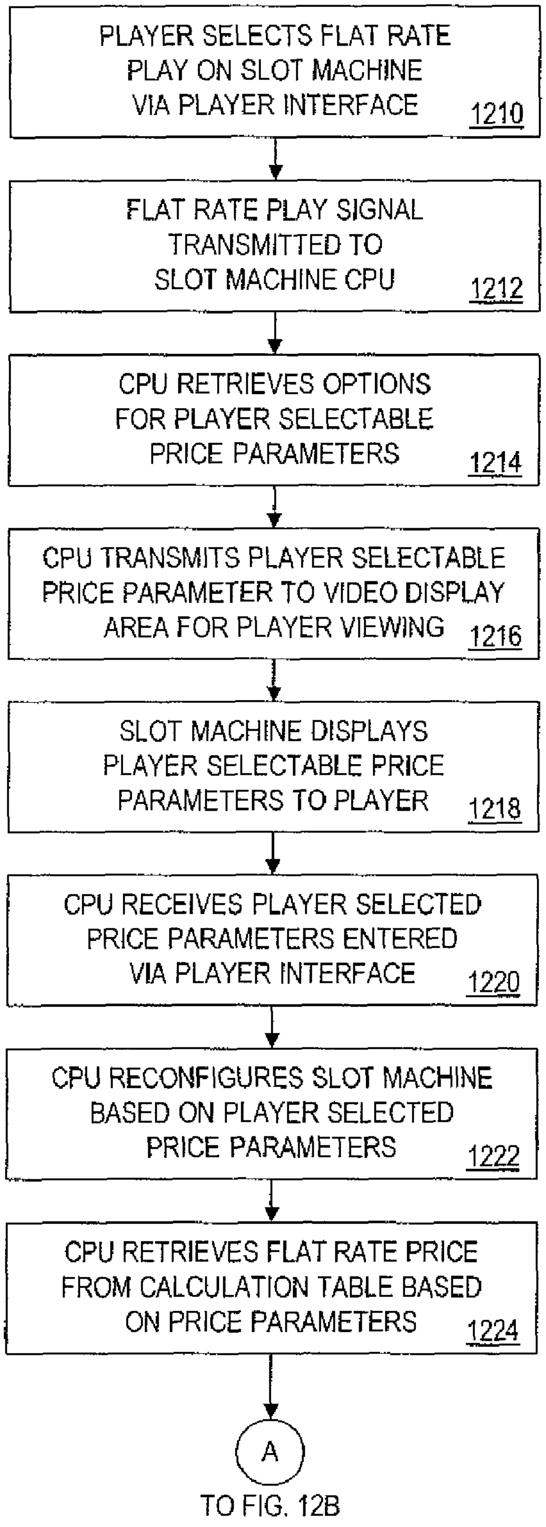
FIGS. 12*a* and 12*b* are overall flow diagrams of the operation of another embodiment of the present invention.
Figure 12B:
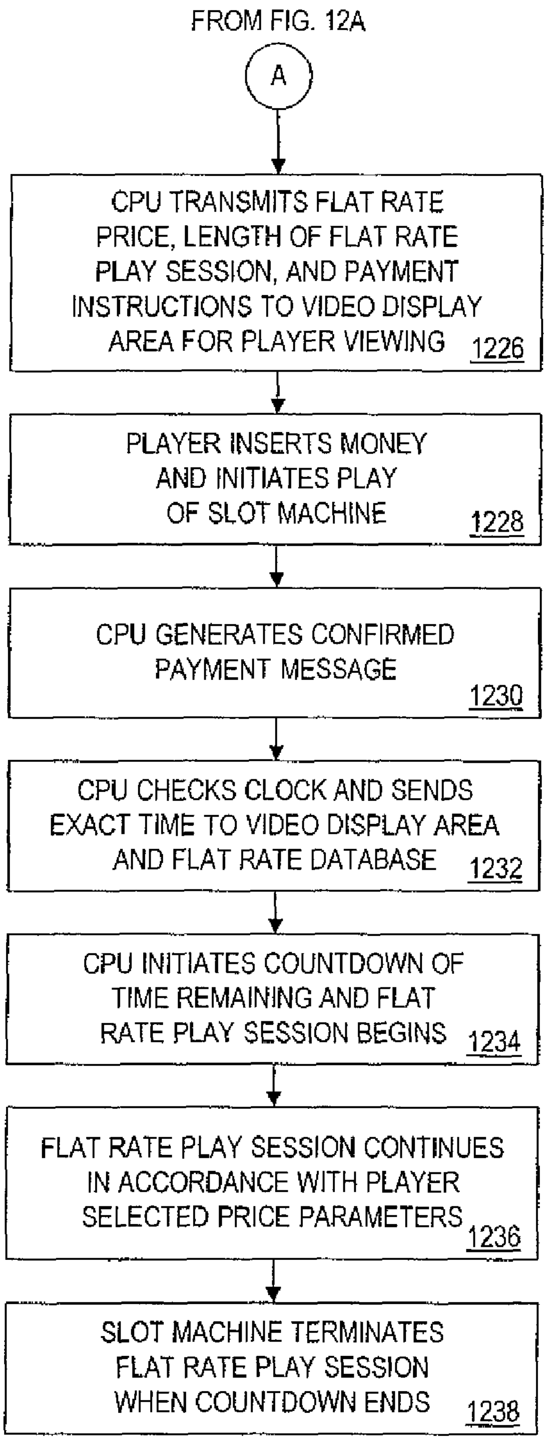

It is to be understood that an embodiment of the present invention need not include both a slot machine and slot network server. For example, an embodiment employing only a slot machine 102 is within the scope of the present invention. Such an embodiment will now be described with reference to FIGS. 12*a*, 12*b*, and 13, and continuing reference to FIGS. 2, 5, and 7. Such an embodiment utilizes the slot machine 102 of FIG. 2.

Initially, the player selects flat rate play on the slot machine 102 in step 1210. Once the player selects flat rate play, the flat rate play signal is transmitted from the player interface 264 to the CPU 210 in step 1212. The CPU 210 then proceeds, in step 1214, to retrieve the player options for selectable price parameters. Then, in step 1216, the CPU 210 transmits the player selectable price parameter options to the video display area 238 for viewing.

Once the player selectable price parameter options have been displayed to the player, the player inputs the player selected price parameters through the player interface 264. Then, in step 1220, the CPU 210 receives the player selected price parameters from the player interface 264.

Once the CPU 210 receives the player selected price parameters, the CPU 210 reconfigures the slot machine 102. Specifically, the CPU 210 generates a signal, or a flag in memory, indicating that there is no need to accept the coins between plays. CPU 210 further sets the pay combination status field 650 in the payout table 228 according to the jackpot structure entered by the player. In an alternate embodiment in which the player selectable price parameters include the time between the handle pulls, the CPU 210 sets an internal timer.

Furthermore, once the slot machine 102 CPU 210 receives the player selected price parameters, it proceeds to access the calculation table 227. By accessing the calculation table 227, the CPU 210 retrieves the flat rate price for the flat rate play session. Retrieving the flat rate price is shown as step 1224. Once the CPU 210 retrieves the flat rate price, it proceeds to transmit the price, the length of the flat rate play session, and payment instructions to the video display area 238 for player viewing in step 1226.

In step 1228, the player reads the data and instructions on the video display area 238 and inserts money into the coin acceptor 248 or a bill acceptor (not shown) in order to initiate play of the slot machine 102. In an alternate embodiment, the player enters a stored value card such as a "smart card" into the card reader 266. Such a smart card has the players credit balance stored thereon. Payment using a smart card further entails the CPU 210 debiting the player's balance on the smart card by the amount of the flat rate price. Further, the player may enter a credit card into the card reader 266.

In step 1230, the CPU 210 generates a confirmed payment message indicating that the player has deposited sufficient funds to cover the flat rate price. Consequently, the CPU 210, in step 1232, sends the current time to both the video display area 238 and the time audit field 518 of flat rate database 246. Next, in step 1234, the CPU 210 initiates the countdown of the interval remaining in the flat rate play session as stored in field 516. The length of the flat rate play session received from the player is initially stored in field 516. The slot machine 102 decrements, or counts down, this value as the flat rate play session begins.

As shown in step 1236, the flat rate play session continues in accordance with the player selected price parameters, if such parameters affect play, in step 1236. During such play, the CPU 210 stores and updates the player's accumulated credits in RAM 218. In an alternate embodiment, the slot machine pays out jackpots as they occur. Finally, in step 1238, the CPU 210 terminates the flat rate play session when the countdown ends.

In an alternate embodiment, the interval of the flat rate play session is not a time period, but rather is a maximum number of plays. In such an embodiment, the slot machine 102 stores the number of plays in the flat rate database 246, as described previously in FIG. 9, and, in step 916, increments a counter for each outcome generated. The counter may be implemented in either software or hardware. Furthermore, in step 918, the slot machine 102 compares the number of plays stored in the flat rate database 246 to the value of the counter. If the value of the counter equals the stored number of plays, then the flat rate play session is terminated.

Figure 13:
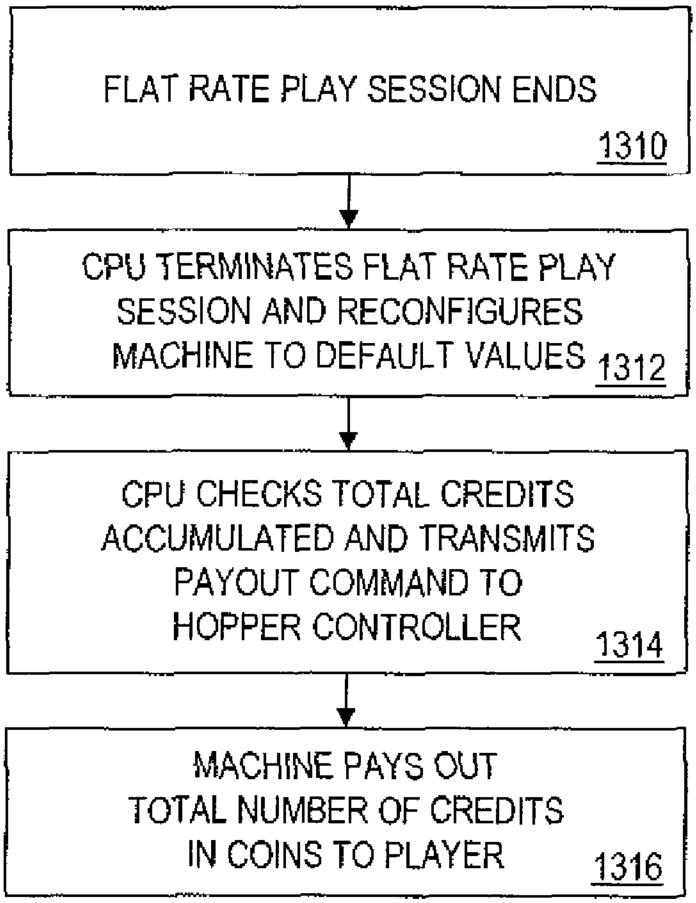
FIG. 13 is a flow diagram of the process of receiving a payout in the embodiment of FIG. 12.

Turning now to FIG. 13, the process of receiving a payout from the present embodiment will he described. As shown as step 1310, the flat rate play session ends upon the termination of the countdown. Specifically, as shown in step 1312, the slot machine 102 CPU 210 terminates the flat rate play session by reconfiguring the slot machine 102 to its default values. For example, the CPU 210 resets the pay combination status field 650 in the payout table 228 to reflect the original jackpot structure. The CPU 210 also generates a signal indicating that coins must be received for each play. In short, the player selected price parameters are no longer in effect.

In step 1314, the CPU 210 checks the total credits accumulated, as stored in the RAM 218, and transmits a payout command to the hopper controller 240. Consequently, in step 1316, the slot machine 102 pays out the total number of credits to the player.

Figure 15:
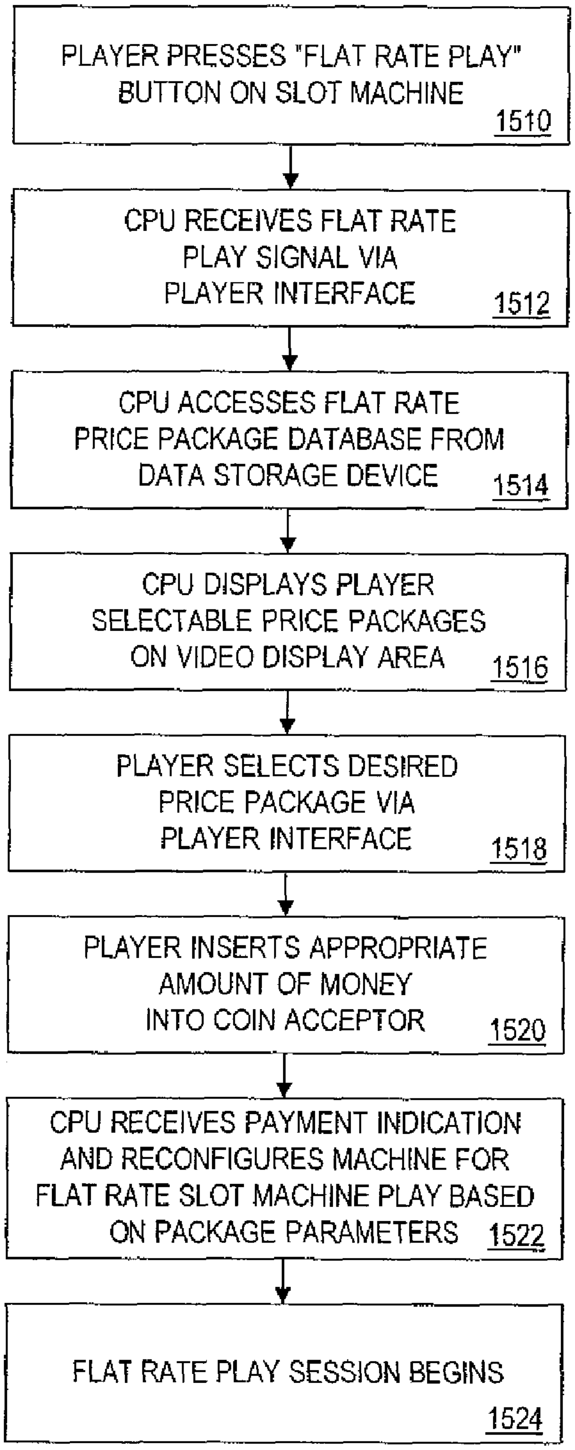
FIG. 15 is an overall flow diagram of the operation of another embodiment of the present invention.

An alternate embodiment of the present invention will now be described with reference to FIG. 15. The operation of slot machine 102, as indicated by steps 1510-1524 below, proceeds generally as described with reference to FIG. 14. In this embodiment, the player selects from a list of casino determined price packages, rather than choosing individual price parameters. Each price package, as stored in the flat rate price package database 229 described above, is a combination of different price parameters which correspond to a flat rate play session price.

In step 1510, the player presses a "flat rate play" button on the slot machine 102. The slot machine 102 CPU 210 receives flat rate play signal from the player interface 264 in step 1512. In this case, the player interface is an actual "flat rate play" button located on the outside of the slot machine 102. Next, in step 1514, the CPU 210 access flat rate price package database 229 from data storage device 224. The CPU 210 then displays the player selectable price packages on video display area 238 in step 1516. It is to be understood that the CPU 210 need not display the packages on the video display area 238, as those package options could be displayed elsewhere on the body of the slot machine 102. Alternatively, player interface 264 could incorporate several "flat rate play" buttons, each representing a different flat rate price package.

Next, in step 1518, the player selects the desired price package via the player interface 264. Having already seen what the price of the selected package is, the player then deposits the appropriate amount of money into coin acceptor 248 in step 1520. For example, the player may have chosen price package four which costs fifty dollars. In return for fifty dollars deposited into the slot machine, the player receives two hundred and fifty handle pulls, with three coins wagered per pull, and with the top three jackpots active in his flat rate play session. These parameters are specified in the flat rate price package database 229.

In step 1522, the CPU 210 receives an indication of payment from the coin acceptor 248 and reconfigures the parameters of slot machine 102 to meet the specifications of the flat rate price package selected by the player. Finally, in step 1524, flat rate play begins.

It is noted that the flat rate price package database 229 could be located at the slot network server 106 and not at each individual slot machine 102. When it is located at the server, certain casino or operator selected parameters could be used to determine the price. For example, there could be different flat rate price packages for different times during the day which are based on projected or actual casino traffic and/or slot machine usage.

As will be appreciated by one of ordinary skill in the art, the key step in getting players to wager money on gaming devices, such as slot machines, is to bring the players to the casino floor. One way in which casinos can bring additional players to the casino floor, and thereby increase total revenues, is by giving away free samples or rewards with a minimum displacement of traditional pay-per-play players. The present invention may be employed for such a purpose.

In one embodiment, for example, the casino could declare a free-play period. During the free-play period, likely chosen by the casino to correspond to down time, when most gaming devices are idle, players insert their player tracking cards into the gaming devices and initiate play without being charged. Specifically, the casino programs the calculation table 227 so that the flat rate price 724 is zero for a given time of day 716 and day of the week 718. It is anticipated that during such a free-play period, the casino will alter the jackpot structure, causing only a selected jackpot to be active. Thus, the lure of free jackpots will bring additional players to the casino floor who will likely continue playing after the free-play period ends. A further benefit of this embodiment is that it would encourage players to become slot club members. This would result in an increase of players who return to the casino and the customer base which the casino markets to through mailings.

It is also to be understood that play of the slot machines during the free-play period need not occur as described above. Thus, in an alternate embodiment, the reels 232, 234, 236 of the slot machines 102 continuously spin, regardless of whether a player has inserted a tracking card, with the server 106 periodically signaling a jackpot on a random machine. Only when a player has inserted a player tracking card is the jackpot awarded. The server 106 randomly selects a machine ID number and, if the machine 102 is not being played by a pay-per-play player, the server 106 transmits a signal to that slot machine 102 directing it to produce a winning outcome.

In an alternate embodiment that achieves substantially the same result of attracting additional players to the floor during down times, the casino issues guests a player tracking card or a smart card having a predetermined free credit balance associated therewith. The casino could then restrict the day and time in which the players could use the free card in a flat rate play session. In another embodiment, the cards provided to guests contain an indication of time, rather than money, for use during a flat rate play session.

Although the foregoing embodiments employ static jackpot structure, which stay the same throughout the flat rate play session, it is within the scope of the present invention to employ dynamic jackpot structures, which change during the flat rate play session. In one such embodiment, the dynamic jackpot structure starts with a given number of active jackpots, as indicated in the pay combination status field 650 of the payout table 228. As the flat rate play session progresses, the number of active jackpots changes. Specifically, as the interval remaining in the flat rate play session decreases, fewer pay combinations are made active. In other words, the slot machine 102 CPU 210 monitors the time and, every fifteen minutes, for example, causes the pay combination status field 650 to change from "active" to "inactive" for a given pay combination 610. Alternatively, the CPU 210 changes the pay combination status field 650 after a predetermined number of plays. In a further variation of this embodiment, individual jackpots may be decreased instead of or in addition to being eliminated (e.g., the jackpot for a particular outcome may decrease from 10 coins to 8 coins as the play session progresses).

As will be appreciated by those skilled in the art, a dynamic jackpot structure based on the time progression of the flat rate play session can increase the revenue generated by the slot machines 102. Specifically, such a dynamic jackpot structure could be used with a flat rate play session whose duration is not a fixed time, but rather a given number of plays. Because fewer jackpots will be active as time progresses, players have an incentive to use their fixed number of plays within a short time period. Stated succinctly, the present invention increases speed of play.

In another embodiment, the jackpot structure is dynamic based not on the progression of the flat rate play session, but rather on the outcomes generated by the slot machine 102. One such embodiment involves changing a particular jackpot from "active" to "inactive" upon a player hitting the outcome corresponding to that pay combination. For example, a player may begin the flat rate play session with all jackpots active. On one play, the slot machine 102 generates a "CHERRY-CHERRY-CHERRY" outcome 610. Upon accessing the payout table 228, the CPU 210 determines that ten coins are to be paid out, credits the player's accumulated credits accordingly, and causes the pay combination status field 650 corresponding to the "CHERRY-CHERRY-CHERRY" outcome 610 to change from "active" to "inactive". Thus, a player can only hit a given jackpot once. As will be appreciated by those skilled in the art, such a dynamic jackpot structure will allow slot machine operators to further discount the flat rate price to attract additional players. Furthermore, it is anticipated that players will be willing to forego hitting the same jackpot multiple times because their focus is typically on hitting the highest Jackpot once.

These and other dynamic jackpot structures may be implemented as either a player selected price parameter or an operator selected price parameter. When implemented as a player selected price parameter, the dynamic jackpot structure is displayed to the player as a player selectable price parameter option. The player, in turn, selects it via the player interface 264. When implemented as an operator selected price parameter, the dynamic Jackpot structure is displayed for player viewing prior to player approval of the flat rate price. Whether the price parameters are selected by the player or the casino operator, the dynamic jackpot structure affects the flat rate price generally as described above, namely, as a field in the calculation table 227 or as a variable in the price algorithm.

In some embodiments of the present invention, an individual may purchase a flat rate play session as a gift for another person. For example, an individual may purchase one of the available flat rate price packages of FIG. 14. In such an embodiment the individual purchasing a flat rate play session may be provided with a flat rate play session identifier, which the purchase in turn provides to the gift recipient. The flat rate play session identifier may be stored by the casino in association with the price parameters defining the flat rate play session. Thus, when the gift recipient inserts the flat rate play session identifier into a gaming device, the gaming device may communicate with the casino server to determine the parameters of the flat rate play session and set itself to such parameters. A flat rate play session identifier may be provided on, for example, a gift card that is magnetically or optically encoded with the flat rate play session identifier such that it may be read by a gaming device.

Figure 16:
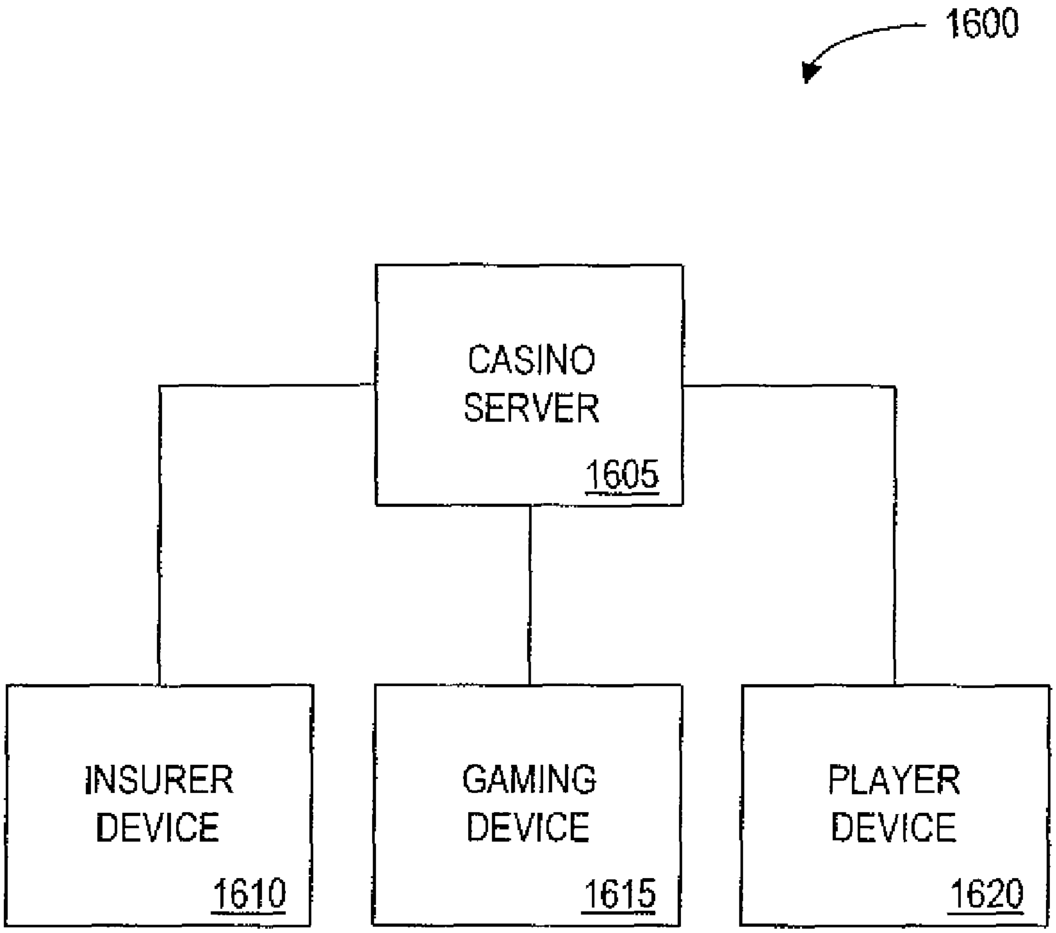
FIG. 16 is an overall schematic view of a system according to another embodiment of the present invention.

Referring again to the figures, FIG. 16 is a schematic representation of an embodiment of a system configured to carry out the contract embodiments described herein. The system 1600 comprises a casino server 1605 in communication with insurer device 1610, a gaming device 1615, and a player device 1620. As used herein, a device (including the casino server 1605, the insurer device 1610, the gaming device 1615 and/or the player device 1620) may communicate, for example, through a communication network such as a Local Area Network (LAN), a Wide Area Network (WAN), a Metropolitan Area Network (MAN), a Public Switched Telephone Network (PSTN), a proprietary network, a Wireless Access Protocol (WAP) network, or an Internet Protocol (IP) network such as the Internet, an intranet or an extranet. Moreover, as used herein, a communication network includes those enabled by wired or wireless technology.

It should be understood that any number of gaming devices and any number of player devices can be used in system 1600. Although system 1600 includes both a casino server 1605 and an insurer device 1610 as illustrated, one or the other of these elements may be omitted (for example, the insurer device may be omitted in embodiments that do not include an insurer or where the casino acts as the insurer). Similarly, although system 1600 includes both a gaming device 1615 and a player device 1620 as illustrated, one or more of these embodiments may be omitted (for example, the player device may be omitted if the casino has not implemented remote gaming). Further, some or all of the functionality of a casino server 1605 may be carried out by insurer device 1610 and vice versa. Similarly, some or all of the functionality of casino server 1605 and/or insurer device 1610 may be carried out by gaming device 1615 and vice versa. In one embodiment, the casino server 1605 comprises one or more computers that are connected to a remote database server.

Figure 17:
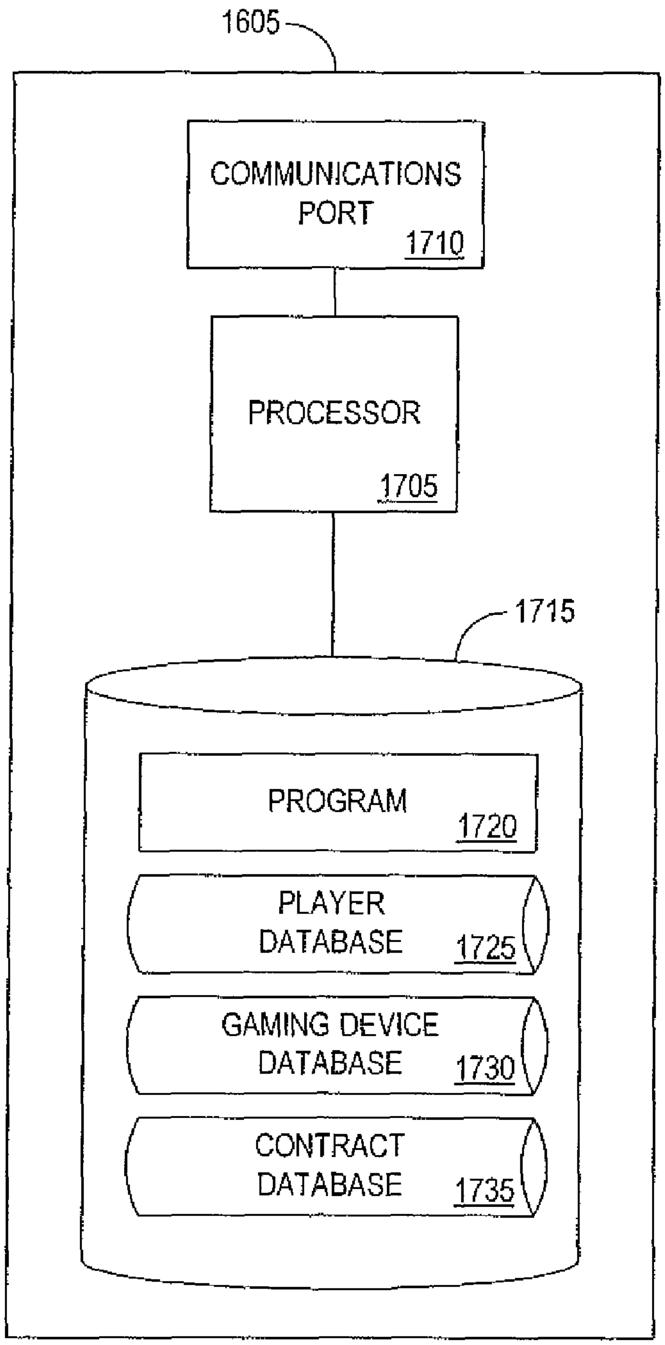
FIG. 17 is a schematic view of the casino server of FIG. 16.

Turning now to FIG. 17, therein depicted is schematic illustration of a casino server 1605. Casino server 1605 is an illustration of an embodiment of the casino server of the same number in FIG. 16. Casino server 1605 comprises a processor 1705 in communication with a communications port 1710 and storage device 1715. Contained in storage device 1715 is a program 1720, a player database 1725, a gaming device database 1725, and a contracts database 1730. Each of these databases will be described in detail below. The processor 1705 performs instructions of the program 1720, and thereby operates in accordance with the present invention. The program 1720 may be stored in a compressed, uncompiled and/or encrypted format. The program 1720 furthermore includes program elements that may be necessary, such as an operating system, a database management system, and "device drivers" used by the processor 210 to interface with peripheral devices. Appropriate program elements are known to those skilled in the art.

Note that the processor 1705 and the storage device 1715 may be, for example, located entirely within a single computer or other computing device or located in separate devices coupled through a communication channel.

Figure 18:
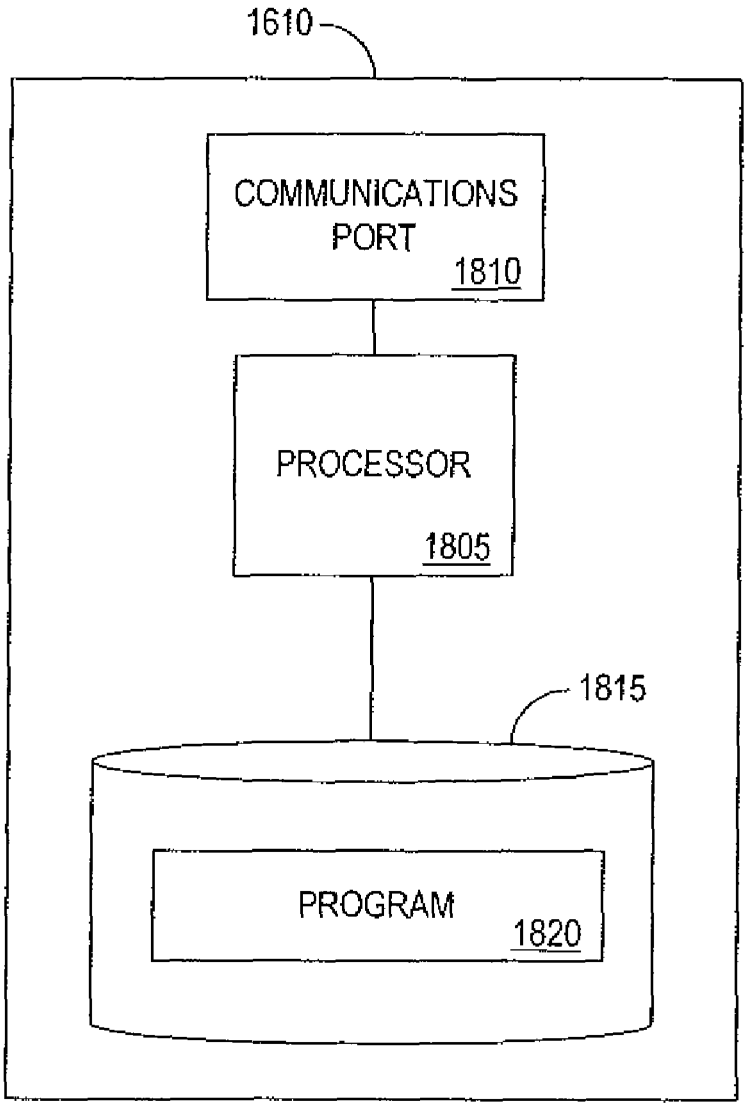
FIG. 18 is a schematic view of the insurer device of FIG. 16.

Turning now to FIG. 18, therein depicted is a schematic illustration of an insurer device 1610. Insurer device 1610 is an illustration of an embodiment of the insurer device 1610 of the same number in FIG. 16. Insurer device comprises a processor 1805 in communication with a communications port 1810 and a storage device 1815. Storage device 1815 stores a program 1820. The processor 1805 performs instructions of the program 1820, and thereby operates in accordance with the present invention. The program 1820 may be stored in a compressed, uncompiled and/or encrypted format. The program 1820 furthermore includes program elements that may be necessary, such as an operating system, a database management system, and "device drivers" used by the processor 1805 to interface with peripheral devices. Appropriate program elements are known to those skilled in the art. Note that the processor 1805 and the storage device 1815 may be, for example, located entirely within a single computer or other computing device or located in separate devices coupled through a communication channel.

Figure 19:
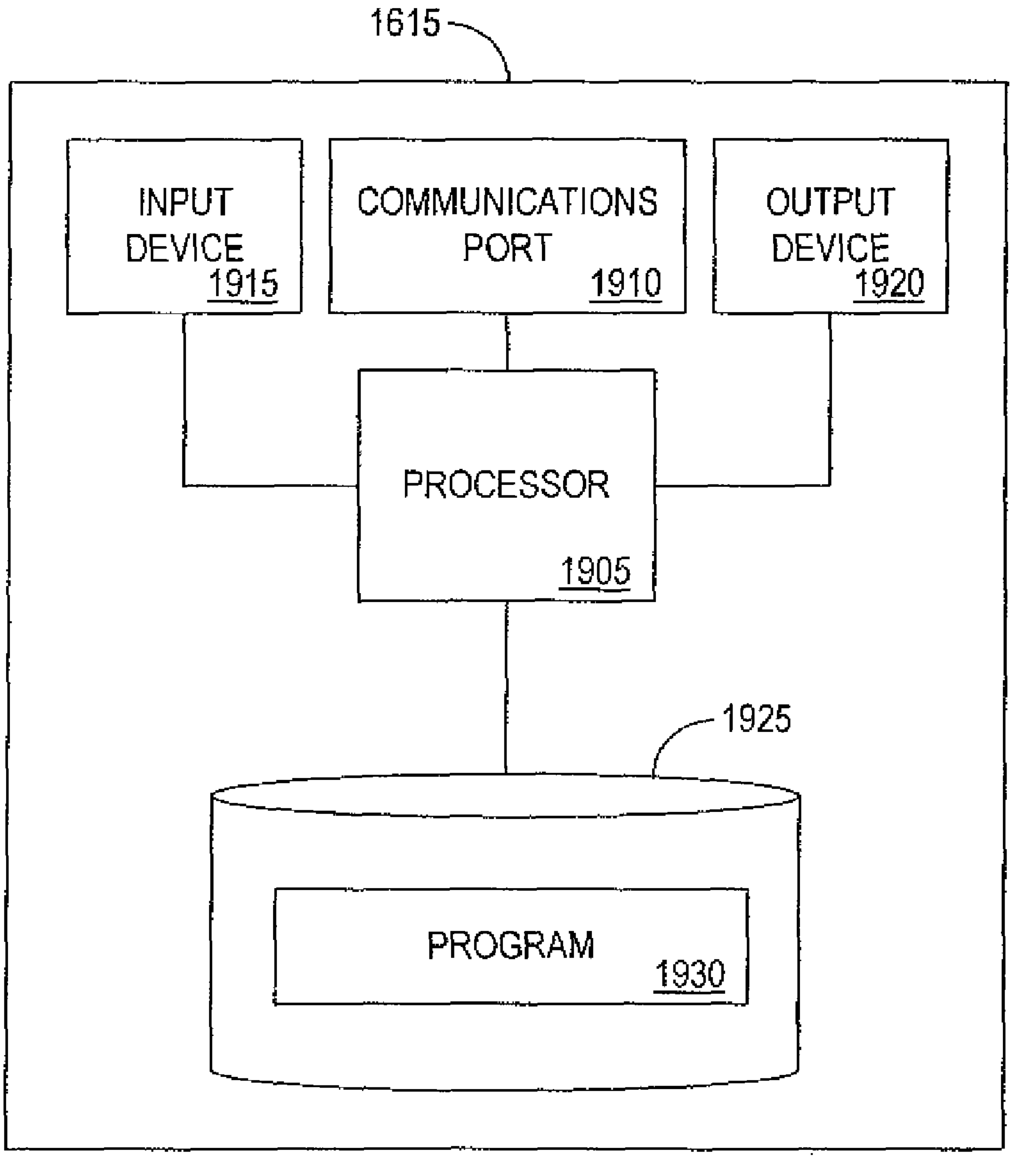
FIG. 19 is schematic view of the gaming device of FIG. 16.

Turning now to FIG. 19, therein depicted is a schematic illustration of a gaming device 1615. Gaming device 1615 is an illustration of an embodiment of the gaming device of the same number depicted in FIG. 16. Gaming device 1615 comprises a processor 1905 in communication with a communications port 1910, an input device 1915, an output device 1920, and a storage device 1925. Storage device 1925 stores a program 1930. The processor 1905 performs instructions of the program 1930, and thereby operates in accordance with the present invention. The program 1930 may be stored in a compressed, uncompiled and/or encrypted format. The program 1930 furthermore includes program elements that may be necessary, such as an operating system, a database management system, and "device drivers" used by the processor 1905 to interface with peripheral devices. Appropriate program elements are known to those skilled in the art.

Note that the processor 1905 and the storage device 1925 may be, for example, located entirely within a single computer or other computing device or located in separate devices coupled through a communication channel.

Input device 1915 may comprise, for example, a player slot card interface, a keypad, a touch-screen, a microphone and/or any other device which allows a player to input information into gaming device 1615. Output device 1920 may comprise, for example, a display area, a microphone, and/or any other device that allows gaming device 1615 to output information to a player. Gaming device 1615 may comprise, for example, a slot machine, video poker machine, video keno machine, a video bingo machine, a video lottery terminal, a video pachinko machine, or a video blackjack machine. A combination of these type of machines may be used in embodiments where casino server 1605 is in communication with more than one gaming device 1615.

Figure 20:
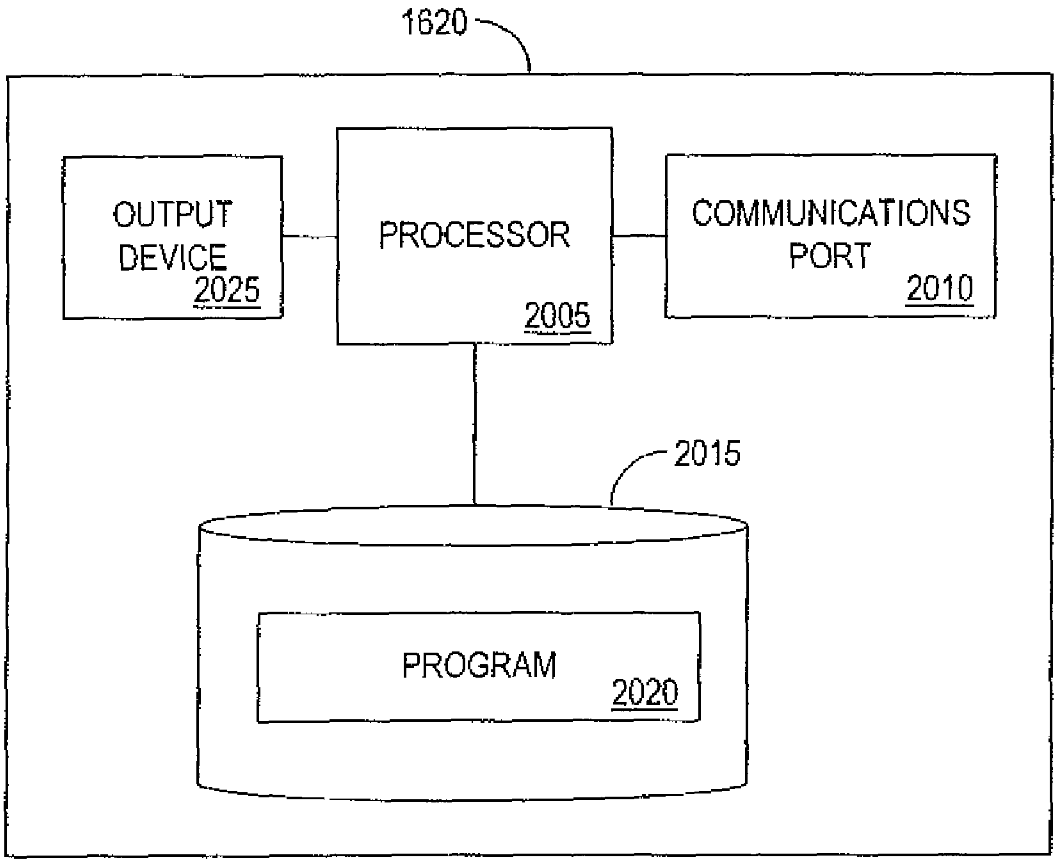
FIG. 20 is a schematic view of the player device of FIG. 16.

Turning now to FIG. 20, therein depicted is a schematic illustration of a player device 1620. Player device 1620 is an illustration of an embodiment of the player device of the same number depicted in FIG. 16. Player device 1620 may be, for example, a personal computer (PC), laptop, personal digital assistant, a cellular telephone, a pager, and/or any other device that allows a player to remotely monitor and participate in play of a gaming device in accordance with the present invention. Player device 1620 comprises a processor 2005 in communication with a communications port 2010 and a storage device 2015. Storage device 2015 stores a program 2020. The processor 2005 performs instructions of the program 2020, and thereby operates in accordance with the present invention. The program 2020 may be stored in a compressed, uncompiled and/or encrypted format. The program 2020 furthermore includes program elements that may be necessary, such as an operating system, a database management system, and "device drivers" used by the processor 2005 to interface with peripheral devices. Appropriate program elements are known to those skilled in the art. Note that the processor 2005 and the storage device 2015 may be, for example, located entirely within a single computer or other computing device or located in separate devices coupled through a communication channel.

It should be noted that any and all of the processors 1705, 1805, 1905, and 2005 may comprise one or more microprocessors such as one or more INTEL® Pentium® processors. Further, any and all of the storage devices 1720, 1815, 1925, and 2015 may comprise any appropriate storage device, including combinations of magnetic storage devices (e.g., magnetic tape and hard disk drives), optical storage devices and semiconductor memory devices, such as Random Access Memory (RAM) devices and Read Only Memory (ROM) devices.

Examples of databases that may be used in connection with the system 1600 will now be described in detail with respect to FIGS. 21 through 23. Each figure depicts a database in which the data is organized according to a data structure in accordance with embodiments of the present invention. The data may be stored, for example, on a computer readable medium and be accessible by a program executed on a data processing system. The schematic illustrations and accompanying descriptions of the databases presented herein are exemplary, and any number of other database arrangements could be employed besides those suggested by the figures.

Referring to FIG. 21, a table represents one embodiment of the player database 1720 that may be stored at the casino server 1605 shown in FIG. 16 according to an embodiment of the present invention. The table includes entries identifying players that may be participating in contracts for flat rate play sessions with system 1600. The table also defines fields 2105, 2110, 2115, 2120, 2125, 2130, and 2135 for each of the entries. The fields specify (i) a player identifier 2105 that uniquely identifies a player; (ii) a name 2110 associated with the player; (iii) an address 2115 that facilitates communications with the player; (iv) a financial account identifier 2120, such as a credit or debit card account, associated with the player through which payment may be obtained and to which player winnings may be credited; (v) demographic information 2125 that may be utilized to determine a price or other terms for a contract; (vi) credits 2130 that represent the amount of casino credits associated with the player; and (vii) a lifetime coin in 2135 that represents the amount of coin in wagered by the player over the course of his or her relationship with the casino and/or insurer.

Referring to FIG. 22, a table represents one embodiment of the gaming device database 1725 that may be stored at the casino server 1605 shown in FIG. 16 according to an embodiment of the present invention. The table includes entries identifying gaming devices operated by the casino. The table also defines fields 2205, 2210, and 2215 for each of the entries. The fields specify a (i) a gaming device identifier 2205 that identifies a gaming device; (ii) a name 2210 associated with the gaming devices, such as, for example, Diamond Mine®; and (iii) a manufacturer 2215 of the gaming device.

Referring to FIG. 23, a table represents one embodiment of the contract database 1730 that may be stored at the casino server 1605 shown in FIG. 16 according to an embodiment of the present invention. The table includes entries identifying contracts that may or have been purchased via the system 1600. The table also defines fields 2305, 2310, 2315, 2320, 2325, 2330, 2335, 2340, and 2345 for each of the entries. The fields specify (i) a contract identifier 2305 that identifies a contract that has been purchased or is available for purchase by a player; (ii) a player identifier 2310 that identifies a player, if any, that may be associated with the contract; (iii) an initial bankroll 2315; (iv) a description 2320 that describes the terms of the contract; (v) a cost 2325 of the contract; (vi) a result 2330 that indicates the current status of the contract; (vii) an amount owed the player 2335; (viii) an amount owed the insurer 2340; and (ix) a total amount owed the insurer 2345.

Figure 24:
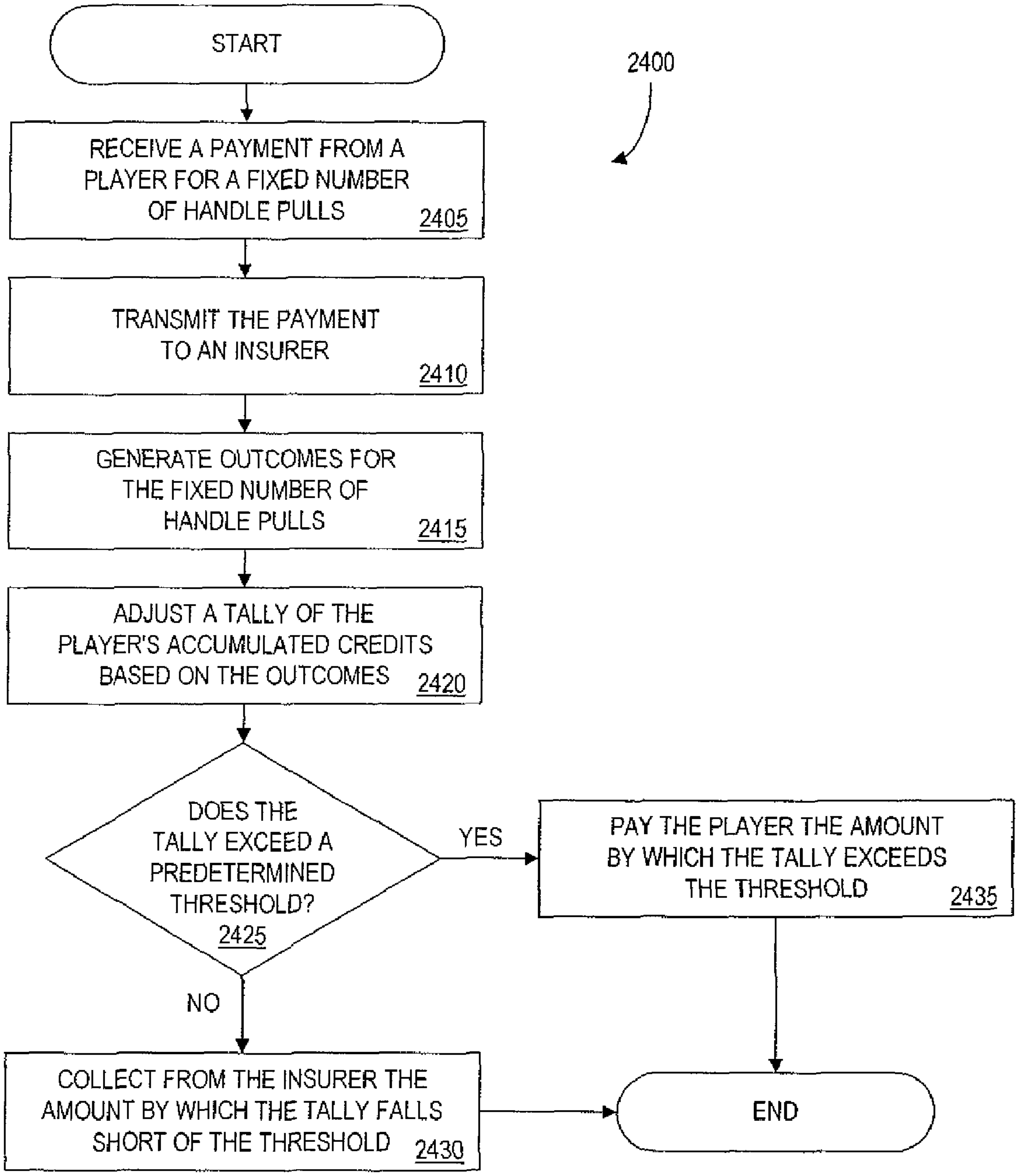
FIG. 24 is a flowchart illustrating a process in accordance with one or more embodiments of the present invention.

A method that may be used in connection with the system 1600 according to an embodiment of the present invention will now be described in detail with respect to FIG. 24. The method shown in FIG. 24 may be performed, for example, by a casino server 1605 in response to a player's request to purchase a contract and after determining the price and terms of the contract the player wishes to purchase. This flow chart does not imply a fixed order to the steps, and embodiments of the present invention may be practiced in other orders.

The method 2400 begins upon receipt of payment from a player for a fixed number of pulls in step 2405. In other embodiments this step may comprise receipt of payment for a fixed duration of time during which the player may play. Receipt of payment may comprise, for example, receipt of a monetary input into a gaming device 1615 or receipt of (and, e.g., approval of a charge on) a financial account identifier. The received payment, or an indication of it, is then transmitted to an insurer in step 2410. Outcomes are then generated for a fixed number of pulls in step 2415. An adjustment of a tally of the player's accumulated credits based on the outcomes is performed in step 2420.

In step 2425 it is determined whether the adjusted tally exceeds a predetermined threshold. If it does, the method 2400 proceeds to step 2435 where the player is paid the amount by which the tally exceeds the threshold. Payment to the player may be achieved by, for example, outputting a monetary amount comprising the payment to the player at the gaming device or by crediting the amount of the payment to a financial account identifier associated with the player. If it is determined in step 2425 that the adjusted tally does not exceed the predetermined threshold then the method 2400 proceeds to step 2430 in which the amount by which the tally falls short of the threshold is collected from the insurer.

Figure 25:
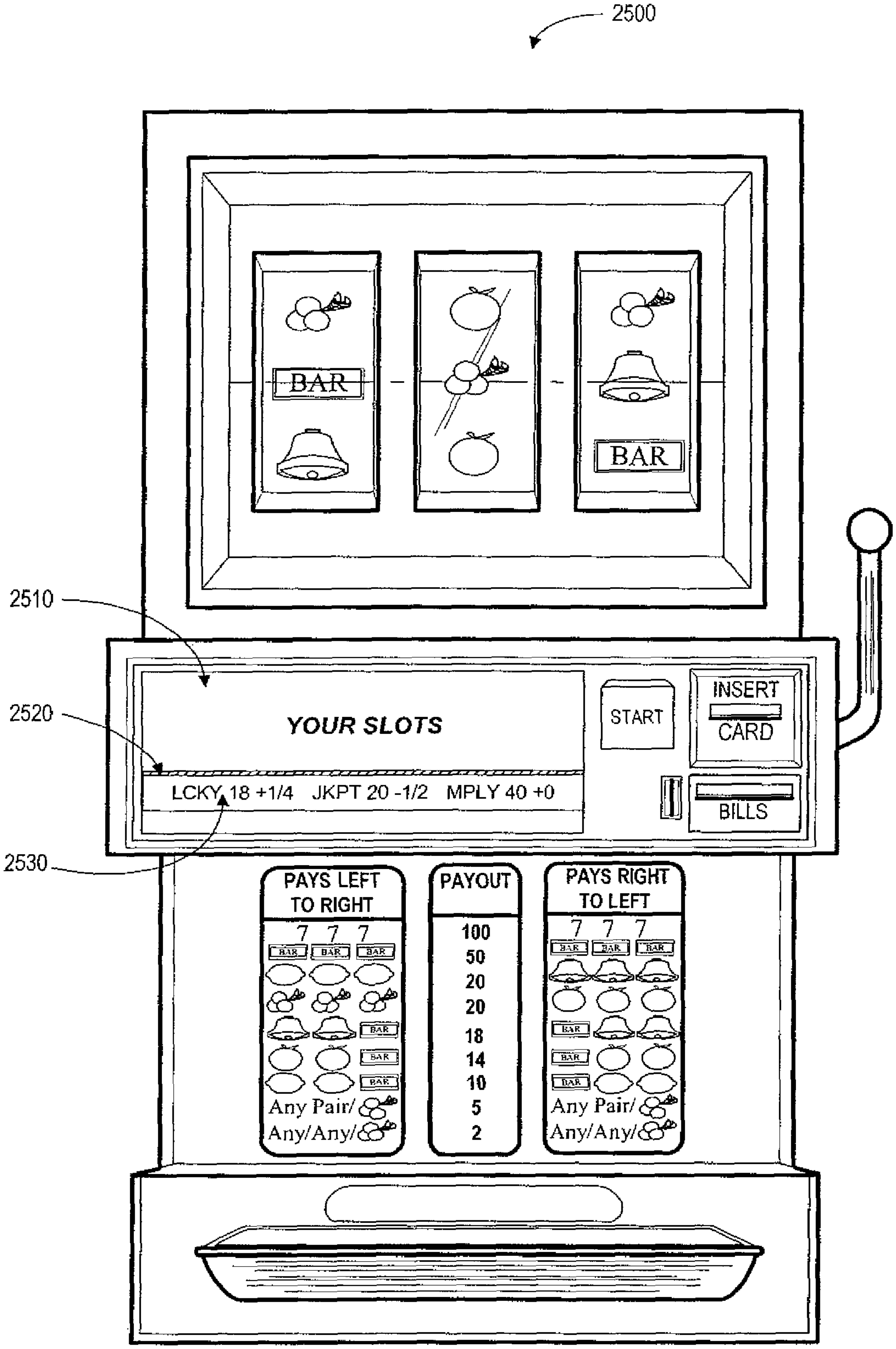
FIG. 25 depicts an exemplary display in accordance with one or more embodiments of the present invention.

FIG. 25 depicts an exemplary slot machine 2500 in accordance with one or more embodiments of the present invention. A display 2510 of the slot machine provides information about contracts being executed on behalf of the player. Exemplary display 2510 indicates three ticker symbols to represent session information to a player. The player has contracts executing on three slot machines. The contracts (and their respective corresponding game play sessions) are denoted by the symbols "LCKY" 2530, "JKPT", and "MPLY." The numbers next to each contract symbol show the player's gross winnings for the contract executing on the corresponding slot machine, as well as the change in the gross winnings since the last time the symbol was displayed. The symbols and the session information are being displayed in a display are 2520 of the display 2510. The display area 2520 may be an information crawler that represents information as in motion across the display area. Of course, the information may be displayed as stationary.

It will be understood that the type of information depicted in FIG. 25 is exemplary; many other types of additional or supplemental information may be provided. With many statistics to display, and with many possible machines on which to execute contracts, a player might fill up a ticker tape, making it look much like the ticker tape coming from the stock market. Although the ticker symbols are depicted as being displayed at a slot machine, it will be understood that symbols and other types of game play session information may be communicated to a player at other types of gaming devices and/or at one or more player devices (e.g., a PDA, a television).

Figure 26:
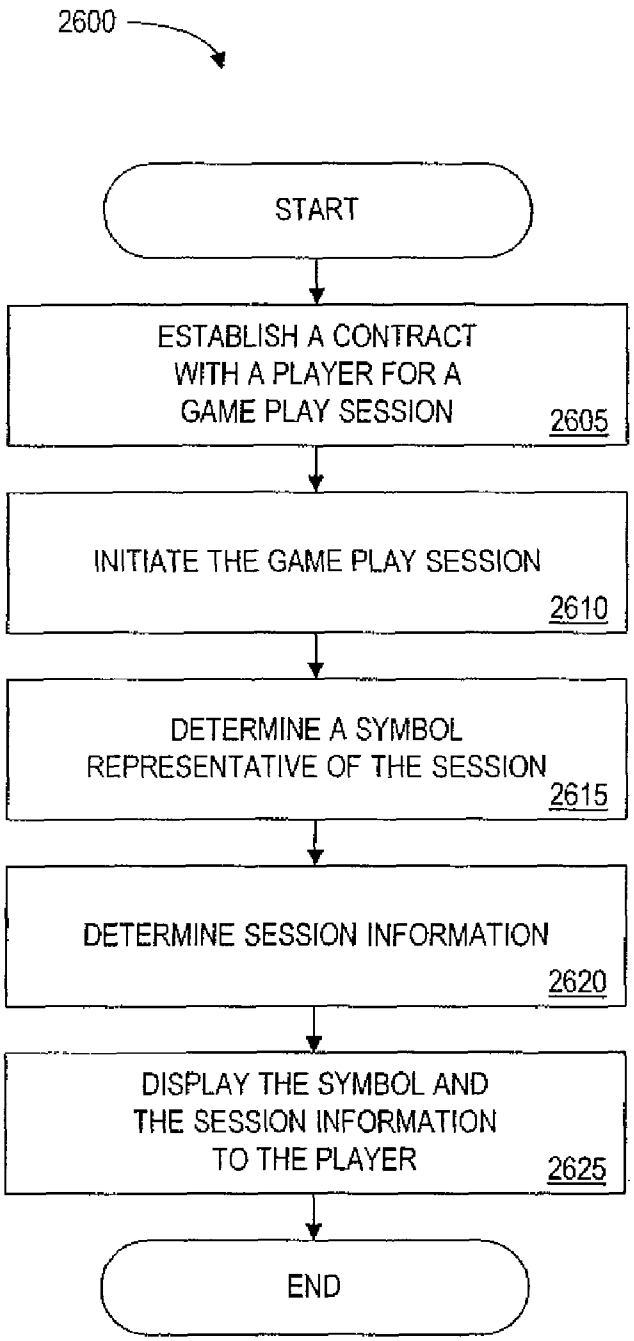
FIG. 26 is a flowchart illustrating a process in accordance with one embodiment of the present invention.

A method that may be used in connection with the system 1600 according to one or more embodiments of the present invention will now be described in detail with respect to FIG. 26. The method shown in FIG. 26 may be performed, for example, by a casino server 1605 in response to a triggering condition for offering a player a contract, or in response to a player's request to enter into a contract. This flow chart does not imply a fixed order to the steps, and embodiments of the present invention may be practiced in other orders.

The method 2600 begins by establishing a contract with a player for a session of two or more plays of a gaming device in step 2605. As discussed herein, the session may include a fixed number of pulls and/or may be for a fixed duration of time. Establishing the contract may comprise receiving payment for the contract and/or receiving an amount of funds for use in executing the contract, such as a bankroll. Various ways in which a contract may be offered to and accepted by a player are discussed herein. After the contract is established, the session is initiated in step 2610. For example, in response to a signal from the casino server 1605, at least one gaming device may begin generating outcomes in accordance with one or more terms of the contract. A symbol that is representative of the session is determined in step 2615. For example, a ticker symbol may be generated by the casino server 1605, or may be selected by a player (e.g., by inputting at a gaming device, kiosk, or Web site). Session information that is based on at least one play of the session is determined in step 2620. Many types of information are described herein, and others will be readily apparent to those skilled in the art in light of the present disclosure. The symbol and the session information are displayed to the player in step 2625. In one embodiment, the symbol and the session information are displayed to the player simultaneously. For example, a ticker symbol and associated session information (e.g., an outcome, an amount of credits remaining in a bankroll) may crawl across the bottom of a display screen. In another embodiment, the symbol and the information are not displayed at the same time.

Figure 27:
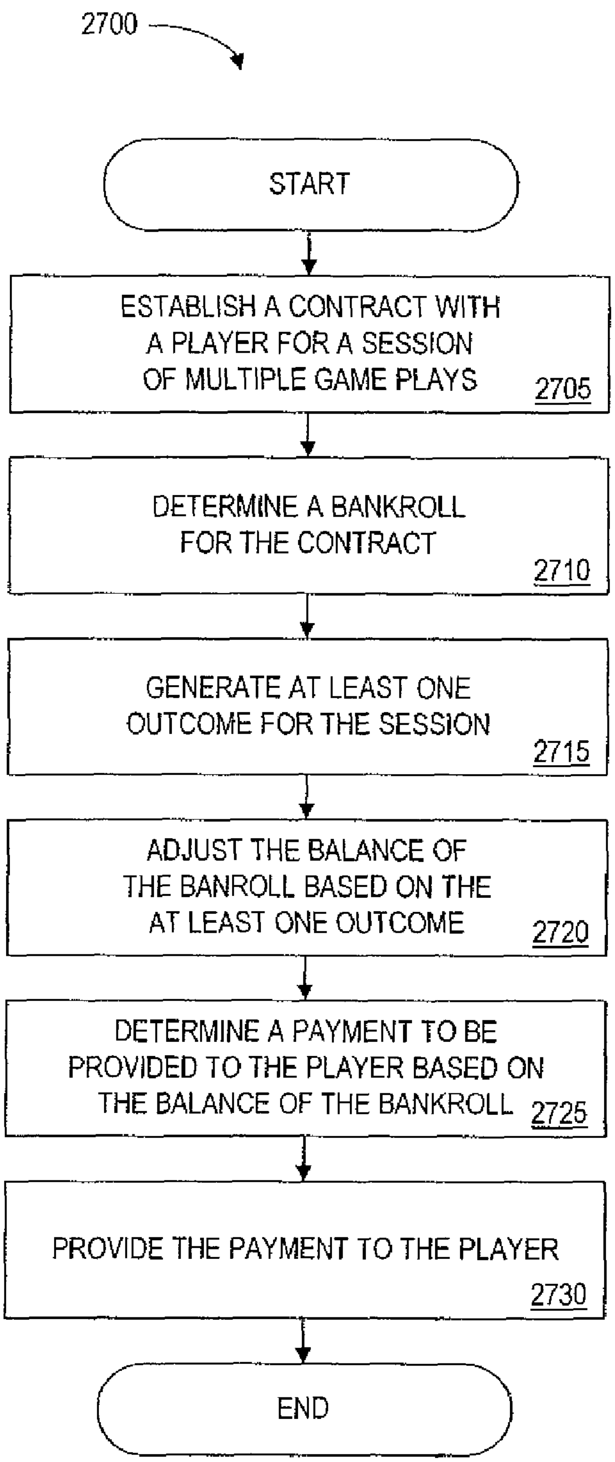
FIG. 27 is a flowchart illustrating a process in accordance with one embodiment of the present invention.

A method 2700 that may be used in connection with the system 1600 according to one or more embodiments of the present invention will now be described in detail with respect to FIG. 27. The method shown in FIG. 27 may be performed, for example, by a casino server 1605 (and/or a gaming device 1615). This flow chart does not imply a fixed order to the steps, and embodiments of the present invention may be practiced in other orders.

In step 2705, a contract is established with a player for a session of multiple game plays, as discussed variously herein. A bankroll is also determined in step 2710. For example, the player provides an amount of funds for use in executing the contract (e.g., for use in placing wagers on game plays during a contracted session). In another example, the casino establishes a credit balance based on the price of a purchased contract (e.g., a one thousand credit balance in exchange for $50). The bankroll may comprise one or more credit balances or financial accounts (e.g., a credit card account). At least one outcome is generated for the session in step 2715. For example a handle pull is made at a slot machine (e.g., automatically, or by the player) and a reel outcome is determined. The balance of the bankroll is adjusted based on the at least one outcome in step 2720. For example, if the outcome is a winning outcome, a payout amount may be added to the balance. In some embodiments, the generating of an outcome may decrease the balance. For example, a bankroll may be decremented by $1 for each handle pull at a $1 slot machine.

In step 2725, a payment is determined based on the balance of the bankroll. For example, as discussed herein, a player may specify that a portion of a bankroll is to be distributed to the player each week. As discussed herein, a fixed or variable percentage may be specified for determining how much the payment is to be. In step 2730, the payment is provided to the player. For example, the payment may be mailed as a check to the player, or may be credited to a balance at a gaming device that the player is currently playing.

Figure 28:
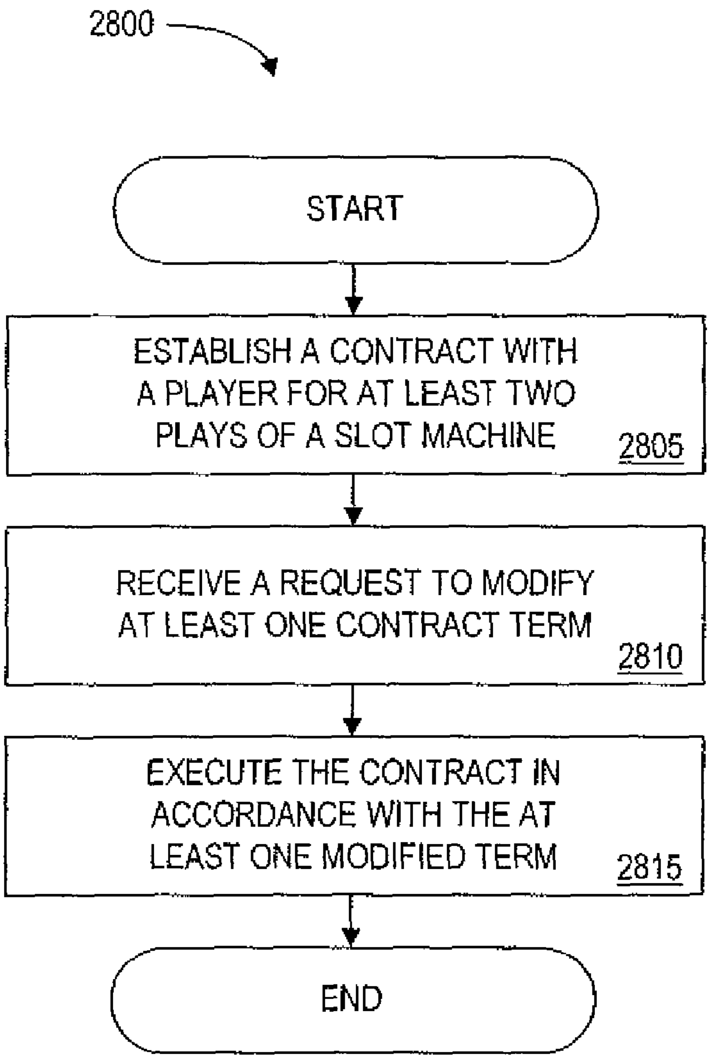
FIG. 28 is a flowchart illustrating a process in accordance with one embodiment of the present invention.

A method 2800 that may be used in connection with the system 1600 according to one or more embodiments of the present invention will now be described in detail with respect to FIG. 28. The method shown in FIG. 28 may be performed, for example, by a casino server 1605 (and/or an insurer device 1610). This flow chart does not imply a fixed order to the steps, and embodiments of the present invention may be practiced in other orders.

Figure 29:
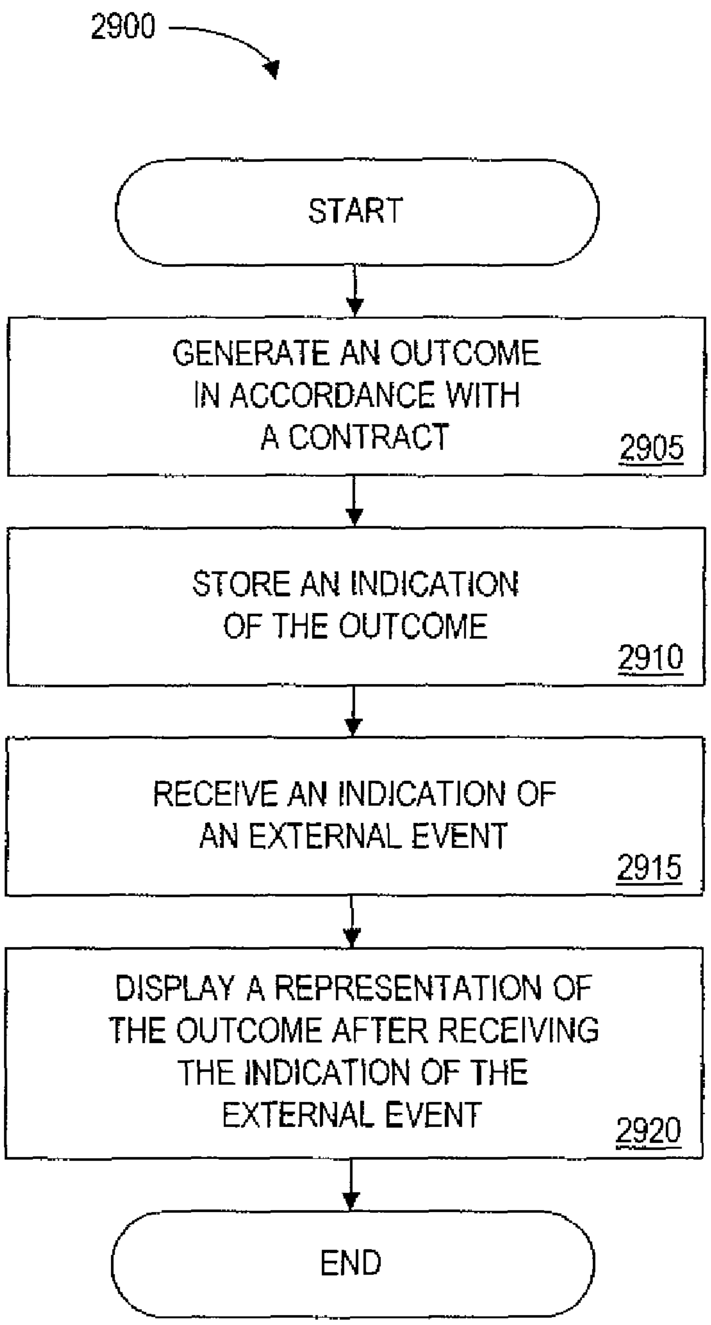
FIG. 29 is a flowchart illustrating a process in accordance with one embodiment of the present invention.

In step 2805, a contract is established with a player. In step 2810, a request is received to modify at least one term of the contract. For example, the request may be received from the player or from an agent authorized to act on behalf of the player. The at least one term may be modified in response to the request. In step 2815, the contract is executed in accordance with the at least one modified contract term. A method 2900 that may be used in connection with the system 1600 according to one or more embodiments of the present invention will now be described in detail with respect to FIG. 29. The method shown in FIG. 29 may be performed, for example, by a casino server 1605, a gaming device 1615, and/or a player device 1620). This flow chart does not imply a fixed order to the steps, and embodiments of the present invention may be practiced in other orders.

In step 2905, an outcome is generated in accordance with a contract. For example, one of a fixed number of handle pulls may be initiated at a slot machine. An indication of the outcome is stored in step 2910. For example, an indication of the outcome may be stored by a gaming device and/or transmitted to a casino server for storage in a database of outcomes associated with the contract. In another example, an indication of the outcome is transmitted to a player device and stored at the player device (e.g., a personal computer). In step 2915, an indication of an external event is received. For example, a casino server receives a signal indicating the occurrence of an event in a sports game (e.g., a home run in a professional baseball game). A representation of the outcome is displayed in step 2920. For example, if the outcome is a winning outcome, it may be displayed to the player upon receiving an indication that a touchdown has been scored in a football game. In some embodiments, a representation of the event may also be communicated to the player. For example, video of a scoring play in a sporting event may be transmitted to a player device.

Additional Embodiments

In some embodiments, a first player enters into a contract whereby he will place wagers that will be resolved based on the outcomes generated at a second player's gaming device. For example, Joe enters into a contract where he provides $50. Joe then receives the equivalent of any payouts given to Linda, a gambler at a nearby $1 machine, during her next fifty handle pulls. If, in her next fifty handle pulls, Linda receives $35 worth of payouts, then Joe will also receive $35. Linda may never know that Joe has money at risk on the outcomes generated at her machine. In one embodiment, the second person is a gambler on the casino floor, such as Linda, who is making wagers and handle pulls at her own pace. The first player may be at the casino or at a remote location. In another embodiment the second person is a remote player. In this embodiment, the second person may have her own contract with the casino, whereby the casino makes wagers on the second person's behalf. Once again, the first player may be at the casino or at a remote location.

In some embodiments, the first player does not make the same wager as does the second player, and may therefore not receive the same payouts. To illustrate, suppose in the above example that Linda had been at a quarter slot machine. While Linda herself may have wagered quarters on every outcome, Joe may have wagered $1 on Linda's outcomes. Then for every payout Linda received, Joe may have received four times as much.

In some cases, the first player may make bets on the outcomes generated by the second player, but the first person's bets may not be of the same type. For example, the first person places a bet that pays off only if the next outcome generated by the second player's gaming device is a losing outcome. Therefore, if the second player generates a winning outcome, then the second player wins and the first player loses.

At times a first player may make bets on the outcomes to be generated by a second player, but the second player may not complete the full number of pulls required by the first player's contract. For example, Joe contracts to wager on the next fifty of Linda's handle pulls, and Linda ceases gambling after 30 handle pulls. In this case, several remedies may occur. Joe's contract may simply terminate automatically if Linda goes for a predefined period without making any handle pulls. Alternatively, the casino may automatically generate enough outcomes at Linda's gaming device to complete Joe's contract. In still another embodiment, certain outcomes generated by Linda may be reused. Thus, the last of Linda's 30 handle pulls may count for Joe as outcomes 11 through 30 and as outcomes 31 through 50. Many other remedies are possible.

In some embodiments, a first player wishes to make bets on the outcomes generated by a second player, but wishes to find a suitable second player who meets certain criteria. Exemplary criteria may include: the second person is of the first player's age, the second person is of a certain gender, the second person has a birthday during the same month as does the first person, the second person has been on a winning streak, the second person has been on a losing streak, the second player is at a particular type of machine, and so on. Therefore, the casino may provide to the first player statistics on various other players. The statistics may include statistics relating to any criteria of interest to the first player. The casino may, however, withhold certain information about other players, so as to protect the other players' privacy. Once the casino has shown statistics to the first player, the first player may choose one or more other players on which to place wagers.

In some embodiments, it may be important that a first player does not know the identity of the player on whose outcomes his contract is based. The reason is that the casino may wish to prevent the first player from communicating with the second player, and thereby influencing the second player's gambling actions. By influencing the second player's gambling actions, the first player would influence his own gambling results, possibly from a remote location. Therefore, the casino may, for example, choose the second player randomly, so that the first player is unlikely to know the identity of the second player. The casino may also choose a second player who is in a casino other than that of the first player.

Suppose that multiple people enter into contracts whereby each person will place wagers which resolve based on the outcomes generated by a single player. For instance, Joe, Sam, Linda, and Chris all win money if a slot machine being played by Bob generates a winning outcome. Similarly, Joe, Sam, Linda and Chris all lose money if a slot machine being played by Bob generates a losing outcome. If enough people win or lose money based on the same outcome, then the casino might risk financial damage should the outcome turn out to be a jackpot. For example, if the outcome were to be a jackpot, then Joe, Sam, Linda, Chris, and Bob would all have to be paid jackpots. If the jackpot is one million dollars, than the casino has to pay out five million dollars. Such a payout might strain the casino's finances. Therefore, where multiple people have stakes in a single outcome, the casino might purchase insurance against a jackpot or other large outcome occurring. For instance, the casino might pay three cents per person per spin as an insurance premium to an insurer. Then, should the outcome turn out to be a jackpot, the insurer would cover at least part of the cost of paying the jackpot to each of Joe, Sam, Linda, Chris, and Bob.

Numerous variations on the above-described contract embodiments of the present invention may be practiced without departing from the spirit and scope of the present invention. For example, a player may be halfway through a contract and have negative two hundred accumulated credits. The player might therefore lose all hope of winning enough to overcome the two hundred-credit deficit, and so lose interest in the contract. Therefore, in one embodiment, a player who is well below a threshold number of accumulated credits for winning may play for an altered pay table. Low paying outcomes may be eliminated, while the likelihood of achieving high paying outcomes may increase. This is because a player with a two hundred-credit deficit probably doesn't care about a win of ten credits, but does care about a win of five hundred credits. The overall hold percentage of the machine may remain constant. In some embodiments, the alteration of the pay tables is an automatic function of the number of pulls remaining and the credit deficit of the player. In other embodiments, the player must request an alteration of the pay tables. As an example, a player may select an option that says, "Let me play just for the jackpot. Eliminate everything else and make the jackpot more likely." The player may or may not have to pay for an alteration of the pay tables. In a more general sense, the pay tables may change such that the standard deviation of the payout for a particular handle pull changes even as hold percentage may remain constant.

In another embodiment, a player might purchase a contract at a casino desk and receive a token that indicates the type of contract. The player might then deposit the token into a gaming device. The gaming device would then recognize the token and be able to execute the contract.

A player may have the privilege of entering into favorable contracts after a fixed amount of initial betting. For example, if the player wagers for an hour, he may be able to enter into a contract where each pull is at true odds. That is each pull pays back, on average, the same amount that was put in. Typically the pull pays back less. In yet another embodiment, a player may receive better odds on contract play when he is recommended to the casino by a friend.

In some embodiments, certain results of a pull may terminate a contract early. For example, if a player hits the jackpot, the contract may terminate. In other embodiments a player's accumulated credits can be displayed to a player as a function of time in the form of a graph. The graph may look much like graphs used to plot the price of a stock market index as a function of time. In some embodiments, a player wins money or some other prize if the graph takes on a certain shape. For example, if the line of the graph is such that it slips between several sets of markers (much like a skier on a slalom course), then the player may win a large prize.

In some embodiments, a player's winnings on each pull of the contract are reinvested into the contract, whereas in other embodiments they are not. In one example, a player purchases a contract for $100. The player instructs the gaming device to gamble the $100 until it is all gone. However, any winnings are not to be used to gamble, they are to be sent directly to the player. In a second example, the player purchases a contract for $100 and instructs the gaming device to gamble the $100 until it is gone or until it has become $200. Here, the player elects to reinvest winnings, using the winnings to pay for new handle pulls even after $100 worth of handle pulls has been made already.

A contract may reward a player based on any second order data, or meta-data about one or more outcomes. Examples include rewarding the player if three like outcomes occur in a row, if twenty cherries come up in ten sequential spins, if the players accumulated credits ever reach one hundred, etc. An example previously mentioned is rewarding a player based on the pattern of a graph of accumulated winnings as a function of time. A player might choose the "meta-outcomes" on which he desires to be rewarded, and the gaming device may figure the corresponding odds and the size of the reward should the meta-outcome occur.

A player may be rewarded with the downside of a sequence of outcomes much as buying insurance gives him the upside. For example, a player pays a fixed sum of money, and collects winnings for every dollar in the negative the contract finishes at. Thus, if a contract ends with the player having minus 20 accumulated credits, then the player collects 20 credits.

A contract may apply to a "best 100" sequence of a larger sequence of pulls. For example, the player pays $100 for a contract of one thousand pulls. From those one thousand pulls, the player gets to choose any one hundred consecutive outcomes to determine his winnings, and can disregard the rest of the outcomes. Thus the player can say he wants to use outcomes 506 through 605. Perhaps there was a hot streak during that sequence. The player's winnings are then determined solely based on what happened between pulls 506 and 605. This might result in winnings of $200, whereas having counted all one thousand pulls would have resulted in a net loss for the player. Of course, the gaming device may automatically choose the most favorable sequence for the player.

A player may choose his favorite outcome and receive higher payouts for that outcome, special privileges for receiving that outcome (e.g., the ability to terminate a contract), etc.

In some embodiments, a player may receive benefits towards his contract in return for various actions performed or obligations accepted by the player. Such actions or commitments may include, without limitation:

- Answering survey questions
- Performing other work, such as instructing casino patrons on the use of new slot machines
- Making a purchase
- Committing to a future purchase
- Committing to a future action, such as test-driving a car, hearing a life-insurance pitch, or visiting the casino
- a Committing to doing future work A player may also receive benefits towards a contract simply for being a good customer of the casino. For example, a player who annually gambles more than $10,000 at a casino may receive 5% discounts on the price of a contract. A preferred customer of the casino may also have access to certain restricted machines. Such restricted machines might sell cheaper than normal contracts, contracts with improved odds, and other special contracts. Other benefits towards the player's contract may include, without limitation:

- Free extra spins
- A reduction in the required number of spins
- A casino subsidy added to the player's bankroll
- Improved odds on one or more outcomes
- Higher payouts on one or more outcomes
- More flexibility in modifying the contract. For example, a benefit may be the option to terminate the contract early
- Elimination of one or more elements from the computation of a contract's return. For example, suppose a contract is to pay a player fifty times the average of his best ten pulls made during the contract. As a benefit, the player may now be paid fifty times the average of his best 9 pulls made during the contract.
- Addition of one or more elements to the computation of the contract's return. For example, a contract may now pay the sum of the II best pulls rather than the sum of the ten best pulls.

According to some embodiments, a contract may allow a player to receive outcomes for a plurality of different games and/or from a plurality of different gaming devices. For example, a contract may be for one hundred outcomes from a three-reel slot machine, and for one hundred outcomes from a five-reel slot machine. The player might receive the outcomes for viewing at the player device in alternating fashion. For example, every even outcome he receives may be from the three-reel slot machine, and every odd-numbered outcome may be from the five-reel slot machine. The player may then view the outcomes as he receives them at the player device, or in the order in which he receives them at the gaming device. The player might also view all the outcomes from a first game or gaming device before viewing any of the outcomes from a second game or gaming device. Of course, as discussed herein, there are many other sequences in which a player might receive or view outcomes from multiple games or gaming devices.

A player may receive an offer to enter into a contract, whereby outcomes are revealed to the player upon the occurrence of an external sports-related event, if the player demonstrates an interest in sports. For example, if a player has placed bets on sporting events, or has frequented casino sports bars, then a casino representative, or a gaming device, may offer the player contracts whose outcomes are revealed based on sporting events.

A contract may center around the game of keno. For example, a player may enter into a contract whereby a single keno ticket held by the player is good for multiple keno drawings. Over a period of time, the player may receive outcomes at his gaming device that may include the numbers drawn in the latest drawing and the amount the player has won based on his ticket or tickets.

CONCLUSION

Although the foregoing preferred embodiments employ slot machines, it is within the scope of the present invention to employ other types of gaming devices, such as video poker machines, video roulette machines, and the like. For example, in an embodiment using a video poker machine, the player selected price parameters include identifying only specific card hands, such as a royal flush, as active in the jackpot structure.

Thus, while the present invention has been described in terms of certain preferred embodiments, other embodiments that are apparent to those of skill in the art are also intended to be within the scope of the present invention. For example, the present invention may be practiced by an online casino utilizing only software and not involving traditional slot machines. Accordingly, the scope of the present invention is intended to be limited only by the claims appended hereto.

What is claimed:

1. A method comprising:

offering a flat rate play session to a player of a table game;

causing at least one processor to calculate a flat rate price for the flat rate play session based, at least in part, on an expected payout associated with the flat rate play session, wherein:

(a) the flat rate play session enables the player to participate in at least three plays of the table game in exchange for an upfront payment of the flat rate price, (b) each of the at least three plays of the table game of the flat rate play session is associated with a wager amount, and (c) the flat rate price has a corresponding value which is less than a cumulative total of the wager amounts associated with each of the at least three plays of the table game of the flat rate play session;

enabling the player to initiate the flat rate play session upon receiving the value corresponding to the flat rate price from the player;

providing chips corresponding to the wager amount for each play of the table game of the flat rate play session for use by the player in the flat rate play session such that the player is not obligated to provide any funds other than the value corresponding to the flat rate price for any play of the table game following the first play of the table game during the flat rate play session; and for each play of the table game of the flat rate play session, providing an award to the player if said play of the table game results in a winning game outcome.

2. The method of claim 1, which includes offering the flat rate play session to the player while the player is at a table at which the table game is played.

3. The method of claim 1, which includes offering the flat rate play session to the player when the player requests to cash in one or more chips used in the table game.

4. The method of claim 1, which includes offering the flat rate play session to the player when the player requests to purchase one or more chips for use in the table game.

5. The method of claim 1, wherein the flat rate play session includes a first set of pay combinations, at least one of which is different from a second set of pay combinations available to the player for a single play of the table game.

6. The method of claim 1, wherein a hold percentage of the table game is a first hold percentage for each of at least three plays of the table game if the player purchases the at least three plays individually and wherein the hold percentage for the table game is a different second hold percentage for each of the at least three plays of the table game if the player provides the value corresponding to the flat rate price to initiate the flat rate play session, the second hold percentage being greater than the first hold percentage.

7. The method of claim 1, wherein enabling the player to initiate the flat rate play session includes providing a tangible indicator of the flat rate play session to the player, the tangible indicator indicating to a dealer of the table game that the player has initiated the flat rate play session.

8. The method of claim 7, wherein the tangible indicator includes a token.

9. The method of claim 1, wherein the table game includes a card game and wherein the at least three plays of the table game include at least three hands of the card game.

10. A flat rate play session gaming apparatus comprising:

(a) at least one support member;

(b) at least one display device configured to display an offer of a flat rate play session to a player of a table game, the flat rate play session associated with a flat rate price based, at least in part, on an expected payout associated with the flat rate play session, wherein:

(i) the flat rate play session enables the player to participate in at least three plays of the table game in exchange for an upfront payment of the flat rate price, (ii) each of the at least three plays of the table game of the flat rate play session is associated with a wager amount, and (iii) the flat rate price has a corresponding value which is less than a cumulative total of the wager amounts associated with each of the at least three plays of the table game of the flat rate play session; and (c) at least one playing surface supported by the at least one support member, the at least one playing surface configured to enable the player to provide the value corresponding to the flat rate price to initiate the flat rate play session, the at least one playing surface including:

(i) a betting area configured to enable a dealer to provide at least one chip corresponding to the wager amount for each play of the table game of the flat rate play session for use by the player in the flat rate play session in exchange for the player providing the value corresponding to the flat rate price, such that the player is not obligated to provide any funds other than the value corresponding to the flat rate price for any play of the table game during the flat rate play session, and (ii) a game play area configured to enable the dealer to cause a display of each of the at least three plays of the table game of the flat rate play session.

11. The flat rate play session gaming apparatus of claim 10, wherein the at least one display device includes a physical sign supported by the at least one playing surface.

12. The flat rate play session gaming apparatus of claim 10, wherein the at least one display device includes a portion of the at least one playing surface, and wherein the offer of the flat rate play session is displayed on the portion of the at least one playing surface.

13. The flat rate play session gaming apparatus of claim 10, wherein the at least one display device includes an electronic display device.

14. The flat rate play session gaming apparatus of claim 13, wherein the electronic display device is configured to operate with at least one processor to:

(a) calculate the flat rate price for the flat rate play session based, at least in part, on the expected payout associated with the flat rate play session, and (b) display the calculated flat rate price to the player.

* * * * *

UNITED STATES PATENT AND TRADEMARK OFFICE

CERTIFICATE OF CORRECTION

PATENT NO. : 7,862,416 B2
APPLICATION NO. : 11/423043
DATED : January 4, 2011
INVENTOR(S) : Walker et al.

It is certified that error appears in the above-identified patent and that said Letters Patent is hereby corrected as shown below:

On the Title Page, item [63]:

In the “Related U.S. Application Data” section, lines 8 to 9, please replace “application No. 10/636,520 and a continuation-in-part of” with --application No. 10/636,520 is a continuation-in-part of--.

On the Title Page, in the “Related U.S. Application Data” section, lines 10 to 11, please replace “6,969,317, is a continuation” with --6,969,317, which is a continuation--.

Signed and Sealed this
First Day of March, 2011

David J. Kappos

David J. Kappos
*Director of the United States Patent and Trademark Office*